(12) United States Patent
Kim et al.

(10) Patent No.: US 11,330,540 B2
(45) Date of Patent: *May 10, 2022

(54) CELL SEARCH METHOD, FORWARD LINK FRAME TRANSMISSION METHOD, APPARATUS USING THE SAME AND FORWARD LINK FRAME STRUCTURE

(71) Applicant: Electronics and Telecommunications Research Institute, Daejeon (KR)

(72) Inventors: Il Gyu Kim, Seoul (KR); Hyeong Geun Park, Daejeon (KR); Young Jo Ko, Daejeon (KR); Kapseok Chang, Daejeon (KR); Hyo Seok Yi, Daejeon (KR); Young Hoon Kim, Daejeon (KR); Seung Chan Bang, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,224

(22) Filed: Aug. 28, 2018

(65) Prior Publication Data

US 2019/0014547 A1 Jan. 10, 2019

Related U.S. Application Data

(63) Continuation of application No. 15/286,600, filed on Oct. 6, 2016, now Pat. No. 10,080,204, which is a
(Continued)

(30) Foreign Application Priority Data

Jul. 25, 2006 (KR) .................. 10-2006-0069800
Jan. 19, 2007 (KR) .................. 10-2007-0006230
Jul. 25, 2007 (KR) .................. 10-2007-0074705

(51) Int. Cl.
*H04L 27/26* (2006.01)
*H04W 56/00* (2009.01)
(Continued)

(52) U.S. Cl.
CPC ....... *H04W 56/001* (2013.01); *H04J 11/0069* (2013.01); *H04J 11/0093* (2013.01);
(Continued)

(58) Field of Classification Search
CPC .......... H04W 56/001; H04W 36/0061; H04W 36/08; H04W 56/00; H04L 5/0037;
(Continued)

(56) References Cited

U.S. PATENT DOCUMENTS 5,930,366 A 7/1999 Jamal et al.
6,480,558 B1 11/2002 Ottosson et al.
(Continued)

FOREIGN PATENT DOCUMENTS

CN 1540896 A 10/2004
EP 1154662 A1 11/2001
(Continued)

OTHER PUBLICATIONS

3GPP—Chunghwa Telecom Laboratories (CHTTL)—Three-Step Initial Cell Search and System Acquisition for E-UTRA, Meeting #45, R1-061144, May 2006.*
(Continued)

*Primary Examiner* — Lakeram Jangbahadur

(57) ABSTRACT

A method of searching a cell in a mobile station of a communication system in which a plurality of cells are grouped into a plurality of cell groups, each cell group including at least two cells, includes: detecting a primary synchronization signal and a secondary synchronization signal from a received signal; and identifying a cell based on a combination of the primary synchronization signal and the
(Continued)

```
CELL GROUP 0 = {0, 1, 2, 3, ..., 13, 14, 15}       → {(0, 1, 2, 3), (4, 5, 6, 7), ..., (60, 61, 62, 63)}
CELL GROUP 1 = {16, 17, 18, ..., 29, 30, 31}        → {(64, 65, 66, 67), (68, 69, 70, 71), ..., (124, 125, 126, 127)}
CELL GROUP 2 = {32, 33, 34, ..., 45, 46, 47}        → {(128, 129, 130, 131), (132,133,134,135), ..., (192, 193, 194, 195)}
CELL GROUP 3 = {48, 49, 50, ..., 61, 62, 63}        → {(196, 197, 198, 199), (200, 201, 202, 203), ..., (252, 253, 254, 255)}
CELL GROUP 4 = {64, 65, 66, ..., 77, 78, 79}        → {(256, 257, 258, 259), (260, 261, 262, 263), ..., (316, 317, 318, 319)}
CELL GROUP 5 = {80, 81, 82, ..., 93, 94, 95}        → {(320, 321, 322, 323), (324, 325, 326, 327), ..., (380, 381, 382, 383)}
CELL GROUP 6 = {96, 07, 98, ..., 109, 110, 111}     → {(384, 385, 386, 387), (388, 389, 390, 391), ..., (444, 445, 446, 447)}
CELL GROUP 7 = {112, 113, 114, ..., 125, 126, 127}  → {(448, 449, 450, 451), (452, 453, 454, 455), ..., (508, 509, 510, 511)}
``` secondary synchronization signal. The secondary synchronization signal is related to the cell group to which the mobile station belongs and the primary synchronization signal is related to the cell to which the mobile station belongs within the cell group.

18 Claims, 34 Drawing Sheets

Related U.S. Application Data continuation of application No. 14/792,822, filed on Jul. 7, 2015, now Pat. No. 9,496,976, which is a continuation of application No. 13/775,158, filed on Feb. 23, 2013, now Pat. No. 9,113,380, which is a continuation of application No. 13/617,679, filed on Sep. 14, 2012, now Pat. No. 8,406,218, which is a continuation of application No. 13/036,787, filed on Feb. 28, 2011, now Pat. No. 8,311,031, which is a continuation of application No. 12/162,237, filed as application No. PCT/KR2007/003573 on Jul. 25, 2007, now Pat. No. 7,969,964.

(51) Int. Cl.
*H04J 11/00* (2006.01)
*H04L 5/00* (2006.01)
*H04W 36/00* (2009.01)
*H04W 36/08* (2009.01)

(52) U.S. Cl.
CPC ............ *H04L 5/005* (2013.01); *H04L 5/0037* (2013.01); *H04L 5/0053* (2013.01); *H04L 27/2613* (2013.01); *H04L 27/2655* (2013.01); *H04L 27/2675* (2013.01); *H04W 36/0061* (2013.01); *H04W 36/08* (2013.01); *H04W 56/00* (2013.01)

(58) Field of Classification Search
CPC . H04L 5/005; H04L 27/2655; H04L 27/2675; H04L 5/0053; H04L 27/2613; H04J 11/0069; H04J 11/0093
See application file for complete search history.

(56) References Cited

U.S. PATENT DOCUMENTS

| | | |
|---|---|---|
| 6,665,277 B1 | 12/2003 | Sriram |
| 6,728,229 B1 | 4/2004 | Lim |
| 6,847,630 B2 | 1/2005 | Blanz et al. |
| 6,894,995 B2 | 5/2005 | Citrapu et al. |
| 7,110,782 B2 | 9/2006 | Yamaguchi |
| 7,158,505 B2 | 1/2007 | Dick et al. |
| 7,272,376 B1 | 9/2007 | Sparr et al. |
| 7,289,483 B1 | 10/2007 | Lim |
| 7,386,055 B2 | 6/2008 | Morita et al. |
| 7,444,144 B2 | 10/2008 | Demir et al. |
| 7,561,543 B2 | 7/2009 | Zalio |
| 7,693,123 B2 | 4/2010 | Rudolf |
| 7,706,249 B2 | 4/2010 | Akita et al. |
| 7,724,720 B2 | 5/2010 | Korpela et al. |
| 7,738,437 B2 | 6/2010 | Ma et al. |
| 7,916,714 B2 | 3/2011 | Han et al. |
| 7,965,689 B2 | 6/2011 | Akita et al. |
| 8,031,745 B2 | 10/2011 | Onggosanusi et al. |
| 8,054,823 B2 | 11/2011 | Dabak et al. |
| 8,086,228 B2 | 12/2011 | Demir et al. |
| 8,133,996 B2 | 3/2012 | Pathi et al. |
| 8,134,996 B2 | 3/2012 | Onggosanusi |
| 8,385,318 B2 | 2/2013 | Tanno |
| 8,873,488 B2 | 10/2014 | Cho |
| 9,313,064 B2 | 4/2016 | Zhang |
| 2002/0041580 A1 | 4/2002 | Shoji et al. |
| 2002/0075833 A1 | 6/2002 | Dick et al. |
| 2004/0142712 A1* | 7/2004 | Rudolf .............. H04B 1/70735 455/502 |
| 2005/0075125 A1 | 4/2005 | Bada et al. |
| 2005/0088987 A1 | 4/2005 | Ryu |
| 2006/0062196 A1* | 3/2006 | Cai ..................... H04L 27/2656 370/345 |
| 2006/0114812 A1 | 6/2006 | Kim et al. |
| 2007/0133390 A1 | 6/2007 | Luo et al. |
| 2007/0183306 A1* | 8/2007 | Akita .................... H04L 5/0064 370/208 |
| 2007/0183391 A1 | 8/2007 | Akita et al. |
| 2007/0248068 A1 | 10/2007 | Onggosanusi et al. |
| 2008/0019350 A1* | 1/2008 | Onggosanusi ...... H04L 27/2657 370/350 |
| 2008/0080439 A1* | 4/2008 | Aziz ..................... H04L 5/0048 370/338 |
| 2009/0161653 A1 | 6/2009 | Kumar et al. |
| 2011/0268104 A1 | 11/2011 | Akita et al. |
| 2012/0188977 A1* | 7/2012 | Cho ..................... H04L 5/0048 370/330 |
| 2013/0089111 A1 | 4/2013 | Ookubo |
| 2017/0026922 A1* | 1/2017 | Kim ..................... H04L 5/0053 |

FOREIGN PATENT DOCUMENTS

| | | |
|---|---|---|
| KR | 10-2000-0067168 A | 11/2000 |
| KR | 10-2006-0066033 A | 6/2006 |
| WO | 00/67396 A1 | 11/2000 |
| WO | 03/034642 A2 | 4/2003 |
| WO | 05/101780 A1 | 10/2005 |
| WO | 06/023536 A2 | 3/2006 |

OTHER PUBLICATIONS

Wang, Yi-Pin Eric & Ottosson, Tony; Cell Search in W-CDMA, IEEE Journal on Selected Areas in Communications, Aug. 2000, pp. 1470-1482, vol. 18, No. 8, IEEE, Edmonton, AB, Canada.
European Search Report EYM 064 WO/EP; Application No. 07793239.0-1246/2044720 PCT/KR/2001003573; dated Jul. 29, 2010.
International Search Report—PCT/KR2007/003573 dated Nov. 6, 2007.
Written Opinion—PCT/KR2007/003573 dated Nov. 6, 2007.
Korean Office Action corresponding with Korean Patent Application No. 10-2007-0074705 and its English Translation dated Aug. 13, 2008.
ZTE, "TP for Downlink Synchronization Channel Schemes for E-EUTRA", 3GPP TSG-RAN1 WG1 #42bis, San Diego, USA, R1-051072, Oct. 10-14, 2005.
NTT DoCoMo, SCH Structure and Cell Search Method for E-UTRA Downlink, 3GPP TSG RAN WG1 Meeting #45, Shanghai, China, R1-061186 (Original R1-060042), May 8-12, 2006.
Etri, Comparison of One-SCH and Two-SCH schemes for EUTRA Cell Search, 3GPP TSG RAN WG1 Meeting #45, Shanghai, China, R1-061117, May 8-12, 2006.
Tanno M, et al., Fast Cell Search Algorithm for Overlay System With Cellular and Isolated Cells in Forward Link for OFCDM Broadband Wireless Access, IEICE Transactions on Communications, Communications Society, Tokyo, JP, vol. E88-B, No. 1, Jan. 1, 2005, pp. 159-169.
Sharp, Low-overhead Cell ID Mapping and Detection Scheme for E-UTRA Downlinkk:, 3GPP DRAFT; R1-061681, Cannes, France, Jun. 27-30, 2006.
Notice of Allowance dated May 22, 2011 in U.S. Appl. No. 12/162,237.
Non-final Office Action dated Jan. 11, 2011 in U.S. Appl. No. 12/162,237.
Non-final Office Action dated Sep. 20, 2010 in U.S. Appl. No. 12/162,237.
Notice of Allowance dated Jul. 11, 2012 in U.S. Appl. No. 13/036,787.
Non-final Office Action dated Jan. 18, 2012 in U.S. Appl. No. 13/036,787.

(56) References Cited

OTHER PUBLICATIONS

Notice of Allowance dated Nov. 28, 2012 in U.S. Appl. No. 13/617,679.
Notice of Allowance dated Apr. 8, 2015 in U.S. Appl. No. 13/775,158.
Final Office Action dated Jan. 22, 2015 in U.S. Appl. No. 13/775,158.
Non-final Office Action dated Sep. 26, 2014 in U.S. Appl. No. 13/775,158.
Notice of Allowance dated Jul. 5, 2016 in U.S. Appl. No. 14/792,822.
Non-final Office Action dated Nov. 6, 2015 in U.S. Appl. No. 14/792,822.
Non-final Office Action dated May 23, 2017 in U.S. Appl. No. 15/286,600.
Final Office Action dated Dec. 19, 2017 in U.S. Appl. No. 15/286,600.
Advisory Action dated Apr. 6, 2018 in U.S. Appl. No. 15/286,600.
Notice of Allowance dated Jun. 11, 2018 in U.S. Appl. No. 15/286,600.
Extended European Search Report dated Jan. 15, 2019 for European Application No. 18173796.6.
R1-050707, Physical Channels and Multiplexing in Evolved UTRA Downlink, Aug. 29-Sep. 2, 2005, 3GPP TSG Ran WG1 #42 on LTE, by NTT DoCoMo, NEC, and Sharp ("R1-050707").
R1-060780, SCH Structure and Cell Search Method for E-UTRA Downlink, Mar. 27-31, 2006, 3GPP TSG-RAN WG Meeting #44bis, by NTT DoCoMo and NEC ("R1-060780").
R1-060812, Cell Search Procedure and Channel Structure, Mar. 27-31, 2006, 3GPP TSG RAN WG1 Meeting #44bis, by Samsung ("R1-060812").
R1-060860, Aspects and Designs of DL Sync channel (SCH) for E-UTRA, Mar. 27-31, 2006, 3GPP TSG RAN WG1#44bis, by Texas Instruments ("R1-060860").
R1-061186, SCH Structure and Cell Search Method for E-UTRA Downlink, May 8-12, 2006, 3GPP TSG RAN WG1Meeting #45, by NTT DoCoMo ("R1-061186").
R1-061434, Proposal for DL Sync channel (SCH) for E-UTRA, May 8-12, 2006, 3GPP TSG RAN WG1 #45, by Texas Instruments ("R1-061434").
R1-061144, Three-Step Initial Cell Search and System Acquisition for E-UTRA by Chunghwa Telecom Laboratories (CHTTL), 3GPP TSG RAN WG1 Meeting #45, May 8-12, 2006, ("R1-061144").
R1-061744, Proposal for DL Sync channel (SCH) for E-UTRA, Jun. 27-30, 2006, 3GPP TSG RAN WG1 LTE Adhoc, by Texas Instruments ("R1-061744").
R1-062990, Outcome of cell search drafting session, Oct. 9-13, 2006, 3GPP TSG-RAN WG1 #46bis ("R1-062990").
R1-070428, Further analysis of initial cell search for approach 1 and 2—single cell scenario, Jan. 15-19, 2007, 3GPP TSG-RAN WG1 #47-bis, Qualcomm Europe ("R1-070428").
R1-051357, Comparing of Two Downlink Synchronization Channel Schemes for E-UTRA, Nov. 7-11, 2005, 3GPP TSG RAN1 WG1 #43, by ZTE ("R1-051357") (submitted in place of R1-015357 cited for Exhibit E-15).
Defendant's Preliminary Invalidity Contentions submitted on Jul. 22, 2019 for Case No. 2:18-cv-00526 (E.D. Texas).
Intervenor Ericsson Inc.'s Preliminary Invalidity Contentions submitted on Jul. 22, 2019 for Case No. 2:18-cv-00526 (E.D. Texas).
Exhibits E-1-E-16 for Defendant's Preliminary Invalidity Contentions submitted on Jul. 22, 2019 for Case No. 2:18-cv-00526 (E.D. Texas).
Appendix E for Defendant's Preliminary Invalidity Contentions submitted on Jul. 22, 2019 for Case No. 2:18-cv-00526 (E.D. Texas).
R1-071768, Approved Report of 3GPP TSG RAN WG1 #48 v0.2.0 (St. Louis, USA, Feb. 12-16, 2007) ("R1-071768").
Motorola, SCH Structure and Sequence for EUTRA Downlink, R1-062070, 3GPP TSG RAN1 #46, Tallinn, Estonia, Aug. 28-Sep. 1, 2006.
Exhibits F01-F14 for Defendant's Preliminary Invalidity Contentions submitted on Jul. 22, 2019 for Case No. 2:18-cv-00526 (E.D. Texas).
Exhibits G01-G10 for Defendant's Preliminary Invalidity Contentions submitted on Jul. 22, 2019 for Case No. 2:18-cv-00526 (E.D. Texas).
Appendix F for Defendant's Preliminary Invalidity Contentions submitted on Jul. 22, 2019 for Case No. 2:18-cv-00526 (E.D. Texas).
Appendix G for Defendant's Preliminary Invalidity Contentions submitted on Jul. 22, 2019 for Case No. 2:18-cv-00526 (E.D. Texas).
Complaint filed Mar. 17, 2021 in the Western District of Texas (Waco Division) for Case No. 6:21-cv-00270.
Declaration of Alexander Haimovich, Ph.D. submitted on Dec. 9, 2019 for IPR No. 2020-00240 under 37 C.F.R.§ 1.68.
Declaration of Craig Bishop submitted on Dec. 10, 2019 for IPR No. 2020-00240 under 37 C.F.R. § 1.68 and related appendices.
Samsung, "Cell search procedure and channel structure", R1-060812, 3GPP TSG RAN WG1 Meeting #44bis, Athens, Greece, Mar. 27-31, 2006 ("R1-060812").
NTT DoCoMo et al., "Physical Channels and Multiplexing in Evolved UTRA Downlink", R1-050707, 3GPP TSG RAN WG1 #42 on LTE (Original R1-050590), London, UK, Aug. 29-Sep. 2, 2005 ("R1-050707").
Texas Instruments, "Aspects and Design of DL Sync channel (SCH) for E-UTRA", R1-060860, 3GPP TSG RAN WG1 #44bis, Athens, Greece, Mar. 27-31, 2006 ("R1-060860").
Nokia et al., "Outcome of cell search drafting session", R1-062990, TSG-RAN WG1 #46bis, Seoul, Korea, Oct. 9-13, 2006 ("R1-062990").
Qualcomm Europe, "Hypothesis partitioning for initial cell search-link performance", R1-070650, 3GPP TSG-RAN WG1 #48, Feb. 12-16, 2007, St. Louis, USA ("R1-070650").
Chunghwa Telecom Laboratories (CHTTL), "Three-Step Initial Cell Search and System Acquisition for E-UTRA", R1-061144, 3GPP TSG RAN WG1 Meeting #45, Shanghai, China, May 8-12, 2006 ("R1-061144").
ZTE, "Comparing of Two Downlink Synchronization Channel Schemes for E-UTRA", R1-051357, 3GPP TSG-RAN1 WG1 #43, Seoul, Korea Nov. 7-11, 2005 ("R1-051357").
Etri, "Cell Search Scheme for EUTRA & TP", R1-060072, 3GPP RAN WG1 LTE Ad Hoc Meeting, Helsinki Finland, Jan. 23-25, 2006 ("R1-060072").
3rd Generation Partnership Project; Technical Specification Group Radio Access Network; Physical Layer Aspects for Evolved UTRA (Release 7), 3Ggpp TR 25.814 V0.5.0 (Nov. 2005).
3rd Generation Partnership Project; Technical Specification Group Radio Access Network; Physical Layer Aspects for Evolved UTRA (Release 7), 3Ggpp TR 25.814 V1.0.3 (Feb. 2006).
3rd Generation Partnership Project; Technical Specification Group Radio Access Network; Physical Layer Aspects for Evolved UTRA (Release 7), 3Ggpp TR 25.814 V1.2.2 (Mar. 2006).
Universal Mobile Telecommunications System (UMTS); Physical channels and mapping of transport channels onto physical channels (FDD) (3GPP TS 25.211 version 6.7.0 Release 6); ETSI TS 125.211 v6.7.0 (Dec. 2005).
Universal Mobile Telecommunications System (UMTS); Physical layer procedures (FDD) (3GPP TS 25.214 version 6.7.1 Release 6); ETSI TS 125.214 v6.7.1 (Dec. 2005).
Sanat Kamal Bahl, "Cell Searching in WCDMA", IEEE Potentials, 2003, pp. 16-19.
Complaint filed Dec. 3, 2018 in *Sol IP, LLC* v. *AT&T Mobility LLC*, Civil Action No. 2:18-cv-00526 (E.D. Tex).
Sol IP's First Amended Infringement Contentions in Civil Action No. Civil Action No. 2:18-cv-00526.
MCC Support, "Approved Report of 3GPP TST RAN WG1 $48 v0.2.0 (St. Louis, USA, Feb. 12-16, 2007)", R1-071768, 3GPP TSG RAN WG1 Meeting #48bis, St. Julian, Malta, Mar. 26-30, 2007 ("R1-071768").
Declaration of Craig Bishop submitted on Dec. 20, 2019 for IPR No. 2020-00242 under 37 C.F.R. § 1.68 and related appendices.
Declaration of Alexander Haimovich, Ph.D. submitted on Dec. 9, 2019 for IPR No. 2020-00242 under 37 C.F.R. § 1.68.
Petition for Inter Partes Review IPR 2020-00240 submitted on Dec. 10, 2019.

(56) References Cited

OTHER PUBLICATIONS

Petition for Inter Partes Review IPR 2020-00242 submitted on Dec. 10, 2019.
Notice of Termination for IPR2020-00240 and 00242 entered Mar. 9, 2020.
U.S. Appl. No. 60/745,250.

* cited by examiner

FIG. 3

| CELL GROUP NUMBER | HOPPING CODE WORD IDENTIFIERS | | CELL IDENTIFIER |
|---|---|---|---|
| CELL GROUP 0 = | {0, 1, 2, 3, ...., 13, 14, 15} | → | {0, 1, 2, 3, ...., 13, 14, 15} |
| CELL GROUP 1 = | {16, 17, 18, ...., 29, 30, 31} | → | {16, 17, 18, ...., 29, 20, 31} |
| CELL GROUP 2 = | {32, 33, 34, ...., 45, 46, 47} | → | {32, 33, 34, ...., 45, 46, 47} |
| CELL GROUP 3 = | {48, 49, 50, ...., 61, 62, 63} | → | {48, 49, 50, ...., 61, 62, 63} |
| CELL GROUP 4 = | {64, 65, 66, ...., 77, 78, 79} | → | {64, 65, 66, ...., 77, 78, 79} |
| CELL GROUP 5 = | {80, 81, 82, ...., 93, 94, 95} | → | {80, 81, 82, ...., 93, 94, 95} |
| CELL GROUP 6 = | {96, 07, 98, ...., 109, 110, 111} | → | {96, 97, 98, ...., 109, 110, 111} |
| CELL GROUP 7 = | {112, 113, 114, ...., 125, 126, 127} | → | {112, 113, 114,...., 125, 126, 127} |

FIG. 4

| CELL GROUP NUMBER | HOPPING CODE WORD IDENTIFIERS | | CELL IDENTIFIER |
|---|---|---|---|
| CELL GROUP 0 = | {0, 1, 2, 3, ..., 13, 14, 15} | → | {0, 1, 2, 3, ..., 13, 14, 15} |
| CELL GROUP 1 = | {0, 1, 2, 3, ..., 13, 14, 15} | → | {16, 17, 18, ..., 29, 20, 31} |
| CELL GROUP 2 = | {0, 1, 2, 3, ..., 13, 14, 15} | → | {32, 33, 34, ..., 45, 46, 47} |
| CELL GROUP 3 = | {0, 1, 2, 3, ..., 13, 14, 15} | → | {48, 49, 50, ..., 61, 62, 63} |
| CELL GROUP 4 = | {0, 1, 2, 3, ..., 13, 14, 15} | → | {64, 65, 66, ..., 77, 78, 79} |
| CELL GROUP 5 = | {0, 1, 2, 3, ..., 13, 14, 15} | → | {80, 81, 82, ..., 93, 94, 95} |
| CELL GROUP 6 = | {0, 1, 2, 3, ..., 13, 14, 15} | → | {96, 97, 98, ..., 109, 110, 111} |
| CELL GROUP 7 = | {0, 1, 2, 3, ..., 13, 14, 15} | → | {112, 113, 114, ..., 125, 126, 127} |

CELL GROUP 0 = {0, 1, 2, 3, ..., 13, 14, 15}
CELL GROUP 1 = {16, 17, 18, ..., 29, 30, 31}
CELL GROUP 2 = {32, 33, 34, ..., 45, 46, 47}
CELL GROUP 3 = {48, 49, 50, ..., 61, 62, 63}
CELL GROUP 4 = {64, 65, 66, ..., 77, 78, 79}
CELL GROUP 5 = {80, 81, 82, ..., 93, 94, 95}
CELL GROUP 6 = {96, 07, 98, ..., 109, 110, 111}
CELL GROUP 7 = {112, 113, 114, ..., 125, 126, 127}

→ {(0, 1, 2, 3), (4, 5, 6, 7), ..., (60, 61, 62, 63)}
→ {(64, 65, 66, 67), (68, 69, 70, 71), ..., (124, 125, 126, 127)}
→ {(128, 129, 130, 131), (132,133,134,135), ..., (192, 193, 194, 195)}
→ {(196, 197, 198, 199), (200, 201, 202, 203), ..., (252, 253, 254, 255)}
→ {(256, 257, 258, 259), (260, 261, 262, 263), ..., (316, 317, 318, 319)}
→ {(320, 321, 322, 323), (324, 325, 326, 327), ..., (380, 381, 382, 383)}
→ {(384, 385, 386, 387), (388, 389, 390, 391), ..., (444, 445, 446, 447)}
→ {(448, 449, 450, 451), (452, 453, 454, 455), ..., (508, 509, 510, 511)}

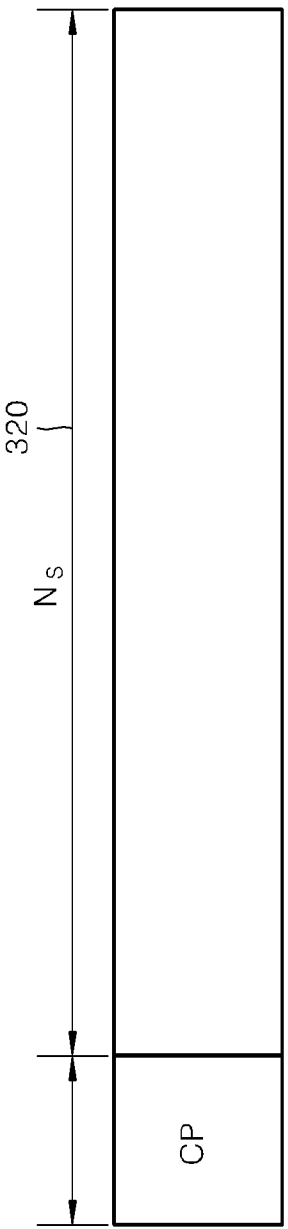
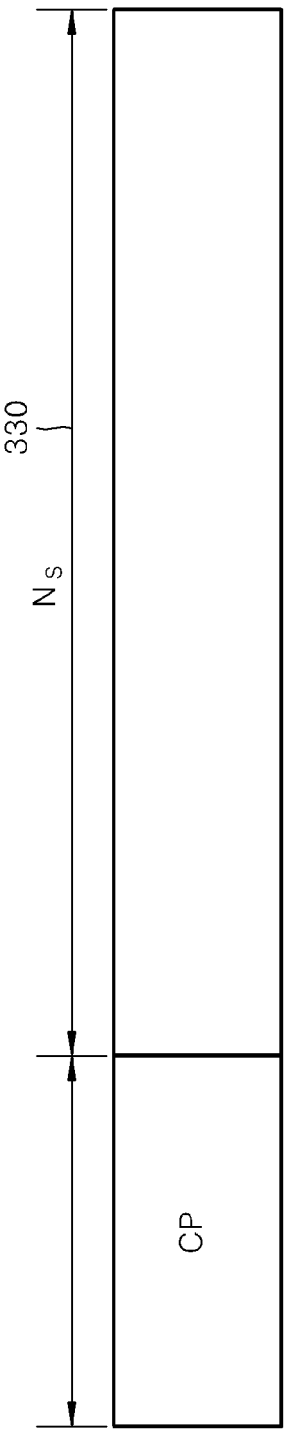

340 (STARTING POINT OF PRIMARY SYNCHRONIZATION CHANNEL IN SUB-FRAME HAVING SHORT CP)

350 (STARTING POINT OF PRIMARY SYNCHRONIZATION CHANNEL IN SUB-FRAME HAVING LONG CP)

FIG. 15A
FIG. 15B
FIG. 15C
FIG. 15D

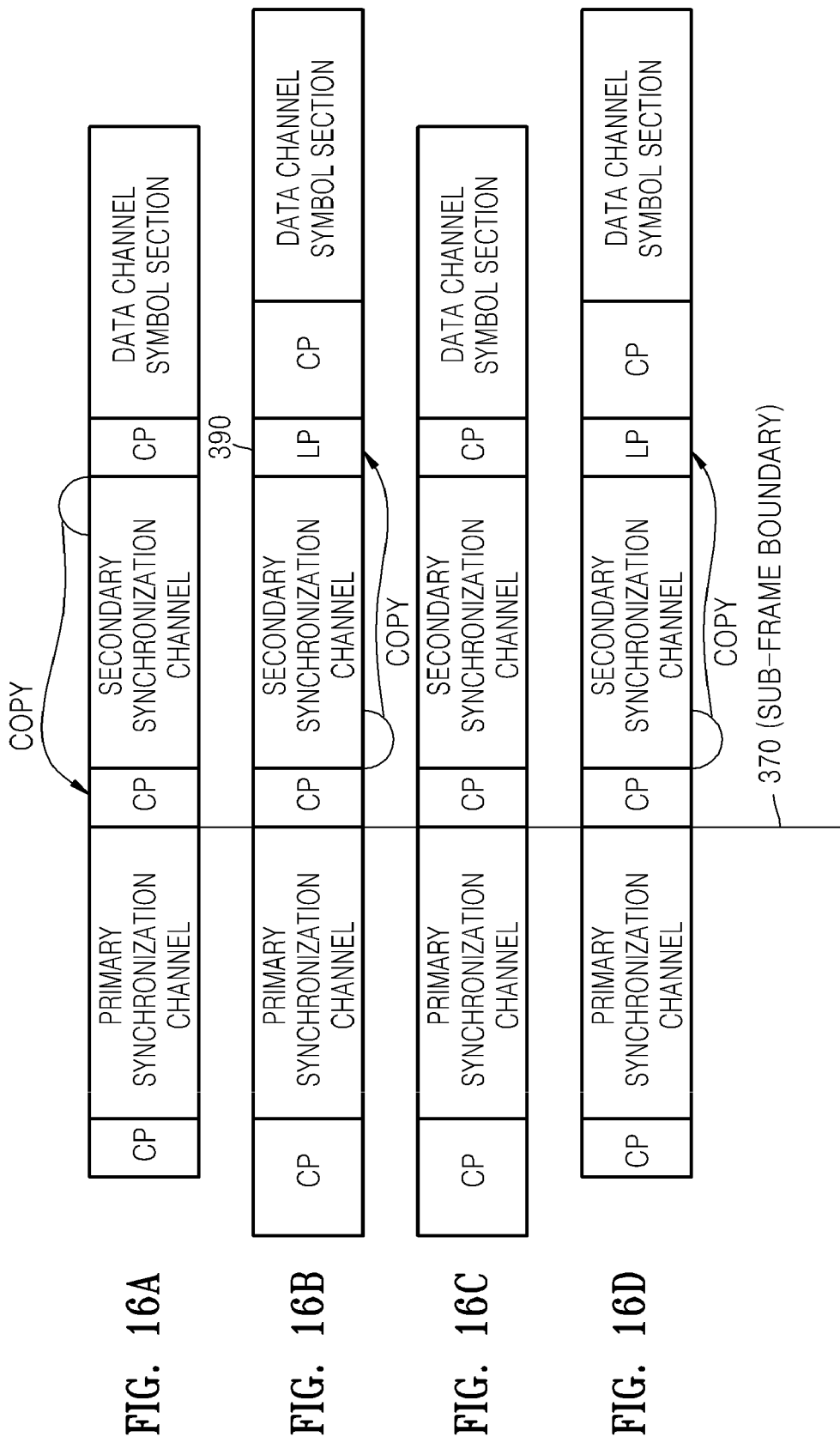

CELL SEARCH METHOD, FORWARD LINK FRAME TRANSMISSION METHOD, APPARATUS USING THE SAME AND FORWARD LINK FRAME STRUCTURE

CROSS REFERENCE TO RELATED APPLICATIONS

This application is a continuation of U.S. patent application Ser. No. 15/286,600, filed on Oct. 6, 2016, which is a continuation of U.S. patent application Ser. No. 14/792,822, filed on Jul. 7, 2015 (now U.S. Pat. No. 9,496,976), which is a continuation of U.S. patent application Ser. No. 13/775,158, filed on Feb. 23, 2013 (U.S. Pat. No. 9,113,380), which is a continuation of U.S. patent application Ser. No. 13/617,679 filed on Sep. 14, 2012 (now U.S. Pat. No. 8,406,218), which is a continuation of U.S. patent application Ser. No. 13/036,787, filed on Feb. 28, 2011 (now U.S. Pat. No. 8,311,031), which is a continuation of U.S. patent application Ser. No. 12/162,237, filed on Jul. 25, 2008 (now U.S. Pat. No. 7,969,964), which is a national entry of International Application No. PCT/KR2007/003573, filed on Jul. 25, 2007, which claims priority to Korean Patent Application No. 10-2006-0069800, filed on Jul. 25, 2006; Korean Patent Application No. 10-2007-0006230, filed on Jan. 19, 2007; and Korean Patent Application No. 10-2007-0074705, filed on Jul. 25, 2007, the entire contents of which are incorporated herein by reference.

The present invention relates to an Orthogonal Frequency Division Multiplexing (OFDM) cellular system, and more particularly, to a method of allocating a synchronization channel code for identifying a forward link cell in the OFDM cellular system, a method of transmitting a forward synchronization signal, a method of searching an initial cell and an adjacent cell, and a mobile station, a base station, a system, and a frame structure using the methods.

BACKGROUND ART

In a Wideband Code Division Multiple Access (WCDMA) method, a system uses 512 long PN scrambling codes and base stations, which are adjacent to each other, use long PN scrambling codes that are different to each other as scrambling codes of forward link channels.

When a power source is applied to a mobile station, the mobile station should obtain a system timing of a base station (the base station having the largest reception signal) where the mobile station belongs to and a long PN scrambling code ID (generally called a "cell identifier"). This process is referred to as a cell searching method of the mobile station.

In the WCDMA, 512 long PN scrambling codes are divided into 64 groups in order to easily perform cell searching, and a primary synchronization channel and a secondary synchronization channel are placed in a forward link. The primary synchronization channel supports the mobile stations to obtain slot synchronization and the secondary synchronization channel supports the mobile station to obtain a 10 msec frame boundary and long PN scrambling code group ID information.

The cell searching method in the WCDMA method includes three processes. First, the mobile station obtains slot synchronization by using a Primary Synchronization Channel Code (PSC). The same PSCs are transmitted in 15 slot units for every 10 msec in the WCDMA method and the PSCs transmitted by all base stations are the same. Therefore, in the first process, slot synchronization is obtained by using a matched filter with respect to the PSC.

Second, the long PN scrambling code group information and the 10 msec frame boundary are obtained by using slot timing information obtained from the first process and a Secondary Synchronization Channel Code (SSC).

Third, the long PN scrambling code ID currently used by the base station is obtained by using a common pilot channel code correlator. Here, the 10 msec frame boundary and the long PN scrambling code group information obtained from the previous process are used. That is, 8 scrambling codes are mapped to one code group so that the mobile station compares 8 outputs from the PN scrambling code correlator and detects the long PN scrambling code ID currently used by a cell.

The synchronization channel is basically classified into the primary synchronization channel and the secondary synchronization channel in the WCDMA method, and the primary synchronization channel, the secondary synchronization channel, a common pilot channel, and other data channels are multiplexed using a CDMA method that is based on a time domain direct sequence spread spectrum.

As a part of a 3G Long Term Evolution (3G-LTE) that is used as a complement to the WCDMA method, Orthogonal Frequency Division Multiplexing (OFDM) based wireless transmission technology standardization is now in progress. The synchronization channels, the common pilot channel structure, and the cell searching methods used in the WCDMA method are suitable for a Direct Sequence-Code Division Multiple Access (DS-CDMA) and cannot be applied to the OFDM forward link.

Therefore, an adjacent cell searching method is required for the synchronization channel of the forward link, the common pilot channel structure, the initial cell searching method of the mobile station, and handover in the OFDM based cellular system.

DETAILED DESCRIPTION OF THE INVENTION

Technical Problem

The present invention provides a synchronization channel structure and a forward link frame so that a search process for an initial cell by a mobile station and a search process for an adjacent cell for handover can be easily performed in an Orthogonal Frequency Division Multiplexing (OFDM) cellular system.

The present invention also provides a method of allocating a synchronization channel code so that a search process for an initial cell by a mobile station and a search process for an adjacent cell for handover in the OFDM cellular system.

The present invention also provides a cell searching apparatus and a cell searching method including a search process for an initial cell by a mobile station and a search process for an adjacent cell for handover in the OFDM cellular system.

The present invention also provides an apparatus for transmitting a forward link frame and a method thereof to support the cell searching method.

The present invention also provides the OFDM cellular system to which the cell searching method is applied.

The present invention also provides a forward link frame structure in which the cell searching method is used.

The present invention also provides a computer readable recording medium having embodied thereon a computer program executing the cell searching method.

Technical Solution

According to an aspect of the present invention, there is provided a method of transmitting a forward synchronization signal in a wireless communication system, the method including: generating a frame comprised of a plurality of sync blocks; and transmitting the frame through a forward link, wherein the frame comprises primary synchronization channel sequences which provide timing information of the sync blocks and a plurality of secondary synchronization channel sequences which provide timing information of the frame, wherein a cell identifier is specified by a combination of the primary synchronization channel sequence and a hopping code word specified by the plurality of the secondary synchronization channel sequences.

According to another embodiment of the present invention, there is provided a method of transmitting a forward synchronization signal in a wireless communication system, the method including: generating a frame comprised of a plurality of sync blocks; and transmitting the frame through a forward link, wherein the frame comprises primary synchronization channel sequences which provide timing information of the sync blocks and a plurality of secondary synchronization channel sequences which provide timing information of the frame and the plurality of the secondary synchronization channel sequences specify hopping code words that are one-to-one mapped to cell identifiers.

According to another embodiment of the present invention, there is provided a method of detecting cell identifiers by using a forward synchronization signal in a wireless communication system, the method including: receiving a frame comprised of a plurality of sync blocks; extracting a sync block timing from primary synchronization channel sequence included in the frame, frame timing from a plurality of secondary synchronization channel sequences included in the frame, and a hopping code word specified by the plurality of the secondary synchronization channel sequences; and detecting the cell identifier by combination of the primary synchronization channel sequence and the hopping code word.

According to another embodiment of the present invention, there is provided an apparatus for transmitting a forward synchronization signal in a wireless communication system, the apparatus including: a frame generating unit generates a frame comprised of a plurality of the sync blocks, wherein the frame comprising primary synchronization channel sequences which provide timing information of sync blocks and a plurality of secondary synchronization channel sequences which provides timing information of the frame, wherein a cell identifier is specified by a combination of the primary synchronization channel sequence and a hopping code word specified by the plurality of the secondary synchronization channel sequences; and a frame transmitting unit transmits the frame through a forward link.

According to another embodiment of the present invention, there is provided an apparatus for transmitting a forward synchronization signal in a wireless communication system, the apparatus including: a frame generating unit generates a frame comprised of a plurality of the sync blocks, wherein the frame comprising primary synchronization channel sequences which provide timing information of sync blocks and a plurality of secondary synchronization channel sequences which provide timing information of the frame, wherein the plurality of secondary synchronization channel sequences specify hopping code words that are one-to-one mapped to cell identifiers; and a frame transmitting unit transmits the frame through a forward link.

According to another embodiment of the present invention, there is provided a forward link frame comprised of a plurality of sync blocks used as a forward synchronization signal in a wireless communication system, the forward link frame including: primary synchronization channel sequences which provide timing information of the sync blocks and a plurality of secondary synchronization channel sequences which provide timing information of the frame, wherein a cell identifier is specified by a combination of the primary synchronization channel sequence and a hopping code word specified by the plurality of the secondary synchronization channel sequences.

According to another embodiment of the present invention, there is provided a forward link frame comprised of a plurality of sync blocks used as a forward synchronization signal in a wireless communication system including: primary synchronization channel sequences which provide timing information of the sync blocks and a plurality of secondary synchronization channel sequences which provide timing information of the frame, wherein the plurality of secondary synchronization channel sequences specify hopping code words that are one-to-one mapped to cell identifiers Advantageous Effects According to the present invention, the cell searching time consumed by a mobile station can be reduced and a cell searching method that is performed in a low-complexity can be executed in an Orthogonal Frequency Division Multiplexing (OFDM) cellular system.

Also, synchronization can be obtained with lower complexity by using a method of transmitting a forward synchronization signal according to the present invention.

In addition, a search process for an adjacent cell can be efficiently performed by using the method of transmitting a forward synchronization signal according to the present in so that handover is smoothly accomplished and the battery consumption of the mobile station can be reduced.

Moreover, according to the method of transmitting a forward synchronization signal of the present invention, OFDM symbol synchronization, a long scrambling code group ID, 10 msec frame boundary, and frequency offset can be estimated only with one synchronization channel.

DESCRIPTION OF THE DRAWINGS

FIG. 3 illustrates a third method of allocating a code in a cellular system according to an embodiment of the present invention;

FIG. 4 illustrates a fourth method of allocating a code in a cellular system according to an embodiment of the present invention;

FIGS. 12A and 12B are time domain concept diagrams of an Orthogonal Frequency Division Multiplexing (OFDM) symbol structure having a short CP and a long CP, respectively;

FIG. 15A, FIG. 15B, FIG. 15C, and FIG. 15D are a concept diagram illustrating that there is a still timing ambiguity on a secondary synchronization channel when a primary synchronization channel and a secondary synchronization channel are placed by Time Division Multiplexing (TDM) based on a sub-frame boundary;

FIG. 16A, FIG. 16B, FIG. 16C, and FIG. 16D illustrate an example for explaining a method of resolving the problem of FIG. 15A, FIG. 15B, FIG. 15C, and FIG. 15D when the primary synchronization channel is placed at the end of a sub-frame and the secondary synchronization channel is placed at the front of a next sub-frame;

BEST MODE

Figure 1:
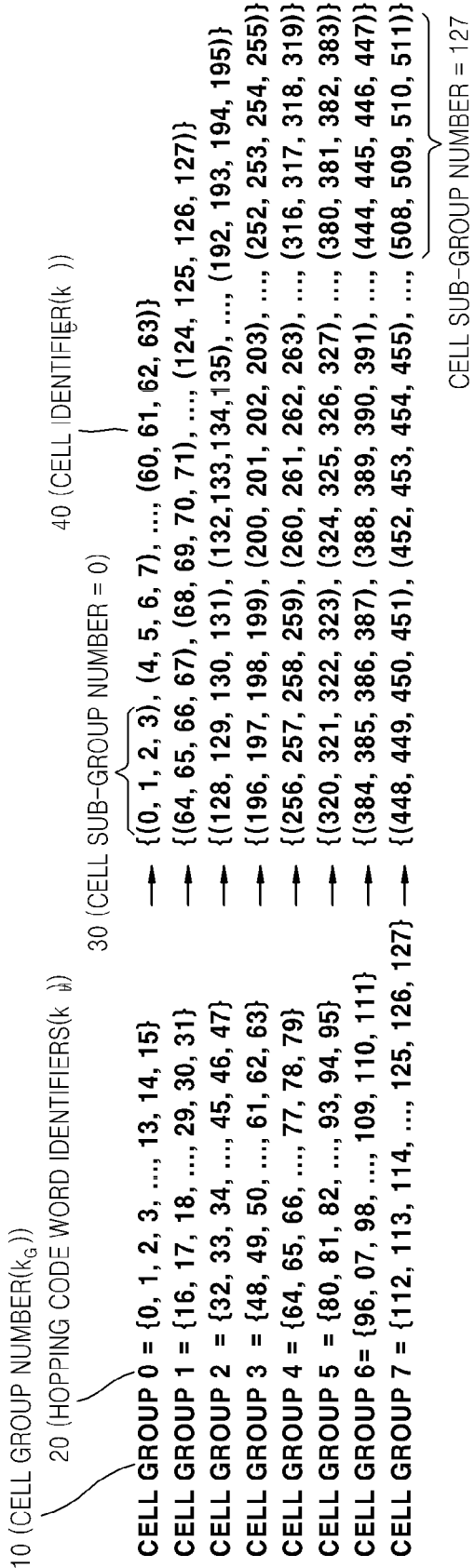
FIG. 1 illustrates a first method of allocating a code in a cellular system according to an embodiment of the present invention.

According to an aspect of the present invention, there is provided a method of transmitting a forward synchronization signal in a wireless communication system, the method including: generating a frame comprised of a plurality of sync blocks; and transmitting the frame through a forward link, wherein the frame comprises primary synchronization channel sequences which provide timing information of the sync blocks and a plurality of secondary synchronization channel sequences which provide timing information of the frame, wherein a cell identifier is specified by a combination of the primary synchronization channel sequence and a hopping code word specified by the plurality of the secondary synchronization channel sequences.

The hopping code word may select a part of the cell identifiers used in the wireless communication system and the primary synchronization channel sequence may specify one cell identifier from among the part of the cell identifiers selected by the hopping code word.

Multiplication of the number of primary synchronization channel sequences and the number of the hopping code words may be the same as the number of the cell identifiers used in the wireless communication system.

The primary synchronization channel sequence may be selected from the plurality of the primary synchronization channel sequences used in the wireless communication system.

The primary synchronization channel sequence may be repeatedly located at the same position in each of the sync blocks in the frame.

The primary synchronization channel sequences and the secondary synchronization channel sequences may be located by a TDM method in adjacent symbol sections in the frame.

The primary synchronization channel sequences and the secondary synchronization channel sequences may be located by a FDM method in the same symbol section in the frame.

According to another embodiment of the present invention, there is provided a method of transmitting a forward synchronization signal in a wireless communication system, the method including: generating a frame comprised of a plurality of sync blocks; and transmitting the frame through a forward link, wherein the frame comprises primary synchronization channel sequences which provide timing information of the sync blocks and a plurality of secondary synchronization channel sequences which provide timing information of the frame and the plurality of the secondary synchronization channel sequences specify hopping code words that are one-to-one mapped to cell identifiers.

The primary synchronization channel sequence may be selected from the plurality of the primary synchronization channel sequences used in the wireless communication system and selects a part of the cell identifiers used in the wireless communication system.

The primary synchronization channel sequences may be repeatedly located at the same position in each of the sync blocks in the frame.

The primary synchronization channel sequences may be located at the same position in each of the sync blocks in the frame.

The primary synchronization channel sequences and the secondary synchronization channel sequences may be located by a TDM method in adjacent symbol sections in the frame.

The primary synchronization channel sequences and the secondary synchronization channel sequences may be located by a FDM method in the same symbol section in the frame.

According to another embodiment of the present invention, there is provided a method of detecting cell identifiers by using a forward synchronization signal in a wireless communication system, the method including: receiving a frame comprised of a plurality of sync blocks; extracting a sync block timing from primary synchronization channel sequence included in the frame, frame timing from a plurality of secondary synchronization channel sequences included in the frame, and a hopping code word specified by the plurality of the secondary synchronization channel sequences; and detecting the cell identifier by combination of the primary synchronization channel sequence and the hopping code word.

The hopping code word may be used to select a part of the cell identifiers used in the wireless communication system and the primary synchronization channel sequence may be used to detect one cell identifier from among the part of the cell identifiers selected by the hopping code word.

All primary synchronization channel sequences and all hopping code words used in the wireless communication system may be used to detect the cell identifiers that are of the same number as a multiple of the number of primary synchronization channel sequences and the number of hopping code words.

The primary synchronization channel sequence selected from a plurality of the primary synchronization channel sequences used in the wireless communication system may be used to detect the cell identifier.

According to another embodiment of the present invention, there is provided an apparatus for transmitting a forward synchronization signal in a wireless communication system, the apparatus including: a frame generating unit generates a frame comprised of a plurality of the sync blocks, wherein the frame comprising primary synchronization channel sequences which provide timing information of sync blocks and a plurality of secondary synchronization channel sequences which provides timing information of the frame, wherein a cell identifier is specified by a combination of the primary synchronization channel sequence and a hopping code word specified by the plurality of the secondary synchronization channel sequences; and a frame transmitting unit transmits the frame through a forward link.

The hopping code word may select a part of the cell identifiers used in the wireless communication system and the primary synchronization channel sequence may specify one cell identifier from among the part of the cell identifiers selected by the hopping code word.

Multiplication of the number of primary synchronization channel sequences and the number of hopping code words may be the same as the number of cell identifiers used in the wireless communication system.

The primary synchronization channel sequence may be selected from the plurality of the primary synchronization channel sequences used in the wireless communication system.

The primary synchronization channel sequence may be repeatedly located at the same position in each of the sync blocks in the frame.

The primary synchronization channel sequences and the secondary synchronization channel sequences may be located by a TDM method in adjacent symbol sections in the frame.

The primary synchronization channel sequences and the secondary synchronization channel sequences may be located by a FDM method in the same symbol section in the frame.

According to another embodiment of the present invention, there is provided an apparatus for transmitting a forward synchronization signal in a wireless communication system, the apparatus including: a frame generating unit generates a frame comprised of a plurality of the sync blocks, wherein the frame comprising primary synchronization channel sequences which provide timing information of sync blocks and a plurality of secondary synchronization channel sequences which provide timing information of the frame, wherein the plurality of secondary synchronization channel sequences specify hopping code words that are one-to-one mapped to cell identifiers; and a frame transmitting unit transmits the frame through a forward link.

The primary synchronization channel sequence may be selected from the plurality of the primary synchronization channel sequences used in the wireless communication system and may select a part of the cell identifiers used in the wireless communication system.

The primary synchronization channel sequence may be repeatedly located at the same position in each of the sync blocks in the frame.

The primary synchronization channel sequences and the secondary synchronization channel sequences may be located by a TDM method in adjacent symbol sections in the frame.

The primary synchronization channel sequences and the secondary synchronization channel sequences may be located by a FDM method in the same symbol section in the frame.

According to another embodiment of the present invention, there is provided an apparatus of detecting cell identifiers using a forward synchronization signal in a wireless communication system, the apparatus including: a frame receiving unit which receives a frame comprised of a plurality of sync blocks; wherein a sync block timing is extracted from primary synchronization channel sequence included in the frame and a frame timing is extracted from a plurality of secondary synchronization channel sequences included in the frame, wherein a cell identifier is detected by a combination of the primary synchronization channel sequence and a hopping code word specified by the plurality of the secondary synchronization channel sequences.

The hopping code word may be used to specify a part of the cell identifiers used in the wireless communication system and the primary synchronization channel sequence may be used to detect one cell identifier from among the part of the cell identifiers specified by the hopping code word.

The primary synchronization channel sequence and the hopping code word used in the wireless communication system may be used to detect the cell identifiers that are of the same number as a multiple of the number of primary synchronization channel sequences and the number of hopping code words.

The primary synchronization channel sequence selected from a plurality of the primary synchronization channel sequences used in the wireless communication system may be used to detect the cell identifier.

According to another embodiment of the present invention, there is provided a forward link frame comprised of a plurality of sync blocks used as a forward synchronization signal in a wireless communication system, the forward link frame including: primary synchronization channel sequences which provide timing information of the sync blocks and a plurality of secondary synchronization channel sequences which provide timing information of the frame, wherein a cell identifier is specified by a combination of the primary synchronization channel sequence and a hopping code word specified by the plurality of the secondary synchronization channel sequences.

The hopping code word may be used to specify a part of the cell identifiers used in the wireless communication system and the primary synchronization channel sequence may be used to detect one cell identifier from among the part of the cell identifiers specified by the hopping code word.

Multiplication of the number of primary synchronization channel sequences and the number of hopping code words may be the same as the number of cell identifiers used in the wireless communication system.

The primary synchronization channel sequence may be selected from the plurality of the primary synchronization channel sequences used in the wireless communication system.

The primary synchronization channel sequence may be repeatedly located at the same position in each of the sync blocks in the frame.

The primary synchronization channel sequences and the secondary synchronization channel sequences may be located by a TDM method in adjacent symbol sections in the frame.

The primary synchronization channel sequences and the secondary synchronization channel sequences may be located by a FDM method in the same symbol section in the frame.

According to another embodiment of the present invention, there is provided a forward link frame comprised of a plurality of sync blocks used as a forward synchronization signal in a wireless communication system including: primary synchronization channel sequences which provide timing information of the sync blocks and a plurality of secondary synchronization channel sequences which provide timing information of the frame, wherein the plurality of secondary synchronization channel sequences specify hopping code words that are one-to-one mapped to cell identifiers.

The primary synchronization channel sequence may be selected from the plurality of the primary synchronization channel sequences used in the wireless communication system and may select a part of the cell identifiers used in the wireless communication system.

The primary synchronization channel sequence may be repeatedly located at the same position in each of the sync blocks in the frame.

The primary synchronization channel sequences and the secondary synchronization channel sequences may be located by a TDM method in adjacent symbol sections in the frame.

The primary synchronization channel sequences and the secondary synchronization channel sequences may be located by a FDM method in the same symbol section in the frame.

Mode of the Invention

A cell searching apparatus of a mobile station according to an embodiment of the present invention may be varied according to a method of allocating a synchronization channel code of the present invention which allows the mobile station to easily search for a cell in a cellular system.

A synchronization channel is classified into a Primary Synchronization Channel (P-SCH) and a Secondary Synchronization Channel (S-SCH). The method of allocating a synchronization channel code according to the present invention is a method which takes into account how the code sequences of the primary synchronization channel and the secondary synchronization channel are allocated according to a cell identifier and may be a kind of cellular code planning method.

Hereinafter, the method of allocating a synchronization channel code or the cellular code planning method is simply referred to as a "method of allocating a code."

The method of allocating a code according to the present invention introduces a two-step grouping concept which divides the cell identifiers used in a system into more than one cell group and divides each of the cell groups again into more than one cell sub-group.

Figure 2:
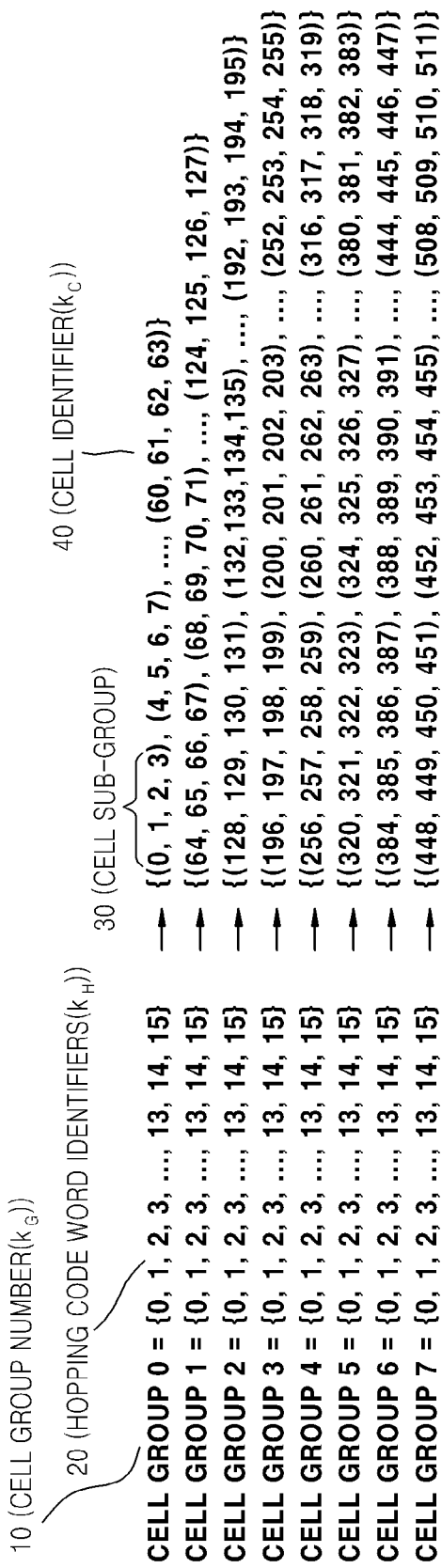
FIG. 2 illustrates a second method of allocating a code in a cellular system according to an embodiment of the present invention.

FIGS. 1 and 2 show examples of the method of allocating a code illustrating a concept of a two-step cell grouping.

In other words, when it is assumed that 512 cell identifiers are present in the system of FIGS. 1 and 2, each cell identifier is firstly divided into 8 cell groups 10, and then the 8 cell groups 10, which each include 64 cell identifiers 40, are divided into 16 cell sub-groups 30. In this case, there are four cell identifiers in each of the cell sub-groups 30.

In the method of allocating a code in each cell of the cellular system, information about the cell groups 10 that corresponds to the cell identifiers 40 allocated to each cell is sent through the primary synchronization channel and information about the cell sub-groups 30 is sent through the secondary synchronization channel.

FIG. 1 illustrates a first method of allocating a code in a cellular system according to an embodiment of the present invention.

In the first method of allocating a code in each cell of the cellular system according to the current embodiment of the present invention, sequences that have a one-to-one correspondence to the cell groups 10 corresponding to the cell identifiers 40 allocated to each cell are used as the primary synchronization channel sequence and hopping code words that have a one-to-one correspondence to the cell sub-groups 30 are used as hopping code words 20 of the secondary synchronization channel.

That is, the number of the primary synchronization channel sequences used in the system is the same as the number of the cell groups and the number of the hopping code words of the secondary synchronization channel used in the system is the same as the number of the cell sub-groups 30.

In FIG. 1, the number of hopping code words is 128, as is the total number of the cell sub-groups 30. The primary synchronization channel sequence and the hopping code words in the secondary synchronization channel will be described in more detail later.

FIG. 2 illustrates a second method of allocating a code in a cellular system according to an embodiment of the present invention.

In the second method of allocating a code in each cell of the cellular system according to the current embodiment of the present invention in FIG. 2, like the first method of allocating a code, sequences that have a one-to-one correspondence to the cell groups 10 corresponding to the cell identifiers 40 allocated to each cell are used as the primary synchronization channel sequence. However, different hopping code words are used in a single cell group 10 as hopping code words 20 of the secondary synchronization channel but the same hopping code words may be re-used in the other cell groups 10.

In this case, the number of the primary synchronization channel sequences used in the system is the same as the number of the cell groups and the number of the hopping code words of the secondary synchronization channel used in the system is the same as the value obtained by dividing the number of cell sub-groups 30 into the number of the cell groups 10.

FIG. 3 shows an example in which there is one cell identifier per cell sub-group in the first method of allocating a code. This case does not depart from the scope of the present invention. In this case, hopping code words of the secondary synchronization channel one-to-one correspond to the cell identifiers. For convenience, the case illustrated in FIG. 3 is referred to as a "third method of allocating a code."

According to the third method of allocating a code, the number of the cell identifiers is the same as the number of hopping code words of the secondary synchronization channel, as the primary synchronization channel sequence designates a part of the cell identifiers, that is, a part of the hopping code words of the secondary synchronization channel.

For example, when the total number of cell identifiers is 128, the cell identifiers are one-to-one mapped to the hopping code words of the secondary synchronization channel and when the number of cell groups (that is, the primary synchronization channel sequence) is 8 as in FIG. 3, each primary synchronization channel sequence selects 16 cell identifiers, that is, 16 hopping code words in the secondary synchronization channel.

In this case, a time domain correlation is performed with respect to a plurality of primary synchronization channel sequences in a first cell searching process and information on the primary synchronization channel sequences is obtained as well as sync block synchronization. In a second cell searching process, correlation is performed with respect to the 16 hopping code words of the secondary synchronization channel selected by the primary synchronization channel sequences obtained in the first cell searching process and thus the cell identifiers are obtained.

As in FIG. 3, when the sequence number of the primary synchronization channel obtained in the first cell searching process is 4 (that is, the cell group number is 4), correlation is performed with respect to only 16 hopping code words (that is, the hopping code words 64, 65, 66, . . . , 77, 78, 79 selected by the sequence number 4 of the primary synchronization channel) among 128 hopping code words of the secondary synchronization channel in the second cell searching process. Here, timing (boundary) information of a frame is obtained in the second cell searching process.

FIG. 4 shows an example in which there is one cell identifier per cell sub-groups in the second method of allocating a code. This case does not depart from the scope of the present invention. For convenience, the case illustrated in FIG. 4 is referred to as a "fourth method of allocating a code."

According to the fourth method of allocating a code, the number of the cell identifiers can be allocated to be a multiplication of the number of the primary synchronization channel sequences (cell groups) and the number of the hopping code words of the secondary synchronization channel.

For example, when the total number of the cell identifiers is 128, each cell identifier can be expressed as a combination of 8 primary synchronization channel sequences and 16 hopping code words of the secondary synchronization channel (hopping code word identifiers) (that is, 128=8×16).

In this case, all cell identifiers are classified into 8 groups according to the primary synchronization channel sequences and each group is comprised of 16 cell identifiers. Each group (cell groups) is specified by each different primary synchronization channel sequence and the cell identifiers included in each group can be allocated to be one-to-one mapped to hopping code words of the secondary synchronization channel (hopping code word identifiers).

Here, for each 16 cell identifier included in the cell groups, each different hopping code word identifiers of the secondary synchronization channel are used and for each 8 cell groups, the hopping code word identifiers of the secondary synchronization channel can be re-used.

In addition, as in FIG. 4, 8 cell identifiers among total of 128 cell identifiers may be designated by the hopping code words (hopping code word identifiers) and then 1 cell identifier among the 8 cell identifiers may be finally specified by the primary synchronization channel sequence, since the same hopping code words are re-used in the cell groups 10 as in FIG. 2.

In this case, a time domain correlation is performed with respect to a plurality of primary synchronization channel sequences in a first cell searching process and the sequence numbers of the primary synchronization channel are obtained as well as sync block synchronization. Then, in a second cell searching process, a frame boundary and the hopping code word identifiers of the secondary synchronization channel are obtained so that the cell identifiers that are mapped to the sequence numbers of the primary synchronization channel obtained in the first cell searching process and the hopping code word identifiers of the secondary synchronization channel can be specified.

Ultimately, a combination of the sequence numbers of the primary synchronization channel and the hopping code word identifiers of the secondary synchronization channel obtains cell identifiers.

Figure 5A:
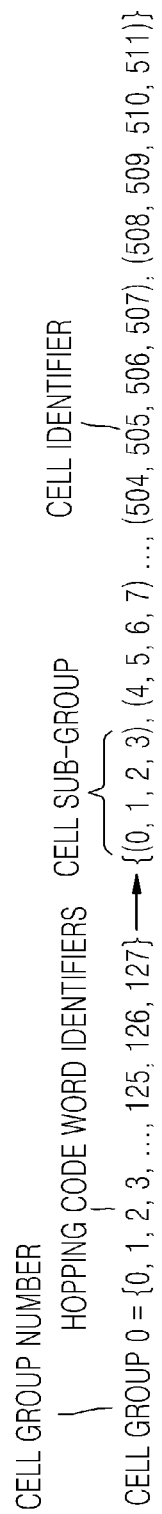
FIG. 5A illustrates a fifth method of allocating a code in a cellular system according to an embodiment of the present invention.

FIG. 5A shows an example in which there is one cell group in the first method of allocating a code. This case does not depart from the scope of the present invention. In this case, one primary synchronization channel sequence is used in the system. For convenience, the case illustrated in FIG. 5A is referred to as a "fifth method of allocating a code."

Figure 5B:
FIG. 5B illustrates a sixth method of allocating a code in a cellular system according to an embodiment of the present invention.

FIG. 5B shows an example in which there is one cell group and one cell identifier in the cell sub-group in the first method of allocating a code. This case does not depart from the scope of the present invention. In this case, one primary synchronization channel sequence is used in the system and the number of hopping code words of the secondary synchronization channel corresponds one-to-one to the number of the cell identifiers. For convenience, the case illustrated in FIG. 5B is referred to as a "sixth method of allocating a code."

Additionally, in the case of fifth and sixth methods of allocating a code, the number of the cell groups is 1 so that the primary synchronization channel sequence does not need to include information on the cell groups. Also, the number of primary synchronization channel sequences can be different to the number of cell groups.

Figure 6:
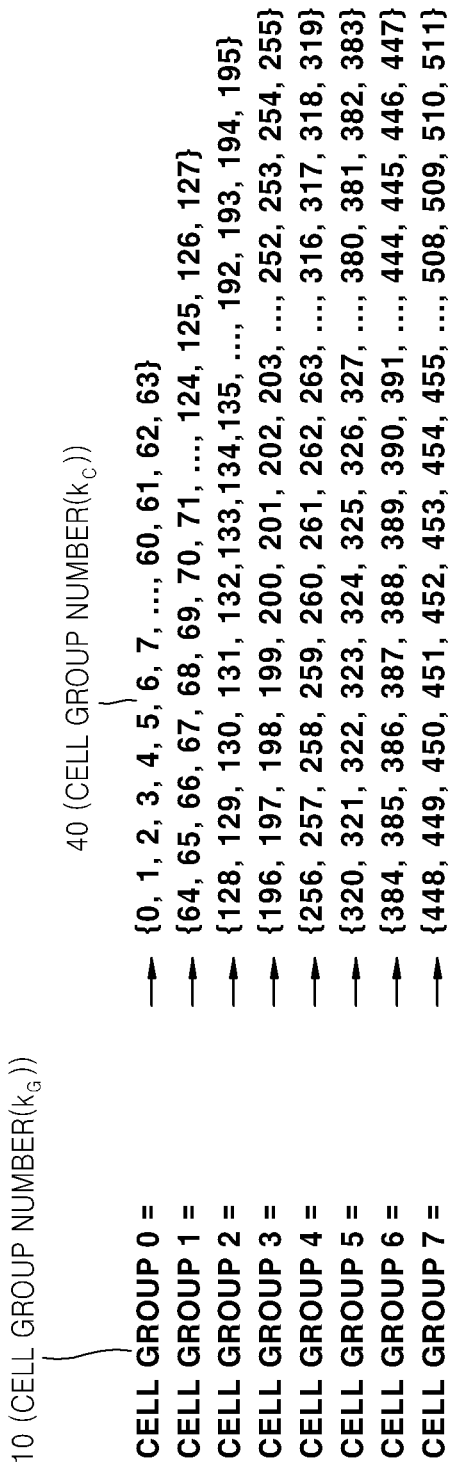
FIG. 6 illustrates a seventh method of allocating a code in a cellular system according to an embodiment of the present invention.

FIG. 6 shows another method of allocating a code according to an embodiment of the present invention in which the secondary synchronization channel is not used. In this case, the cell identifiers are group only by cell group information of the primary synchronization channel. For convenience, the case illustrated in FIG. 6 is referred to as a "seventh method of allocating a code."

As will be described later, in the seventh method of allocating a code, the cell searching apparatus of the mobile station obtains synchronization of the sync block by using the primary synchronization channel and then directly obtains the cell identifiers and timing (boundary) information of a frame by using a common pilot signal (or a reference signal) of a forward link.

In each of the cells in the cellular system, any one of the seven methods of allocating a code described above can be used and all cells should use the same method of allocating a code. That is, two arbitrary cells should not use the methods of allocating a code that are different to each other.

Figure 7:
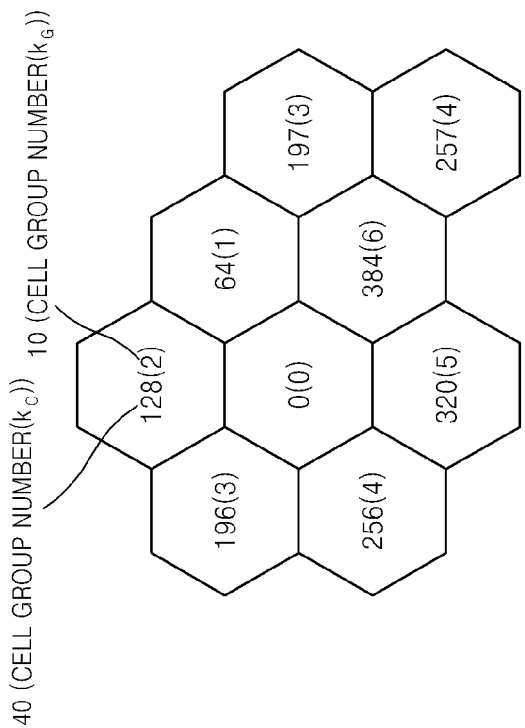
FIG. 7 illustrates a method of allocating cell identifiers to each cell with respect to the first method of allocating a code in a cellular system according to an embodiment of the present invention.

FIG. 7 illustrates a method of allocating the cell identifiers to each cell with respect to the first method of allocating a code according to an embodiment of the present invention. Technologies to be described below can be applied to the second through fourth methods of allocating a code, In FIG. 7, the cell identifiers included in each different cell group are allocated to two arbitrary adjacent cells. When the cell identifiers included in the same cell groups 10 are allocated to adjacent two cells, the primary synchronization channel sequences transmitted from two base stations are the same so that in the system, the timing may be uncertain in a synchronization mode of the base station in the first cell searching process of the mobile station.

That is, multipath information obtained as a result of the first cell searching process in which the mobile station uses the primary synchronization channel sequence is the sum of the primary synchronization channel sequences having the same sequences received from two adjacent base stations. Therefore, in the first or second method of allocating a code which defines a plurality of the cell groups 10, the cell identifiers included in each different cell group should be allocated to adjacent cells.

Different primary synchronization channel sequences are allocated to adjacent cells, since channel estimation values using the primary synchronization channel sequences are used during coherent demodulating of the secondary synchronization channel sequence in the second cell searching process. In this case, when the primary synchronization channel sequences are the same in adjacent cells, detection probability for the secondary synchronization channel sequences in the second cell searching process can be reduced.

In the case of the fifth and sixth methods of allocating a code, the number of primary synchronization channel sequences does not need to be the same as the number of the cell groups (1) so that a plurality of the primary synchronization channel sequences is used and different primary synchronization channel sequences are located in adjacent cells, thereby obtaining the same effect as above.

Meanwhile, when the number of the primary synchronization channel sequences (or the number of the cell groups) is less than 8, the primary synchronization channel sequences (or the cell groups) are dispersed under a fixed rule and can be allocated to each cell.

Since there is one cell group, if the number of primary synchronization channel sequences is 1, timing may be uncertain in the first cell searching process. Therefore, in this case, a plurality of the primary synchronization channel sequences can be allocated to each cell as in FIG. 7.

The present invention relates to a cell searching method including synchronization obtaining in the OFDM cellular system, timing (boundary) detecting, and cell identifiers detecting.

The term "synchronization obtaining" includes timing of synchronization channel symbol of the frame detecting, timing of sync block detecting, and boundary of sync block detecting and will be used in this specification.

The term "synchronization information" includes information on timing of synchronization channel symbol, timing of sync block, and boundary of sync block and will be used in this specification.

The term "timing (boundary) of a frame detecting" indicates that timing of the frame boundary is detected and will be used in this specification.

The term "timing (boundary) information of a frame" includes information on the timing of the frame boundary and will be used in this specification.

The term "cell group detecting" includes detecting the cell group identifiers and the cell groups and will be used in this specification.

The term "cell group information" includes information on the cell group identifiers and the cell groups and will be used in this specification.

The term "cell identifier detecting" includes detecting the cells or cell identifiers and will be used in this specification.

The "synchronization channel sequence" according to the present invention indicates a set of synchronization channel "chips" that are mapped to a subcarrier occupied by the synchronization channel symbol in a frequency domain. In the case of the primary synchronization channel sequences, the same sequences are used on each primary synchronization channel symbol. In the case of the secondary synchronization channel, each different sequence is used on each secondary synchronization channel symbol. The sequence number of the secondary synchronization channel used on each secondary synchronization channel symbol in the frame corresponds to element index corresponding to each symbol location of the hopping code words allocated to the cells.

The hopping code words according to the present invention are M-ary hopping sequences used for sequence hopping of the secondary synchronization channel sequences. In embodiments of the present invention, the length of the hopping code word is 5, the length of the hopping code word is the same as the number of synchronization channel symbols per 10 msec frame, the number of values which can be held by each element is 40 (that is, the size of alphabet of the hopping code word M=40), and the number of secondary synchronization channel sequences given by each element of the hopping code word is the same as the number of values (40) which can be held by each element of the hopping code word. In the base station, the same secondary synchronization channel sequence hopping pattern, that is, the hopping code words, are used in each frame.

A set of the hopping code words used in the system is called a hopping code. Also, the hopping code word identifier numbers the hopping code words and specifies information.

As in FIGS. 1, 3, and 5, when the number of hopping code words used in the system is 128 and the number of synchronization channel symbols in the frame is 5, the secondary synchronization channel sequence hopping pattern with respect to each group, that is, hopping code word, is numbered and the hopping code word identifiers are represented as in a range of integers of 0 to 127.

As in FIG. 2 or FIG. 4, when the number of hopping code words is 16, the hopping code word identifiers are represented by integers of 0 to 15.

For convenience, the term "Fourier Transform" is used in this specification to include discrete fourier transform and fast fourier transform.

Figure 8:
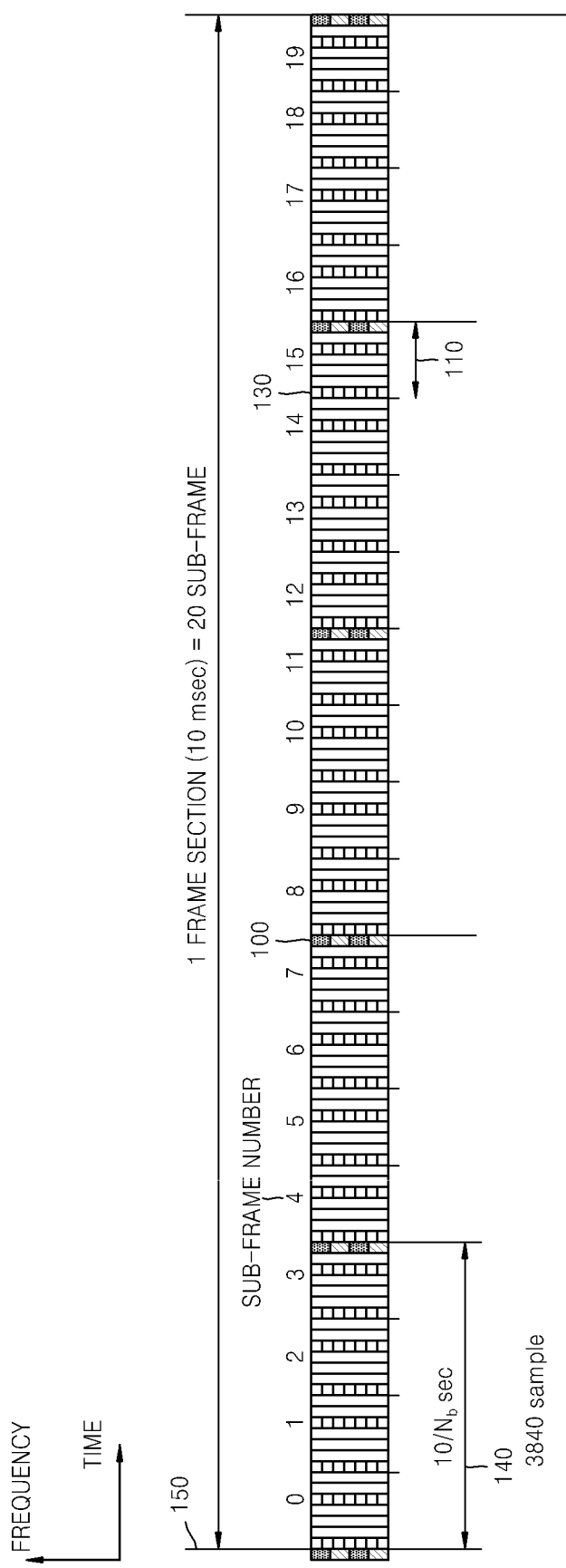
FIG. 8 illustrates a forward link frame in which a primary synchronization channel and a secondary synchronization channel are formed by Frequency Division Multiplexing (FDM)

FIG. 8 illustrates a forward link frame in which the primary synchronization channel and the secondary synchronization channel are formed by Frequency Division Multiplexing (FDM).

Referring to FIG. 8, each forward link frame has duration of 10 msec and is formed of 20 sub-frames 110. In FIG. 8, a horizontal axis is a time axis and a vertical axis is a frequency (OFDM subcarrier) axis.

The length of each sub-frame is 0.5 msec and 7 or 6 OFDM symbol sections 120 are included in the sub-frames. When the number of symbols per sub-frame is 6, the sub-frame can provide a service such as Multimedia Broadcast and Multicast Service (MBMS). In this case, the length of cyclic prefix is greater than when the number of symbols per sub-frames is 7. Each sub-frame includes or does not include 1 synchronization channel symbol 100.

As in FIG. 8, one synchronization channel OFDM symbol section 100 exists in every four sub-frames and a total of 5 synchronization channel OFDM symbol sections 100 exist in one frame (10 msec). In this case, a repetition cycle 140 of the synchronization channel symbol is the same as the length obtained by adding four sub-frames so that the total number of the repetition cycles 140 of the synchronization channel symbols is 5. For convenience, a repetition cycle 140 of the synchronization channel symbol is called a sync block 140.

That is, in FIG. 8, the number of sync blocks 140 in one frame (10 msec) is 5. The synchronization channel symbols can be located in anywhere in the sync block 140, however, the location of the synchronization channel symbol should be the same in each sync block.

In addition, as mentioned above, the number of symbols per sub-frames can be 6 or 7. In this case, in order to have no connection with the length of cyclic prefix which may be different to each other, the location of the synchronization channel symbol should be at the end of the sub-frame. The detailed description thereof will be described later.

In FIG. 8, a cell's own scrambling codes are multiplied in a frequency domain to distinguish each cell with respect to OFDM symbols except for the synchronization channel symbol and the scrambling code numbers which are one-to-one mapped to the cell identifiers.

Figure 9:
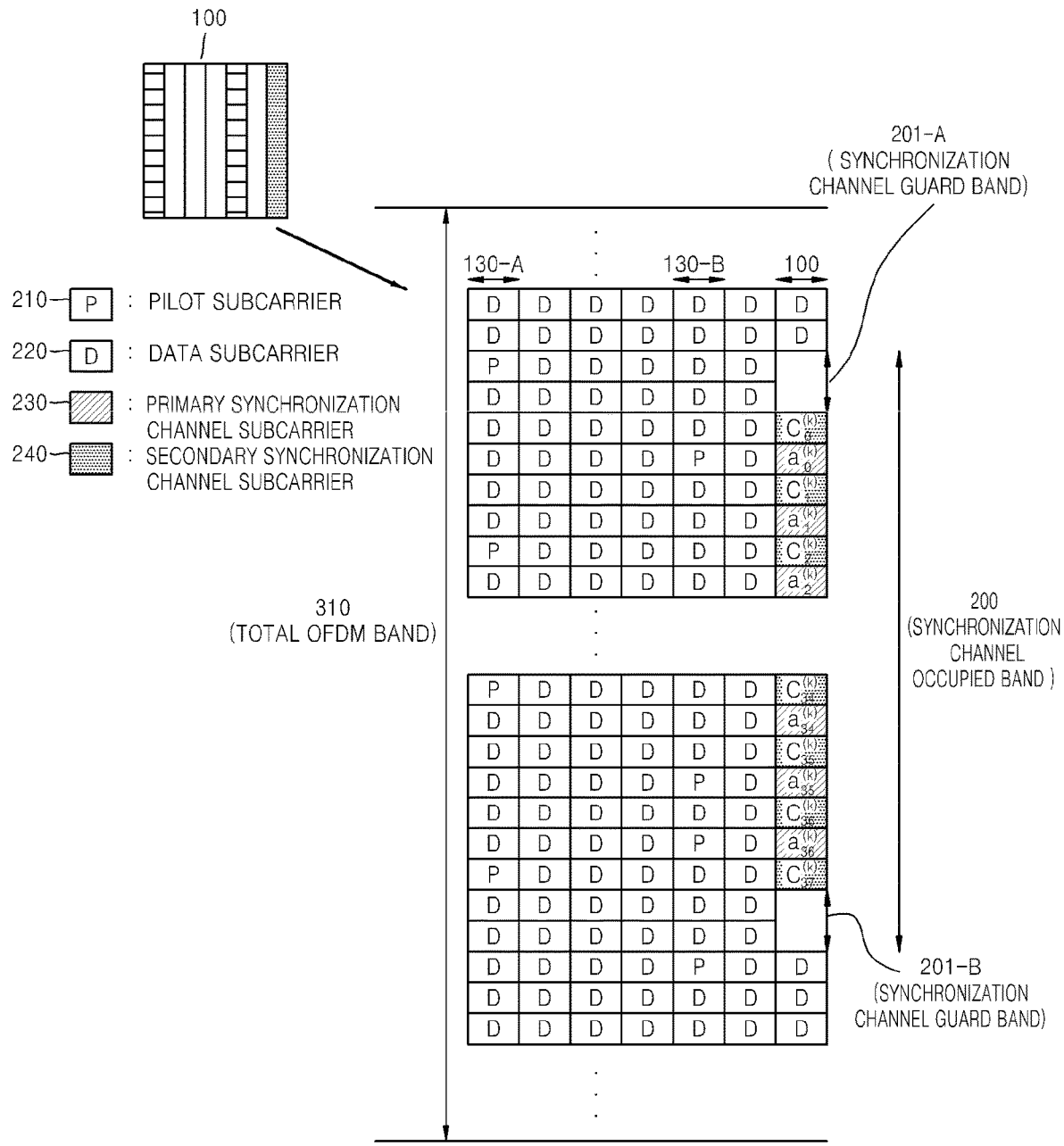
FIG. 9 illustrates a forward link sub-frame in which a primary synchronization channel and a secondary synchronization channel are formed by Frequency Division Multiplexing (FDM)

FIG. 9 illustrates a forward link sub-frame including the synchronization channel symbol in which the primary synchronization channel and the secondary synchronization channel are formed by Frequency Division Multiplexing (FDM).

According to the sub-frame of FIG. 9, a first OFDM symbol section 130-A and a fifth OFDM symbol section 130-B include a pilot subcarrier 210 and a data subcarrier 220 in a FDM form. The last symbol section 100 includes primary and secondary synchronization channel subcarriers 230 and 240, synchronization channel guard bands 201-A and 201-B, and the data subcarrier 220 in a FDM form.

For convenience, the first OFDM symbol section 130-A and the fifth OFDM symbol section 130-B including the pilot subcarrier 210 are called a pilot symbol section and the last symbol section 100 including the primary and secondary synchronization channel subcarriers 230 and 240 is called a synchronization channel symbol section.

In the remaining symbol section except for the pilot symbol sections 130-A and 130-B and the synchronization channel symbol section 100, a data subcarrier 220 is transmitted. In the case of the sub-frames in which the synchronization channel symbol section is not included, only the data subcarrier 220 is transmitted in the last sub-frame.

As shown in FIG. 9, a synchronization channel occupied band 200 is formed of the primary and secondary synchronization channel subcarriers 230 and 240 and the synchronization channel guard bands 201-A and 201-B and uses only a part of the whole system bandwidth 310. The detailed description thereof will be mentioned later.

Referring to FIG. 9, the synchronization channel which uses one OFDM symbol section from among various OFDM symbol sections in the sub-frame divides the part where the synchronization channel guard bands 201-A and 201-B are excluded in the synchronization channel occupied band 200 into the primary synchronization channel and the secondary synchronization channel in a FDM form.

FIG. 9 is an example of the FDM method. When total number of subcarriers allocated to the synchronization channel is 75, except for a DC subcarrier, 37 subcarriers are allocated to the primary synchronization channel and 38 subcarriers are allocated to the secondary synchronization channel.

In FIG. 9, $a^{(g)}=[a^{(g)}_0, a^{(g)}_1, a^{(g)}_{36}]$ indicates the primary synchronization channel sequence that corresponds to g that is the cell groups number 10 described while defining the first through sixth method of allocating a code above.

The elements of the primary synchronization channel sequence, that is, $a^{(k)}_0, a^{(k)}_1, a^{(k)}_2, \ldots, a^{(k)}_{36}$, have complex values or real number values and are allocated to the primary synchronization channel subcarrier 230 to be transmitted as illustrated in FIG. 9.

An arbitrary sequence can be used as the primary synchronization channel sequence, however, autocorrelation and cross correlation thereof should be excellent when the primary synchronization channel sequence is changed to a time domain signal.

The time domain signal component of the primary synchronization channel sequence may have complex values or real number values. The sequences that are different to each other in the primary synchronization channel sequence are allocated by each cell group and the same sequences are used on the synchronization channel symbol in all sync blocks in all frames transmitted to the forward link.

A receiver of a mobile station can introduce an accumulation technology by using the characteristic of the primary synchronization channel in order to obtain synchronization of the sync block 140 in the first cell searching process. This will be described more fully later.

Meanwhile, in FIG. 9, $C^{(k)}=[c^{(k)}_0, c^{(k)}_1, c^{(k)}_2, \ldots, c^{(k)}_{37}]$ indicates the secondary synchronization channel sequence in which the element index of the hopping code words corresponding to the synchronization channel symbol is "k".

The elements of the secondary synchronization channel sequence, that is, $c^{(k)}_0, c^{(k)}_1, c^{(k)}_2, \ldots, c^{(k)}_{37}$, may have complex values or real number values and are allocated to the secondary synchronization channel subcarrier 240 to be transmitted as illustrated in FIG. 9.

An arbitrary sequence can be used as the secondary synchronization channel sequence. Here, Generalized Chirp Like (GCL) sequence defined as in Equation 1 can be used.

$$C^{(k)}_n = \exp\left\{-j2\pi(k+1)\frac{n(n+1)}{2N}\right\}, \quad \text{[Equation 1]}$$
$$n = 0, 1, 2, \ldots, N-1, \quad k = 0, 1, 2, \ldots, N-2$$

Here, k is given by arbitrary index of elements of the hopping code words and is referred to as the secondary synchronization channel sequence number. $c^{(k)}_n$ indicates $n^{th}$ element of the secondary synchronization channel sequence having the sequence number of k.

N is a length of the GCL sequence. In particular, each code length N in the GCL sequence is a prime number and total of N−1 sequences exist.

That is, when the GCL sequence is used, a set of the GCL sequence used in the system includes N−1 GCL sequences. In addition, the number of GCL sequences is the same as the size of alphabet of the hopping code words. The size of alphabet of the hopping code words will be described later.

The GCL sequence defined by Equation 1 is only an example of a sequence which can be used as the secondary synchronization channel sequence, and other sequences except for the GCL sequence, for example, a Gold sequence, a longest sequence, or a combination thereof can be used.

Meanwhile, except for the DC subcarrier, the number of subcarriers in the synchronization channel occupied band is 75. When 38 subcarriers from among 75 subcarriers are used as the secondary synchronization channel in the FDM method of FIG. 8, 38 carriers can be allocated.

In this case, since 38 is not a prime number, any one number that is the same or greater than 38 should be used as N which is the length of the GCL sequence. In the current embodiment, N is 41.

In FIG. 9, the number of secondary synchronization channel subcarriers is 38 and is less than the number of GCL sequence, 41, so that the last three chips among 41 are not transmitted.

The secondary synchronization channel sequences that correspond to each of the secondary synchronization channel symbols in the frame are specified by the element index of the hopping code words. That is, the secondary synchronization channel sequences in the frame are formed in a sequence hopping form.

In other words, the base station maps each of the hopping code word elements onto each of the synchronization channel symbols in the frame so that the GCL sequence designated by the element index is allocated to the secondary synchronization channel sequence of the corresponding synchronization channel symbol to be transmitted. The mobile station detects the hopping code word identifiers (numbers) implied in the synchronization channel symbols that is transmitted by a target base station.

Here, examples of the target base station include a base station that is searched by the mobile station at an initial stage and an adjacent base station to be searched for handover.

In table 1 below, the number of hopping code words used in the system as in FIGS. 1, 3, and 5 is 128, the number of synchronization channel symbols in the frame is 5, and the secondary synchronization channel sequence hopping pattern with respect to each code group, that is, a set of the hopping code words is illustrated.

That is, 128 hopping pattern can be represented as a hopping code word having the length of 5 and the length of the hopping code word is the same as the number of synchronization channel symbols per 10 msec frame. A total set of hopping code words is defined as the hopping code.

As in FIG. 2 or FIG. 4, when the number of hopping code words is 16, only 16 hopping code words among 128 in Table 1 are used. Meanwhile, the base station uses the same synchronization channel hopping pattern (hopping code word) in each frame.

In the case of the first method of allocating a code in FIG. 1 and the fifth method of allocating a code in FIG. 5, the hopping code words that are different to each other are allocated according to the cell sub-groups 30. In the case of the third method of allocating a code in FIG. 3 and the sixth method of allocating a code in FIG. 5B, the hopping code words that are different to each other are allocated according to the cell identifiers.

On the other hand, in the second method of allocating a code in FIG. 2 and the fourth method of allocating a code in FIG. 4, the same hopping code words can be allocated to each different cell sub-groups or each different cell identifiers.

Meanwhile, in the seventh method of allocating a code in FIG. 6, the secondary synchronization channel is not transmitted so that the hopping code defined in Table 1 cannot be used.

Referring to table 1, each of the hopping code words is formed of five hopping code word elements. When there are four synchronization channel symbol section 100 per frame, the length of the hopping code words, that is, the number of elements, is 4.

Table 1 is only an example of the hopping codes and a Reed-Solomon (RS) code also can be used as the hopping codes.

TABLE 1

| hopping code word identifiers |
|---|
| 0: 4, 5, 6, 7, 8 |
| 1: 9, 10, 11, 12, 13 |
| 2: 14, 15, 16, 17, 18 |
| 3: 19, 20, 21, 22, 23 |
| 4: 24, 25, 26, 27, 28 |
| 5: 29, 30, 31, 32, 33 |
| 6: 34, 35, 36, 37, 38 |
| 7: 0, 2, 4, 6, 39 |
| 8: 35, 38, 0, 29, 32 |
| 9: 33, 36, 39, 1, 4 |
| 10: 5, 9, 13, 38, 1 |
| 11: 6, 12, 29, 35, 0 |
| 12: 36, 1, 18, 24, 30 |
| 13: 7, 13, 19, 25, 31 |
| 14: 2, 8, 14, 20, 37 |
| 15: 26, 32, 38, 3, 9 |

TABLE 1-continued hopping code
word identifiers

16: 21, 27, 33, 39, 15
17: 16, 22, 28, 4, 10
18: 32, 3, 37, 8, 20
19: 38, 31, 2, 14, 26
20: 20, 34, 7, 33, 6
21: 9, 11, 13, 15, 17
22: 19, 21, 23, 25, 27
23: 29, 31, 33, 35, 37
24: 8, 10, 12, 14, 16
25: 18, 20, 22, 24, 26
26: 28, 30, 32, 34, 36
27: 14, 17, 20, 23, 26
28: 3, 6, 9, 12, 15
29: 18, 21, 24, 27, 30
30: 7, 10, 13, 16, 19
31: 22, 25, 28, 31, 34
32: 19, 23, 27, 31, 35
33: 39, 2, 6, 10, 14
34: 18, 22, 26, 30, 34
35: 17, 21, 25, 29, 33
36: 37, 0, 4, 8, 12
37: 16, 20, 24, 28, 32
38: 24, 29, 34, 39, 3
39: 8, 13, 18, 23, 28
40: 33, 38, 2, 7, 12
41: 17, 22, 27, 32, 37
42: 1, 6, 11, 16, 21
43: 26, 31, 36, 0, 5
44: 10, 15, 20, 25, 30
45: 34, 0, 7, 14, 21
46: 28, 35, 1, 8, 15
47: 22, 29, 36, 2, 9
48: 16, 23, 30, 37, 3
49: 10, 17, 24, 31, 38
50: 4, 11, 18, 25, 32
51: 39, 5, 12, 19, 26
52: 39, 6, 14, 22, 30
53: 38, 5, 13, 21, 29
54: 37, 4, 12, 20, 28
55: 36, 3, 11, 19, 27
56: 35, 2, 10, 18, 26
57: 34, 1, 9, 17, 25
58: 33, 0, 8, 16, 24
59: 18, 30, 1, 13, 25
60: 15, 27, 39, 10, 22
61: 34, 5, 17, 29, 0
62: 12, 24, 36, 7, 19
63: 9, 21, 33, 4, 16
64: 28, 1, 15, 29, 2
65: 16, 30, 3, 17, 31
66: 4, 18, 32, 5, 19
67: 21, 35, 8, 22, 36
68: 9, 23, 37, 10, 24
69: 38, 11, 25, 39, 12
70: 33, 7, 22, 37, 11
71: 26, 0, 15, 30, 4
72: 19, 34, 8, 23, 38
73: 12, 27, 1, 16, 31
74: 5, 20, 35, 9, 24
75: 39, 13, 28, 2, 17
76: 32, 6, 21, 36, 10
77: 14, 35, 15, 36, 16
78: 3, 27, 34, 23, 8
79: 35, 17, 16, 6, 25
80: 3, 32, 25, 33, 5
81: 24, 20, 27, 0, 13
82: 31, 0, 16, 27, 5
83: 23, 0, 22, 2, 3
84: 36, 33, 16, 25, 2
85: 25, 11, 37, 26, 10
86: 11, 26, 24, 6, 17
87: 28, 18, 2, 37, 21
88: 0, 33, 37, 13, 30
89: 22, 32, 13, 0, 38
90: 34, 11, 21, 5, 14
91: 12, 4, 14, 23, 33
92: 29, 11, 4, 17, 5

TABLE 1-continued hopping code
word identifiers

93: 9, 1, 39, 28, 7
94: 18, 15, 2, 23, 31
95: 8, 28, 0, 39, 11
96: 5, 22, 8, 33, 15
97: 19, 37, 28, 29, 6
98: 1, 26, 20, 11, 14
99: 6, 5, 39, 38, 27
100: 37, 39, 35, 13, 17
101: 1, 24, 3, 29, 15
102: 10, 30, 25, 5, 28
103: 7, 29, 16, 15, 22
104: 37, 23, 11, 2, 29
105: 19, 14, 12, 39, 30
106: 34, 33, 20, 1, 23
107: 21, 8, 7, 6, 27
108: 17, 26, 3, 8, 32
109: 17, 35, 22, 12, 7
110: 15, 35, 14, 27, 25
111: 31, 37, 9, 6, 1
112: 26, 4, 23, 1, 32
113: 32, 12, 18, 29, 21
114: 30, 17, 38, 15, 37
115: 33, 22, 6, 24, 13
116: 4, 38, 33, 8, 34
117: 27, 37, 33, 32, 10
118: 13, 2, 11, 35, 34
119: 15, 14, 11, 7, 37
120: 29, 1, 27, 2, 38
121: 38, 16, 39, 29, 9
122: 9, 36, 24, 17, 28
123: 4, 0, 25, 9, 39
124: 8, 21, 11, 1, 20
125: 4, 36, 14, 13, 31
126: 39, 7, 25, 36, 32
127: 34, 2, 13, 8, 36

In the table above, the alphabet size of the hopping code is 40. That is, the hopping code element k that is mapped to the secondary synchronization channel sequence in each sync block is any number from 0 to 39.

For example, assuming that the first method of allocating a code is used in the system.

When the cell identifier of the current base station is 0, the cell identifier is included in cell sub-group 0 as in FIG. 1 and the hopping code words allocated to the cell sub-group 0 are {4, 5, 6, 7, 8} as in Table 1.

Ultimately, five secondary synchronization channel symbols transmitted per frame by the current base station have the hopping code word elements that are 4, 5, 6, 7, and 8, and values defined by Equation 1 are allocated to the subcarriers used by each of the synchronization channel symbols according to the hopping code word element index k. In particular, FIG. 1 shows an example when the code group identifier of the current base station is 0.

The 128 hopping code words are each different and are unique to all cyclic shifts. The hopping code words corresponding to code group 0 are {4, 5, 6, 7, 8} and the cyclic shifted pattern of the hopping code words are {5, 6, 7, 8, 4}, {6, 7, 8, 4, 5}, {7, 8, 4, 5, 6}, {8, 4, 5, 6, 7}.

Table 2 shows the cyclic shifted pattern of the hopping code words {4, 5, 6, 7, 8} and a cyclic shift index.

TABLE 2

| i-th cyclic shifted pattern | cyclic shift index |
|---|---|
| 0 cyclic shifted sequence = 4, 5, 6, 7, 8 | 0 |
| 1 cyclic shifted sequence = 5, 6, 7, 8, 4 | 1 |

TABLE 2-continued

| i-th cyclic shifted pattern | cyclic shift index |
| --- | --- |
| 2 cyclic shifted sequence = 6, 7, 8, 4, 5 | 2 |
| 3 cyclic shifted sequence = 7, 8, 4, 5, 6 | 3 |

The number of hopping code words which can be obtained by using 128 hopping code words and the cyclic shifted pattern of the hopping code words is 640(=5×128) and each of the hopping code words are unique.

That is, as illustrated in Table 1, the same sequence does not exist in all code words which can be obtained by using the hopping code words and the cyclic shifted pattern of the hopping code words used in the system for sequence hopping of the secondary synchronization channel. Uniqueness of all cyclic shifted hopping code words helps the mobile station to obtain information on the code groups in the second cell searching process and the 10 msec frame boundary.

The hopping codes according to the present invention may use hopping code sequences that are restricted by the number of clashes. Here, a clash means that elements of two arbitrary code words are the same.

For example, in Table 1, the elements of the hopping code words with identifier number 0, that is, 4, 5, 6, 7, 8, are different from the elements of the hopping code words with identifier number 7, that is, 0, 2, 4, 6, 39. In other words, the clash is "0." On the other hand, when the hopping code word identifier with number 7 are shifted by 2, 2 cyclic shifted sequence, that is, {4, 6, 39, 0, 2} clashes with the first element of the hopping code words {4, 5, 6, 7, 8} having the identifier number 0, that is, 4. In this case, the number of clashes is "1."

The number of clashes between the code words is related to a hamming distance.

For example, since the clash between two code words is "0," the hamming distance between two code words is the same as the sequence length (5 in Table 1). Accordingly, the number of clashes between two arbitrary code words is the same as the value in which the hamming distance is subtracted from the length of the code word. In Table 1, the minimum hamming distance between all cyclic shifted code words (that is, 640 code words) is 4.

In other words, the maximum number of clashes between arbitrary cyclic shifted code words is 1 or less. Accordingly, Equation 2 below is formed.

Minimum hamming distance=(length of the hopping code)−(clash of the hopping codes)  [Equation 2]

In the present invention, the hopping codes can include all cyclic shifted code words so that the number of clashes between two code words can be restricted. In other words, the minimum hamming distance can be restricted, for example, in the case when the terminal of the mobile station is applied to a dual mode terminal which simultaneously provides Global System for Mobile Communication (GSM) and the OFDM system.

In this case, in handover from GSM to the OFDM system, the clash of the hopping codes (that is, the number of clash between 640 cyclic shifted code words is less than 1, i.e., the minimum hamming distance is 4) helps the dual mode terminal to detect 10 msec frame synchronization and hopping code identifiers, even by using two synchronization channel symbols.

That is, the mobile station which demodulates the GSM forward link stops the GSM forward link for a while and receives a forward link signal of another system of another frequency. Accordingly, the cell searching time is approximately 4.6 msec.

When a GSM terminal receives a forward link signal during this time, the number of synchronization channel symbols which can be entered within 4.6 msec is 2 or 3 in the frame of FIG. 8. That is, the worst case is 2.

Ultimately, the dual mode terminal should receive only 2 synchronization channel symbols and detect 10 msec frame synchronization and the hopping code identifiers. However, when the number of clashes between all cyclic shifted code words of the hopping code words is greater than 2, 10 msec frame synchronization and the code groups cannot be detected.

Accordingly, when the length of the hopping code is 5 as in Table 1 (that is, when the number of secondary synchronization channel symbols per frame is 5), the maximum number of clashes between all cyclic shifted code words of the hopping code words should be less than 1 so that cell can be searched from GSM to the OFDM system and handover is possible.

When the number of synchronization channel symbols per 10 msec frame is 4 (that is, when the length of the hopping code is 4), the number of symbols which can be entered within 4.6 msec in FIG. 8 is 1 at the worst.

In this case, the maximum number of clashes between the cyclic shifted code words should be 0 (that is, the minimum hamming distance should be the same as the length of the hopping code, 4).

When the number of synchronization channel symbols per 10 msec frame is 10 (that is, when the length of the hopping code is 10), the number of symbols which can be seen within 4.6 msec in FIG. 8 is 4 at the worst. In this case, the maximum number of clashes between the cyclic shifted code words should be 3 (that is, the minimum hamming distance should be 7).

Ultimately, when the minimum number of the synchronization channel symbols which can be received during 4.6 msec transmission gap of GSM (In the case of the TDM method of FIG. 10, the number of secondary synchronization channel symbols) is Q, the maximum number of clashes between arbitrary cyclic shifted hopping code words of the hopping codes should be less than Q−1.

In other words, when the length of the hopping code is L, the minimum hamming distance should be greater than L−Q+1.

When the number of clashes between all cyclic shifted code words of the hopping code words is 0, the hopping code words and the frame boundary can be obtained by using only one secondary synchronization channel symbol. Accordingly, the case when the number of clashes between the cyclic shifted code words is 0 does not depart from the scope of the present invention.

In this case, the secondary synchronization channel sequence does not correspond to each sync block and each different sub-group.

Figure 10:
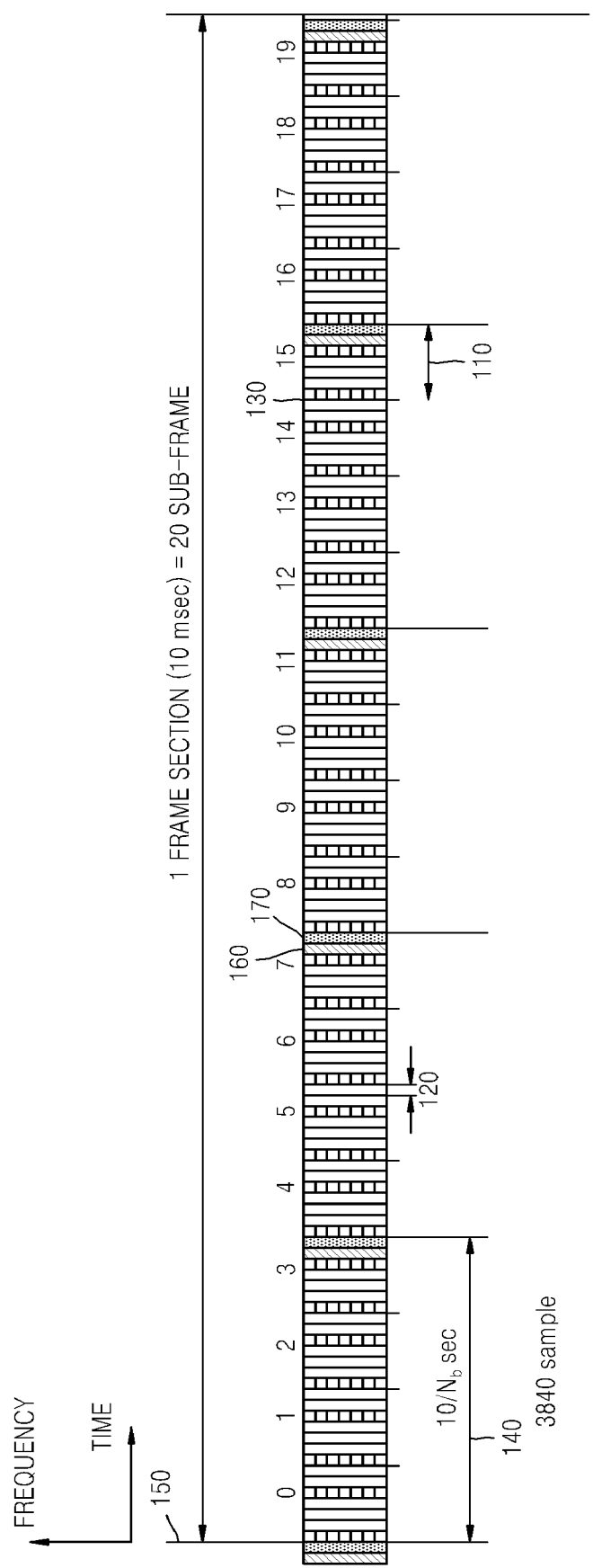
FIG. 10 illustrates a forward link frame in which a primary synchronization channel and a secondary synchronization channel are formed by Time Division Multiplexing (TDM)

FIG. 10 illustrates a forward link frame in which the primary synchronization channel and the secondary synchronization channel are formed by Time Division Multiplexing (TDM).

The concept of the TDM which performs sequence hopping to the secondary synchronization channel is the same as that of the FDM in FIG. 8. The difference from the FDM method is, a primary synchronization channel symbol 160 and a secondary synchronization channel symbol 170 occupy different locations in the TDM as shown in FIG. 10.

Figure 11:
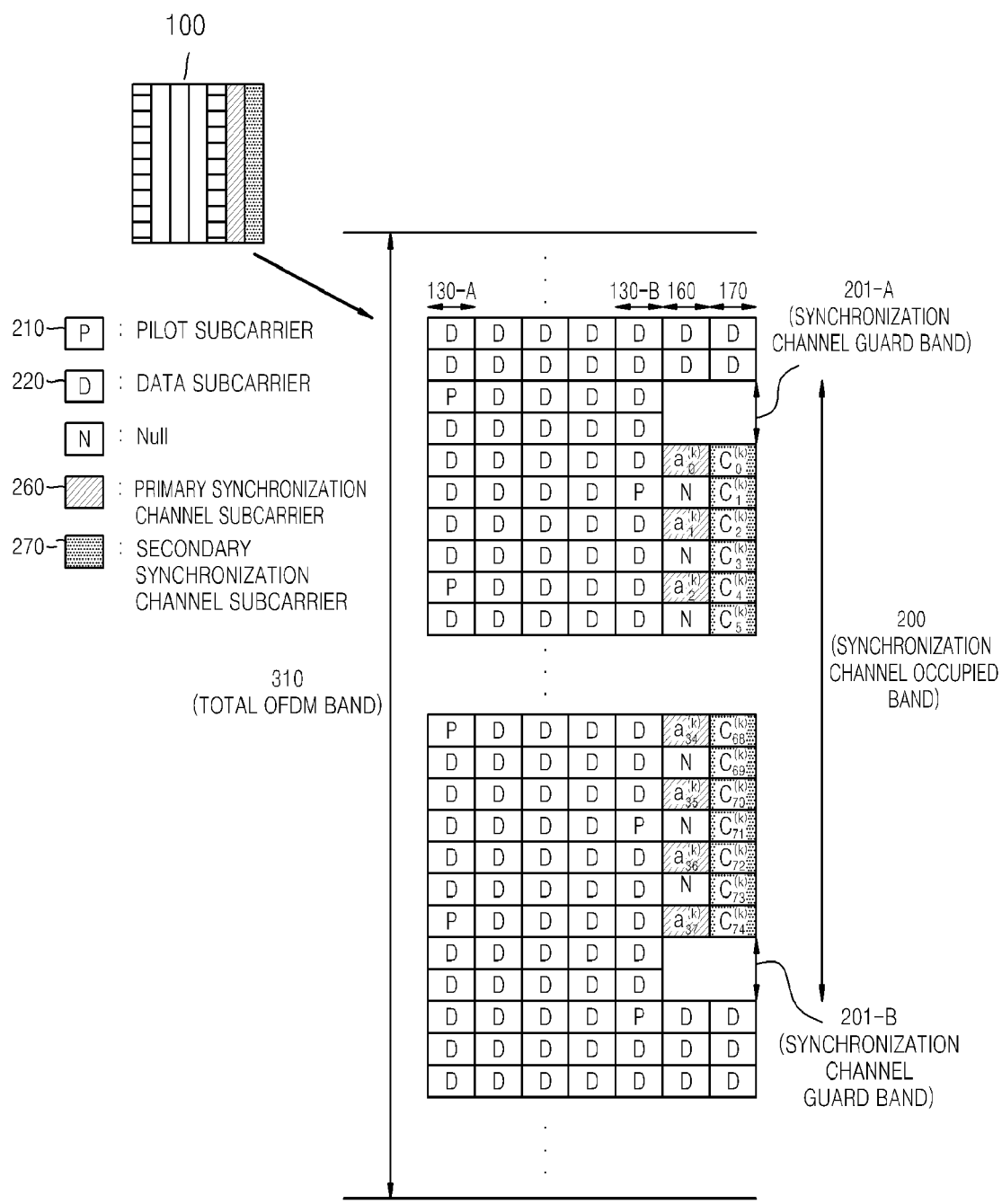
FIG. 11 illustrates a forward link sub-frame in which a primary synchronization channel and a secondary synchronization channel are formed by Time Division Multiplexing (TDM)

In TDM, in the case of the primary synchronization channel, all occupied bands can be used or only odd number subcarriers can be used as in FIG. 11. When only odd number subcarriers are used as in FIG. 11 (or when only even number subcarriers are used), a repeated pattern is given to a time domain signal so that a differential correlator having a simple structure can be used, in addition to a parallel correlator in a replica method, in the first cell searching process. The detailed description will be described later.

Also in TDM, elements of the primary synchronization channel sequence, that is, $a^{(k)}_0, a^{(k)}_1, a^{(k)}_2, \ldots, a^{(k)}_{37}$, have complex values or real number values and are allocated to the primary synchronization channel subcarrier 260 to be transmitted as illustrated in FIG. 11.

An arbitrary sequence can be used as the primary synchronization channel sequence, however, autocorrelation and cross correlation thereof should be excellent when the primary synchronization channel sequence is changed to a time domain signal.

The time domain signal component of the primary synchronization channel sequence may have complex values or real number values.

The sequences that are different to each other in the primary synchronization channel sequence are allocated to each cell group and the same sequences are used on the primary synchronization channel symbol 160 in all sync blocks in all sync blocks 140 of all frame transmitted to the forward link.

A receiver of a mobile station can introduce an accumulation technology by using the characteristic of the primary synchronization channel in order to obtain synchronization of the sync block 140 in the first cell searching process. This will be described more fully later.

Meanwhile, in FIG. 11, $C^{(k)}=[c^{(k)}_0, c^{(k)}_1, c^{(k)}_2, \ldots, c^{(k)}_{74}]$ indicates the secondary synchronization channel sequence in which the element index of the hopping code words corresponding to the synchronization channel symbol is "k".

The elements of the secondary synchronization channel sequence, that is, $c^{(k)}_0, c^{(k)}_1, c^{(k)}_2, \ldots, c^{(k)}_{74}$, may have complex values or real number values and are allocated to the secondary synchronization channel subcarrier 270 to be transmitted as illustrated in FIG. 11.

An arbitrary sequence can be used as the secondary synchronization channel sequence. Here, Generalized Chirp Like (GCL) sequence defined as in Equation 1 can be used.

The GCL sequence defined by Equation 1 is only an example of a sequence which can be used as the secondary synchronization channel sequence, and other sequences except for the GCL sequence, for example, a Gold sequence, a longest sequence, or a combination thereof can be used.

Meanwhile, the OFDM system defines two types of sub-frames. One is to mainly provide unicast service and the other one is to mainly provide MBMS service.

The sub-frame to provide unicast service has 7 OFDM symbols per sub-frame and the sub-frame to provide MBMS service has 6 OFDM symbols per sub-frame.

In both cases, the lengths of CPs are different to each other. FIGS. 12A and 12B are time domain concept diagrams of OFDM symbol having a short CP and a long CP, respectively. The lengths of remaining parts 320 and 330 except for the CPs are same, regardless of the length of the CP.

When there are 7 symbols per sub-frame, the short CP as in FIG. 12A is used and when there are 6 symbols per sub-frame, the long CP as in FIG. 12B is used. However, in the OFDM system, the sub-frame having a short CP and the sub-frame having a long CP can co-exist in a 10 msec frame.

When the primary synchronization channel and the secondary synchronization channel are combined with the FDM method as in FIG. 8, one synchronization channel symbol is transmitted to the sub-frame where the synchronization channel exists. Therefore, as mentioned above, when the synchronization channel is placed at the end of the sub-frame, the lengths of the remaining parts 320 and 330 except for the CPs are same, even of the lengths of the CPs per sub-frame are different, so that the mobile station can easily search for a cell.

Figure 13A:
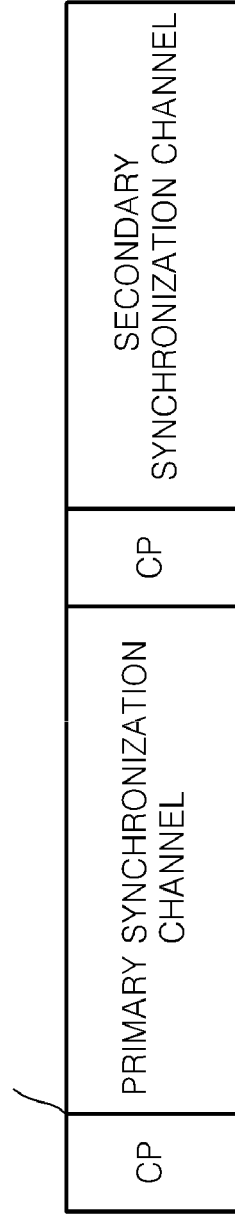
FIG. 13A and FIG. 13B are concept diagram illustrating a phenomenon that a position of a primary synchronization channel is changed according to a long CP and a short CP when a primary synchronization channel and a secondary synchronization channel are formed by Time Division Multiplexing (TDM) and are present in a same sub-frame.
Figure 13B:
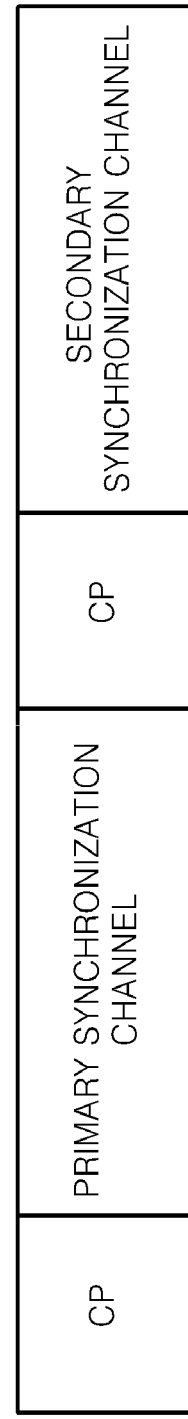

However, as in FIG. 11, when the primary synchronization channel and the secondary synchronization channel co-exist in one frame and are classified by the TDM, the current frame has different starting points for the primary synchronization channel symbol in the frame having a long CP and in the frame having a short CP as in FIG. 13A and FIG. 13B. Therefore, as will be described later, timing ambiguity for sync block boundary detecting occurs in the first cell searching process and the accumulation technology which can improve the performance of the first cell searching process cannot be introduced.

In the method of combining the primary synchronization channel and the secondary synchronization channel with the FDM method according to the present invention, there are two methods to solve such problems.

One is for all OFDM symbols to have the same CP lengths in the sub-frames (that is, sub-frames 3, 7, 11, 15, and 19 in FIG. 10) simultaneously including the primary synchronization channel and secondary synchronization channel. According to the method, all sub-frames have all short CP or all long CP.

Figure 14:
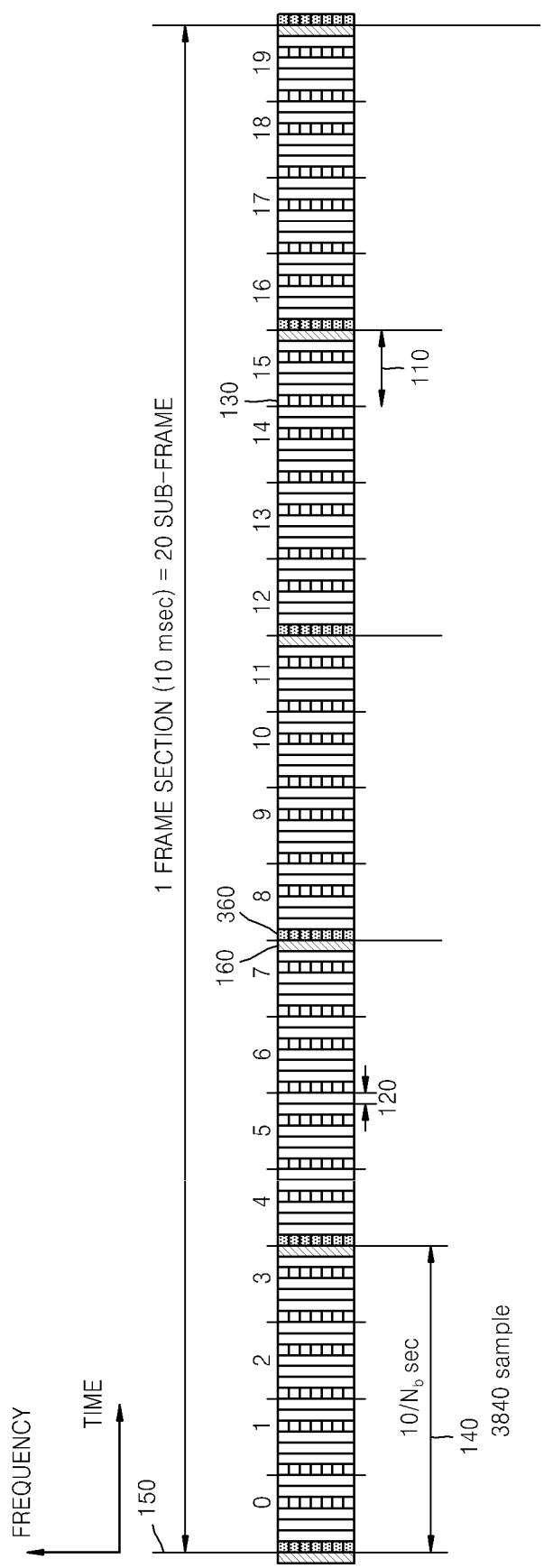
FIG. 14 illustrates a forward link frame in which a primary synchronization channel is placed at the end of a sub-frame and a secondary synchronization channel is placed at the front of a next sub-frame.

The other one is for the primary synchronization channel 160 to be placed at the end of the sub-frame and for a secondary synchronization channel symbol 360 to be placed at the front of the next sub-frame as in FIG. 14.

In this case, a time domain synchronization channel is available at a boundary 370 between the sub-frame where the primary synchronization channel is placed and the sub-frame where the secondary synchronization channel is placed. A concept diagram of the time domain synchronization channel is illustrated in FIG. 15A, FIG. 15B, FIG. 15C, and FIG. 15D.

Here, the primary synchronization channel symbol section except for the CPs constantly exists at a fixed location, regardless of the length of the CP. In this case, the timing ambiguity is removed in the first cell searching process so that an accumulation technology can be introduced. On the other hand, in the case of the secondary synchronization channel, the location of the secondary synchronization channel symbol except for the CP can be changed according to the length of the CP as in FIG. 15A, FIG. 15B, FIG. 15C, and FIG. 15D.

In this case, timing ambiguity may occur in the second cell searching process where the secondary synchronization channel is used. The method of solving this problem is to insert a postfix 390 into a first symbol of the sub-frame having long CP as in FIG. 16A, FIG. 16B, FIG. 16C, and FIG. 16D when the secondary synchronization channel is placed at the first symbol of the sub-frame having long CP.

Here, the locations of the secondary synchronization channel symbol sections except for the CPs and postfix 390 are the same, regardless of the sub-frames having long CP or short CP, so that timing ambiguity can be solved.

As in FIG. 14, in the TMD method of the present invention in which the primary synchronization channel is placed at the end of the sub-frame and the secondary synchronization channel is placed at the first of the sub-frame, the first symbol section of the sub-frame where the secondary synchronization channel is placed is where a common pilot symbol exists.

The common pilot symbol is a common channel used for channel estimation to coherently demodulate data channel of a forward link so that the secondary synchronization channel should not occupy the location of the subcarrier used by the common pilot symbol.

Figure 17:
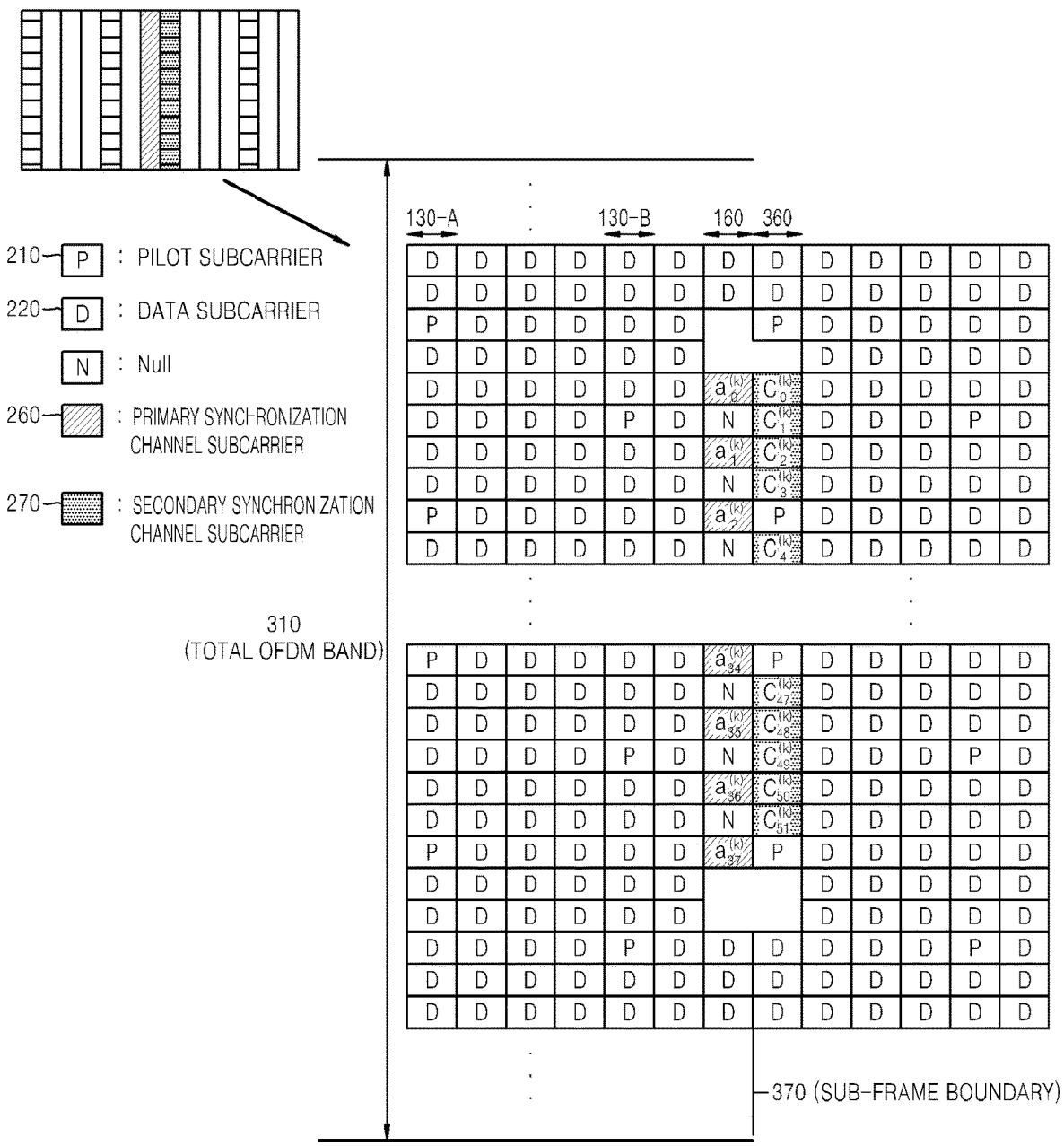
FIG. 17 illustrates an example for explaining a concept that the secondary synchronization channel is formed by a cell common pilot symbol and the FDM in a method of allocating the primary synchronization channel and the secondary synchronization channel of the present invention.

FIG. 17 illustrates that the secondary synchronization channel formed by the FDM method in a synchronization channel band between a pilot subcarrier and the secondary synchronization channel subcarrier when the secondary synchronization channel is placed at the first symbol of the sub-frame.

Meanwhile, according to the method of allocating the synchronization channel occupied band, the synchronization channel may occupy only a part of a whole band allocated to the system. Examples of system to which the above method can be applied include the OFDM system which should provide a scalable bandwidth.

Figure 18:
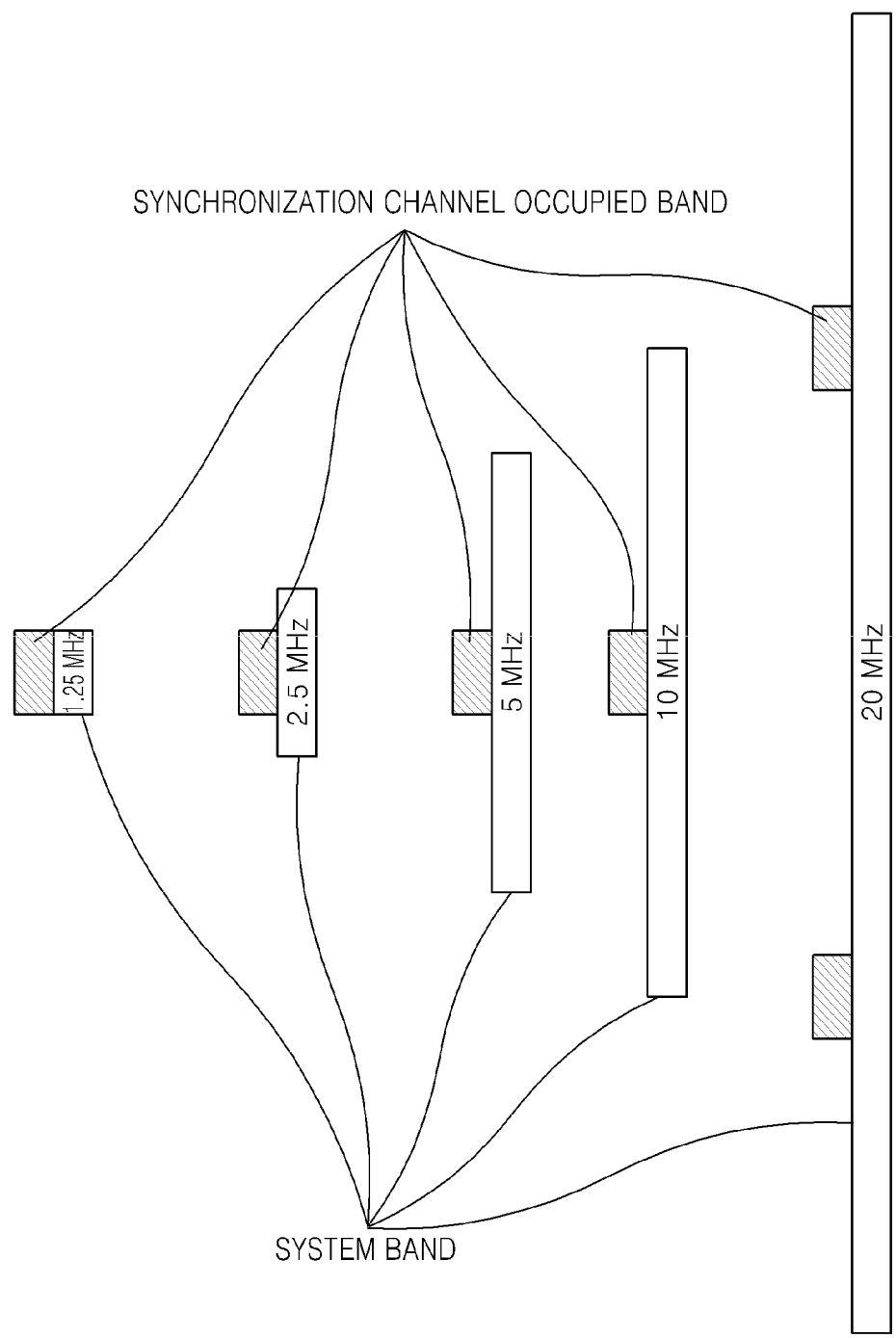
FIG. 18 is a concept diagram illustrating an occupied band of a synchronization channel when a system provides a scalable band width in a range of 1.25 MHz to 20 MHz.

That is, in order for all mobile stations using 1.25 MHz, 2.5 MHz, and 5 MHz, 10 MHz, 15 MHz, and 20 MHz, respectively, to obtain synchronization of the base station system, the synchronization channel symbols respectively occupy only a part of a whole system bandwidth 310 as illustrated in FIG. 18.

For example, when the system bandwidths are 1.25, 2.5, 10, and 15 MHz, the bandwidth of 1.25 MHz in the middle is only used. When the system bandwidth is 20 MHz, the minimum band of the mobile station is 10 MHz. Accordingly, in order to search for adjacent base station without cutting off during telephoning, two synchronization channel bands can be placed within 20 MHz.

As will be described later, the cell searching apparatus of the mobile station only filters the synchronization channel occupied band 200 so that the performance of the cell searching process can be improved.

The base station of the present invention transmits the primary synchronization channel, secondary synchronization channel, common pilot channel, and data channel to the mobile station in the cell.

Figure 19:
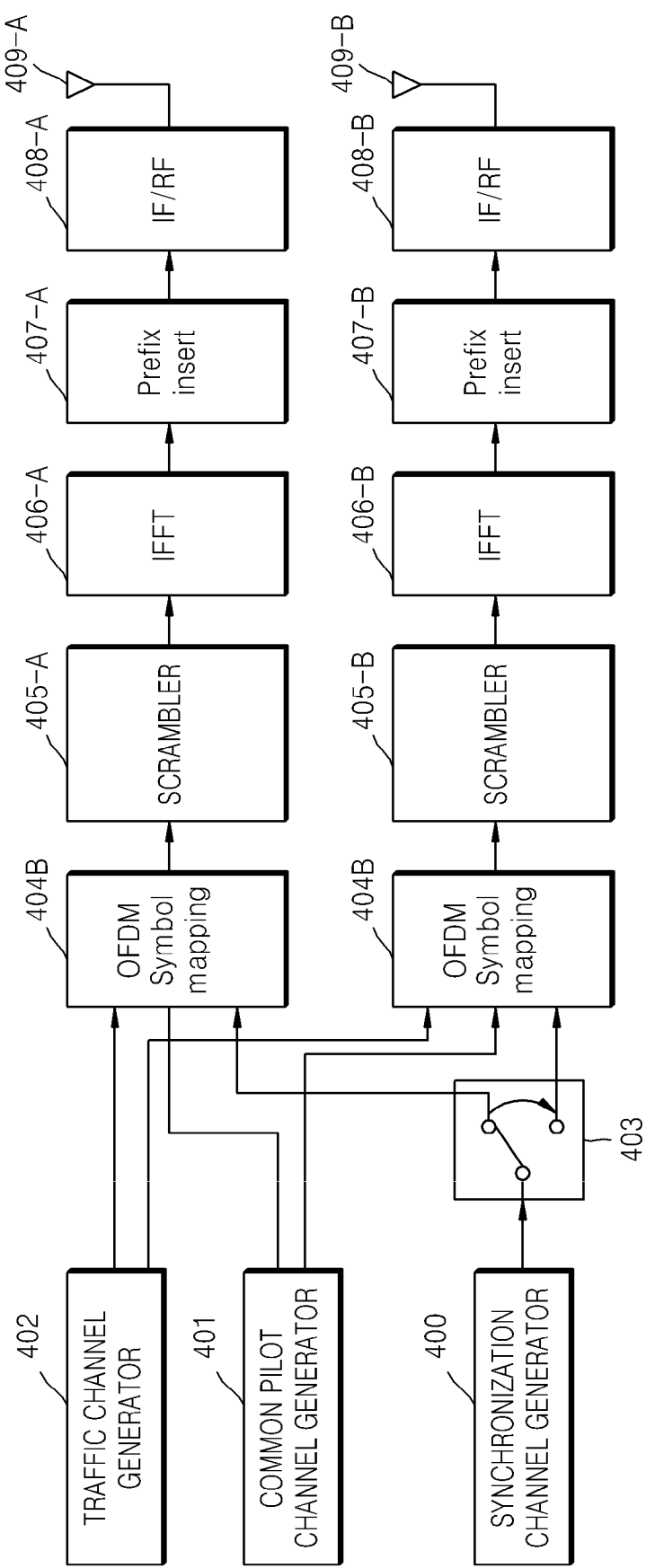
FIG. 19 is a concept diagram of a transmitter in a base station which introduces switching diversity when there are two transmitting antennas.

FIG. 19 is a block diagram of the base station according to an embodiment of the present invention. The base station includes a synchronization channel generator 400, a common pilot channel generator 401, a traffic channel generator 402, a diversity controller 403, OFDM symbol mapping units 404-A and 404-B, scramblers 405-A and 405-B, Inverse Fast Fourier Transformers (IFFT) 406-A and 406-B, prefix insert units 407-A and 407-B, IF/RF units 408-A and 408-B, and transmitting antennas 409-A and 409-B.

The traffic channel generator 402 generates traffic data to be transmitted as in reference numeral 220 of FIGS. 9, 11, and 17, and the common pilot channel generator 401 generates the pilot symbol defined in reference numeral 210 of FIGS. 9, 11, and 17. Also, the synchronization channel generator 400 generates the primary synchronization channel symbol and the secondary synchronization channel symbol.

The OFDM symbol mapping units 404-A and 404-B map symbol values of each channel to positions on the frequency domain as in FIG. 9, 11, or 17. The scramblers 405-A and 405-B multiply scrambling codes that are unique to each base station on the frequency domain with respect to an output of the OFDM symbol mapping units 404-A and 404-B, that is, the OFDM symbols, in addition to the synchronization channel symbols among the mapping results.

The IFFT 406-A and 406-B inverse fourier transform an output of the scramblers 405-A and 405-B to generate the time domain signal.

The prefix insert units 407-A and 407-B insert cyclic prefix CP which can demodulate an OFDM signal even in multipath delay of the channel into the output of the IFFT 406-A and 406-B.

In the current base station, when the primary synchronization channel and the secondary synchronization channel defined in FIG. 16A, FIG. 16B, FIG. 16C, and FIG. 16D are formed by the TDM method, the primary synchronization channel is placed at the end of the sub-frame, and the secondary synchronization channel is placed at the front of the next sub-frame, the prefix insert units 407-A and 407-B insert the CP as well as the postfix 390 into the output of the IFFT 406-A and 406-B as in FIG. 16B or 16D with respect to the symbols placed in the secondary synchronization channel, when the current sub-frame has long CP.

The IF/RF units 408-A and 408-B up-convert a signal output from the prefix insert units 407-A and 407-B, that is a baseband signal, into a band pass signal and amplify the up-converted signal.

The transmitting antennas 409-A and 409-B transmit the amplified signal. In FIG. 19, there are two transmitting antennas 409-A and 409-B. That is, when the base station according to an embodiment of the present invention includes only one transmitting antenna 409-A without the transmitting antenna 409-B, the OFDM symbol mapping unit 404-B, the scrambler 405-B, the IFFT 406-B, the prefix insert unit 407-B, the IF/RF unit 408-B, and the diversity controller 403 can be excluded.

In FIG. 19, the synchronization channel symbol is transmitted to a transmitting end of the base station system which has transmitting diversity by using two transmitting antennas.

The transmitting diversity controlled by the diversity controller 403 illustrated in FIG. 19 is now described. In order to obtain space diversity, synchronization channel symbols included in adjacent sync blocks 140 are respectively transmitted to each different antenna in FIG. 8.

For example, the synchronization channel symbol included in the first sync block is transmitted to the first transmitting antenna 409-A, the synchronization channel symbol included in the second sync block is transmitted to the second transmitting antenna 409-B, synchronization channel symbol included in the third sync block is transmitted again to the first transmitting antenna 409-A.

The diversity controller 403 performs switching in order to perform the diversity described above. That is, a Time Switching Transmit Diversity (TSTD) is applied to the synchronization channel. The diversity controller 403 switches the output of the synchronization channel generator and provides the switched output to the OFDM symbol mapping unit 404-A or the OFDM symbol mapping unit 404-B.

The TSTD is applied to the TDM method in FIG. 10 or FIG. 14, however, the primary synchronization channel symbol and the secondary synchronization channel symbol that are adjacent to each other should be transmitted to the same antenna so that the mobile station can coherently demodulate the secondary synchronization channel symbol by using the channel estimation value of the primary synchronization channel symbol.

Meanwhile, in addition to the space diversity or TSTD diversity, a delay diversity can be applied as the transmitting diversity.

Figure 20:
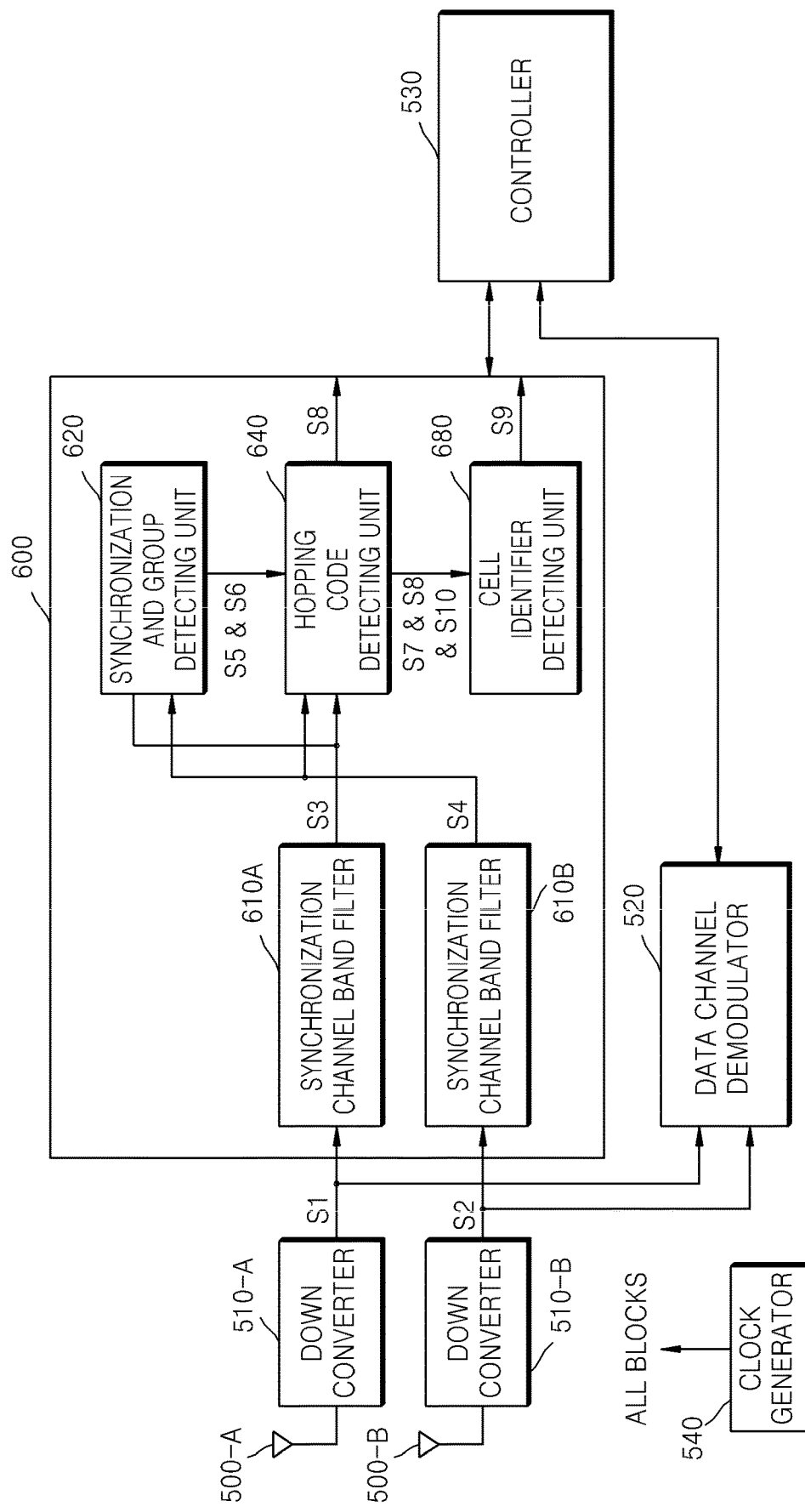
FIG. 20 is a concept diagram of a receiver of a mobile station and a cell searching unit according to an embodiment of the present invention.

FIG. 20 is a block diagram of a receiver of the mobile station according to an embodiment of the present invention. The mobile station includes at least one receiving antenna. In FIG. 20, there are two receiving antennas.

Referring to FIG. 20, the receiver of the mobile station includes receiving antennas 500-A and 500-B, down converter 510-A and 510-B, a cell searching unit 600, a data channel demodulator 520, a controller 530, a clock generator 540.

The RF signal formed frames transmitted from each base station are received through the receiving antennas 500-A and 500-B and are converted into baseband signals S1 and S2 through the down converter 510-A and 510-B.

The cell searching unit 600 searches for target cell by using the primary synchronization channel symbol and the secondary synchronization channel symbol included in the baseband signals S1 and S2 that are down converted, and the common pilot channel symbol.

Examples of the cell searching result include detecting the synchronization channel symbol of the target cell, sync block timing, frame boundary, and cell identifiers. Examples of target cell searching include searching for an initial cell by the mobile station and searching for an adjacent cell for handover.

The controller 530 controls the cell searching unit 600 and the data channel demodulator 520. That is, the controller 530 controls the cell searching unit 600 and then controls timing and invert scrambling of the data channel demodulator 520 based on the result of the cell searching.

The data channel demodulator 520 demodulates traffic channel data as illustrated in reference numeral 220 of FIGS. 9, 11, and 17 included in the down converted signals according to the control by the controller 530. Meanwhile, all hardware of the mobile station is synchronized with clocks generated by the clock generator 540 and is operated.

Referring FIG. 20, the cell searching apparatus 600 includes synchronization channel band filters 610-A and 610-B, a synchronization and group detecting unit 620, a hopping code detecting unit 640, and a cell identifier detecting unit 680.

The synchronization channel band filters 610-A and 610-B perform a band pass filtering for only synchronization channel occupied band 200 to be passed from among a whole OFDM signal band 310 with respect to the down converted signals S1 and S2, as illustrated in FIGS. 9, 11, and 17.

The synchronization and group detecting unit 620 obtains synchronization information (that is, synchronization channel symbol timing, sync block timing, or sync block boundary) S5 and cell group information (primary synchronization channel sequence number) S6 by using a primary synchronization channel signal included in the filtered signal S3 and S4.

The hopping code detecting unit 640 detects cell sub-group identifiers S7 and timing (boundary) information of the frame S8 by using the synchronization information S5, cell group information (primary synchronization channel sequence number) S6, and the hopping code word table as in Table 1 previously stored in the memory of the mobile station and transmits the detected results to the cell identifier detecting unit 680.

Here, coherent demodulation based on the channel estimation obtained by using the primary synchronization channel code that is obtained from the previous process is performed so that the performance of the second cell searching process can be improved.

When the cellular system uses the third, fourth, or sixth method of allocating a code respectively illustrated in FIGS. 3, 4, and 5B, the sub-groups are one-to-one mapped to the cell identifiers so that the sub-group identifiers becomes the cell identifiers as they are.

The role of the hopping code detecting unit 640 according to the method of allocating a code of the present invention is now described.

In the first method of allocating a code, the hopping code detecting unit 640 uses synchronization and the cell group information (primary synchronization channel sequence number) obtained from the synchronization and group detecting unit 620 and detects the cyclic shifted hopping code words of the target cell by using the secondary synchronization channel signal included in the filtered signals S3 and S4. Then, the hopping code detecting unit 540 detects the cell sub-group identifiers S7 and timing (boundary) information of the frame S8 of the target cell which correspond to the cyclic shifted hopping code words and transmits them to the cell identifier detecting unit 680.

In the second method of allocating a code, the hopping code detecting unit 640 uses synchronization information obtained from the synchronization and group detecting unit 620 and detects the cyclic shifted hopping code words of the target cell by using the secondary synchronization channel signal included in the filtered signals S3 and S4. Then, the hopping code detecting unit 540 detects the cell sub-group identifiers S7 and timing (boundary) information of the frame S8 of the target cell by using the cyclic shifted hopping code words and the cell group information (primary synchronization channel sequence number) and transmits them to the cell identifier detecting unit 680.

In the third method of allocating a code, the hopping code detecting unit 640 uses synchronization and cell group information (primary synchronization channel sequence number) obtained from the synchronization and group detecting unit 620 and detects the cyclic shifted hopping code words of the target cell by using the secondary synchronization channel signal included in the filtered signals S3 and S4. Then, the hopping code detecting unit 640 detects the cell sub-group identifiers S7 and timing (boundary) information of the frame S8 of the target cell which correspond to the cyclic shifted hopping code words and transmits them to the cell identifier detecting unit 680. In this case, since the cell sub-group identifiers are one-to-one mapped to the cell identifiers, the cell sub-group identifiers S7 are the same as cell identifiers S9 so that the cell identifier detecting unit 680 is operated to a confirmation mode for the previous process or can be bypassed.

In the fourth method of allocating a code, the hopping code detecting unit 640 uses the synchronization information obtained from the synchronization and group detecting unit 620 and detects the cyclic shifted hopping code words of the target cell by using the secondary synchronization channel signal included in the filtered signals S3 and S4. Then, the hopping code detecting unit 640 detects the cell sub-group identifiers S7 and timing (boundary) information of the frame S8 of the target cell by using the cyclic shifted hopping code words and the ell group information (primary synchronization channel sequence number) obtained from the synchronization and group detecting unit 620 and transmits them to the cell identifier detecting unit 680. In this case, since the cell sub-group identifiers are one-to-one mapped to the cell identifiers, the cell sub-group identifiers S7 are the same as the cell identifiers S9 so that the cell identifier detecting unit 680 is operated to a confirmation mode for the previous process or can be bypassed.

In the fifth method of allocating a code, the hopping code detecting unit 640 uses the synchronization information obtained from the synchronization and group detecting unit 620 and detects the cyclic shifted hopping code words of the target cell by using the secondary synchronization channel signal included in the filtered signals S3 and S4. Then, the hopping code detecting unit 640 detects the cell sub-group identifiers S7 and timing (boundary) information of the frame S8 of the target cell which correspond to the cyclic shifted hopping code words and transmits them to the cell identifier detecting unit 680.

In the sixth method of allocating a code, the hopping code detecting unit 640 uses the synchronization information obtained from the synchronization and group detecting unit 620 and detects the cyclic shifted hopping code words of the target cell by using the secondary synchronization channel signal included in the filtered signals S3 and S4. Then, the hopping code detecting unit 640 detects the cell sub-group identifiers S7 and the frame timing (boundary) information S8 of the target cell which correspond to the cyclic shifted hopping code words and transmits them to the cell identifier detecting unit 680. In this case, since the cell sub-group identifiers are one-to-one mapped to the cell identifiers, the cell sub-group identifiers S7 are the same as the cell identifiers S9 so that the cell identifier detecting unit 680 is operated to a confirmation mode for the previous process or can be bypassed.

In the seventh method of allocating a code, the mobile station cell searching unit 600 does not include the hopping code detecting unit 640 and directly delivers the synchronization information (that is, synchronization channel symbol timing, sync block timing, or sync block boundary) S5 and the cell group information (the number of primary synchronization channel sequence) S6 obtained from the synchronization and group detecting unit 620 to the cell identifier detecting unit 680.

Meanwhile, in the case of the first, second, and fifth methods of allocating a code, the cell identifier detecting unit 680 receives timing (boundary) information of the frame S8 and the cell sub-group identifiers S7 obtained from the hopping code detecting unit 640 and detects the cell identifiers through a pilot correlation with respect to the common pilot channel signal among the down converted signals S1 and S2.

Here, the number of pilot correlations is the same as the number of cell identifiers in the sub-group received from the hopping code detecting unit and the pilot scrambling codes of each pilot correlator are one-to-one mapped to the cell identifiers.

In the case of the second, third, and sixth methods of allocating a code, since the cell sub-group identifiers S7 received from the hopping code detecting unit 640 are one-to-one mapped to the cell identifiers, the cell identifier detecting unit 680 regards the cell sub-group identifiers S7 received from the hopping code detecting unit 640 as the cell identifiers S9 and may transmit the cell sub-group identifiers S7 to the controller 530.

In the case of the second, third, and sixth methods of allocating a code, since the cell sub-group identifiers S7 received from the hopping code detecting unit 640 are one-to-one mapped to the cell identifiers, the cell identifier detecting unit 680 receives the frame timing (boundary) information S8 and the cell sub-group identifiers S7 obtained from the hopping code detecting unit 640 and can be used to verify the cell identifiers through a pilot correlation with respect to the common pilot channel signal among the down converted signals S1 and S2. Here, the number of pilot correlators is 1 and the pilot scrambling codes of the correlator are the codes corresponding to the cell identifiers that are one-to-one mapped to the cell sub-group identifiers S7.

Figure 21:
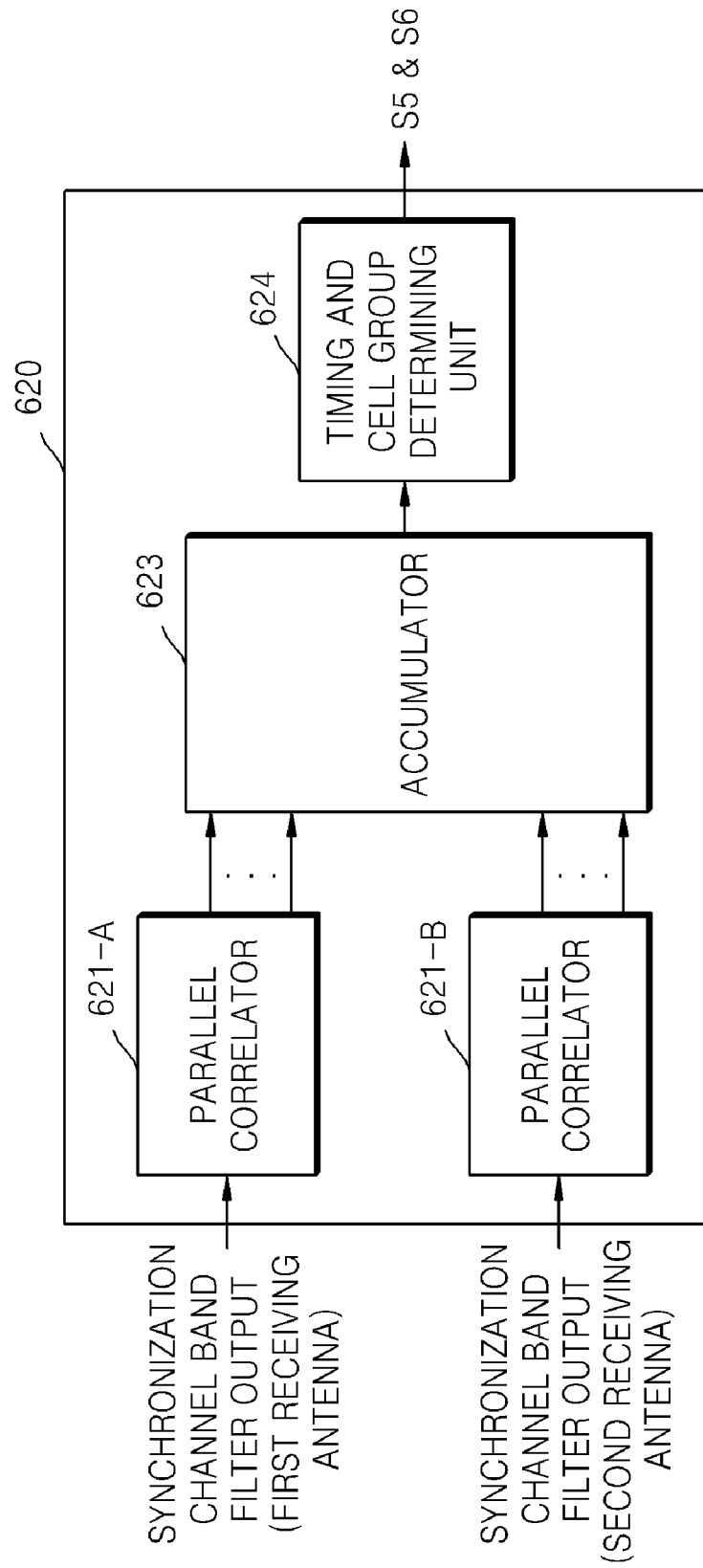
FIG. 21 is a block diagram of a synchronization and group detecting unit of the cell searching unit of FIG. 20.

FIG. 21 is a block diagram of the synchronization and group detecting unit 620 of FIG. 20.

Referring to FIG. 21, the synchronization and group detecting unit 620 includes parallel correlators 621-A and 621-B, an accumulator 623, and a timing and cell group determining unit 624.

The parallel correlators 621-A and 621-B previously store the time domain signals corresponding to the primary synchronization channel sequences available as much as the total number of the cell groups (for example, 8 in FIG. 1) used in the system and perform a parallel correlation to the stored signals with the signals S3 and S4 output from synchronization channel band filters 610-A and 610-B.

In addition, when a plurality of the primary synchronization channel sequence is used in the fifth and sixth methods of allocating a code, the time domain signals corresponding to the primary synchronization channel sequences are previously stored and a parallel correlation is performed to the stored signals with the signals S3 and S4 output from synchronization channel band filters 610-A and 610-B.

In the case of FIG. 10 or FIG. 14 where the primary synchronization channel and the secondary synchronization channel are formed by the TDM method, a parallel correlation using the time domain signals of the available primary synchronization channel sequences can be performed or a differential correlation using a time domain repeated pattern of the primary synchronization channel can be performed.

When the differential correlation is performed by using a differential correlator, computation amount is much lower than when the parallel correlation using replica of the time domain signals of the primary synchronization channel sequences is performed by using a parallel correlator so that the cell searching apparatus of the mobile station can be simplified. In addition, the number of differential correlators does not relate to the number of cell groups.

On the other hand, the number of parallel correlators corresponds to the number of cell groups used in the system, that is, the number of primary synchronization channel sequences. When the differential correlator is used, the performance thereof may be worse than that of the parallel correlator.

Meanwhile, in the FDM method of FIG. 8, the differential correlator cannot be used. In this specification, the parallel correlator suggested from FIG. 21 is focused.

3840 outputs (samples) are generated per sync block lengths from each of the parallel correlators 621-A and 621-B with reference to FIGS. 8, 10, and 14. The timing and cell group determining unit 624 detects the location of the sample which generates the peak value from among the differential correlation values and determines the same detected location as the synchronization channel symbol timing (in the FDM method) or the primary synchronization channel symbol timing (in the TDM method).

The synchronization and group detecting unit 620 may further include the accumulator 623 as in FIG. 21 in order to improve the performance of detecting symbol synchronization. The number of samples, that is, 3840, is only an example based on parameters of the OFDM system when the length of the sync block is the same as 4 sub-frames.

The accumulator 623 firstly combines the outputs from the parallel correlators 621-A and 621-B with respect to two receiving antennas and then adds the antennal combining values with respect to 3840 sample locations per sync block to each combining value with respect to the samples that are off by a sync block from each of the sample locations.

When the parallel correlators, which perform a time domain replica correlation of the primary synchronization channel, are employed, 3840 buffers are needed for the primary synchronization channel signals.

When the synchronization and group detecting unit 620 includes the accumulator 623, the timing and cell group determining unit 624 detects the maximum value from among 3840×$N_G$ stored in the accumulator 623 (in the case of the parallel correlator, $N_G$ is the number of cell groups) outputs the sample location of the detected maximum value and corresponding group information as the synchronization information S5 and the cell group S6.

Figure 22:
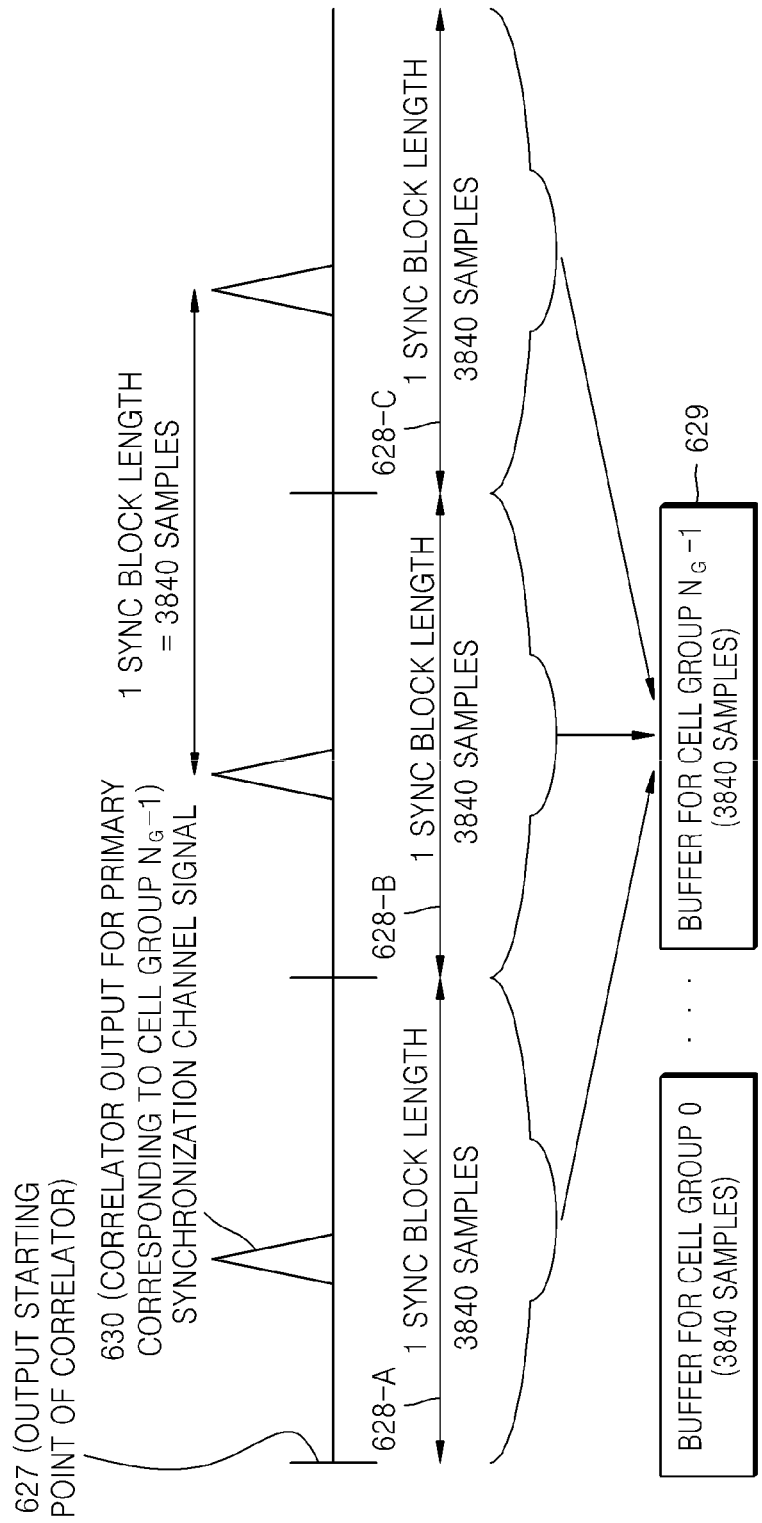
FIG. 22 is a concept diagram for explaining the operation of the synchronization and group detecting unit of FIG. 21.

FIG. 22 is a graph showing an output from the correlator with respect to $N_G-1^{th}$ primary synchronization channel signal from among the outputs from the parallel correlators 621-A and 621-B of FIG. 21. For convenience, it is assumed that the channel between the base station transmitting end and the mobile station receiving end is in an ideal channel environment without fading and noise.

Figure 23:
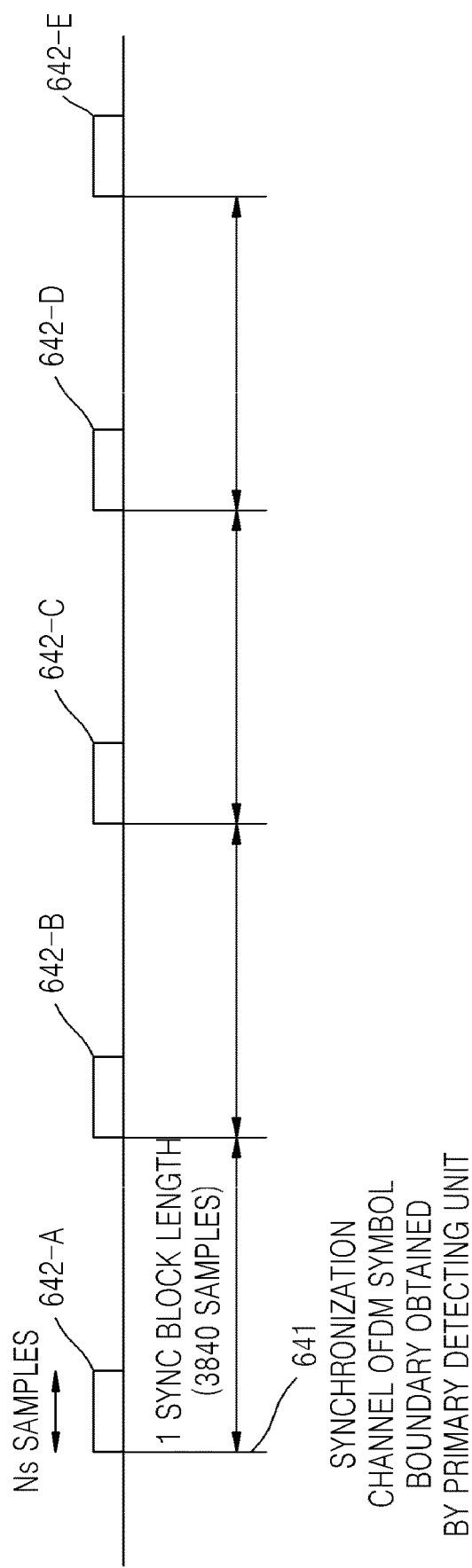
FIG. 23 is a concept diagram for explaining an input signal of a hopping code detecting unit of FIG. 20 when the primary synchronization and the secondary synchronization channel are formed by FDM.

FIG. 23 illustrates an input signal provided by the hopping code detecting unit 640 based on a synchronization channel OFDM symbol timing obtained from the synchronization and group detecting unit 620 in the system having the forward link frame structure as in FIG. 8 where the primary synchronization channel and the secondary synchronization channel are formed by the FDM.

Based on the synchronization channel OFDM symbol timing 641 obtained by the synchronization and group detecting unit 620, cyclic prefixes of each OFDM symbol are removed and accordingly $N_S$ sample values are input to the hopping code detecting unit 640 in each sync block. Meanwhile, reference numerals 642-A, 642-B, 642-C, 642-D, and 642-E indicate the locations of the synchronization channel symbols obtained by the synchronization channel OFDM symbol timing 641.

Figure 24:
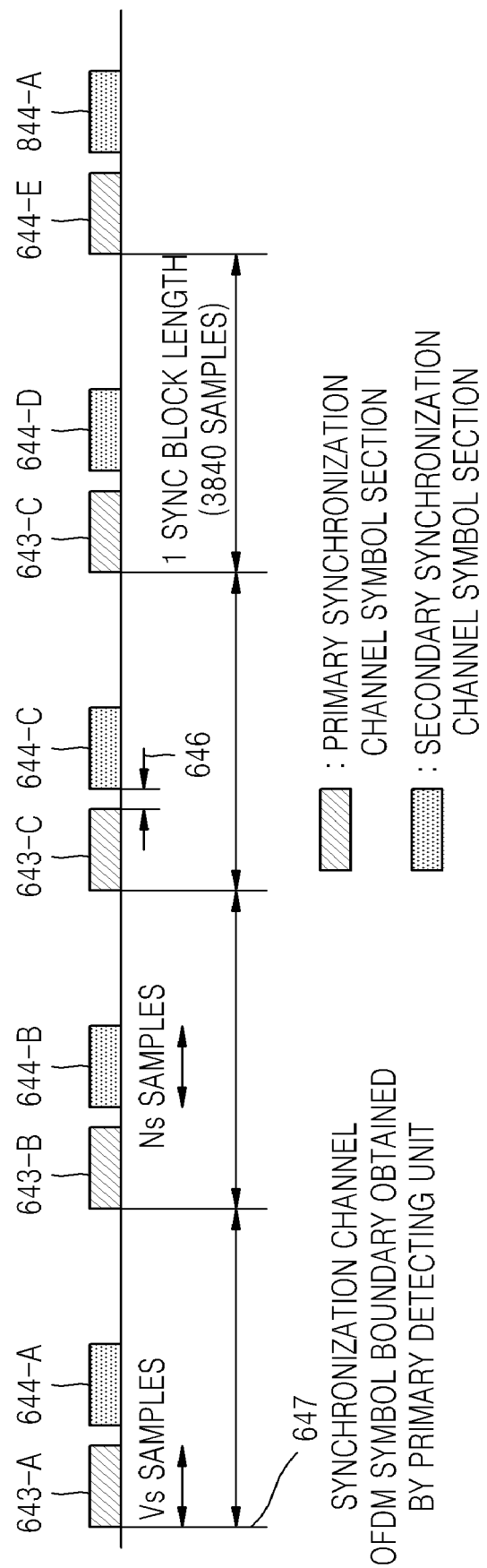
FIG. 24 is a concept diagram for explaining an input signal of a hopping code detecting unit of FIG. 20 when the primary synchronization and the secondary synchronization channel are formed by TDM.

FIG. 24 illustrates an input signal provided by the hopping code detecting unit 640 based on a synchronization channel OFDM symbol timing obtained from the synchronization and group detecting unit 620 in the system having the forward link frame structure as in FIG. 10 or FIG. 14 where the primary synchronization channel and the secondary synchronization channel are formed by the TDM.

Based on the synchronization channel OFDM symbol timing 647 obtained by the synchronization and group detecting unit 620, cyclic prefixes of each OFDM symbol are removed and accordingly 2*$N_S$ sample values corresponding to the primary synchronization channel symbol section and the secondary synchronization channel symbol section are input to the hopping code detecting unit 640 in each sync block.

Meanwhile, the reference numerals 643-A, 643-B, 643-C, 643-D, and 643-E indicate the locations of the primary synchronization channel symbols obtained by the synchronization channel OFDM symbol timing 641 and the reference numerals 644-A, 644-B, 644-C, 644-D, and 644-E indicate the locations of the secondary synchronization channel symbols.

When the primary synchronization channel is placed at the end of the sub-frame and the secondary synchronization channel is placed at the first symbol of the next frame as illustrated in FIGS. 14 and 16, an interval 646 between a primary synchronization channel symbol section 643 and a secondary synchronization channel symbol section 644 of the input signal provided to the hopping code detecting unit 640 should be the same as the short CP at all times.

Figure 25:
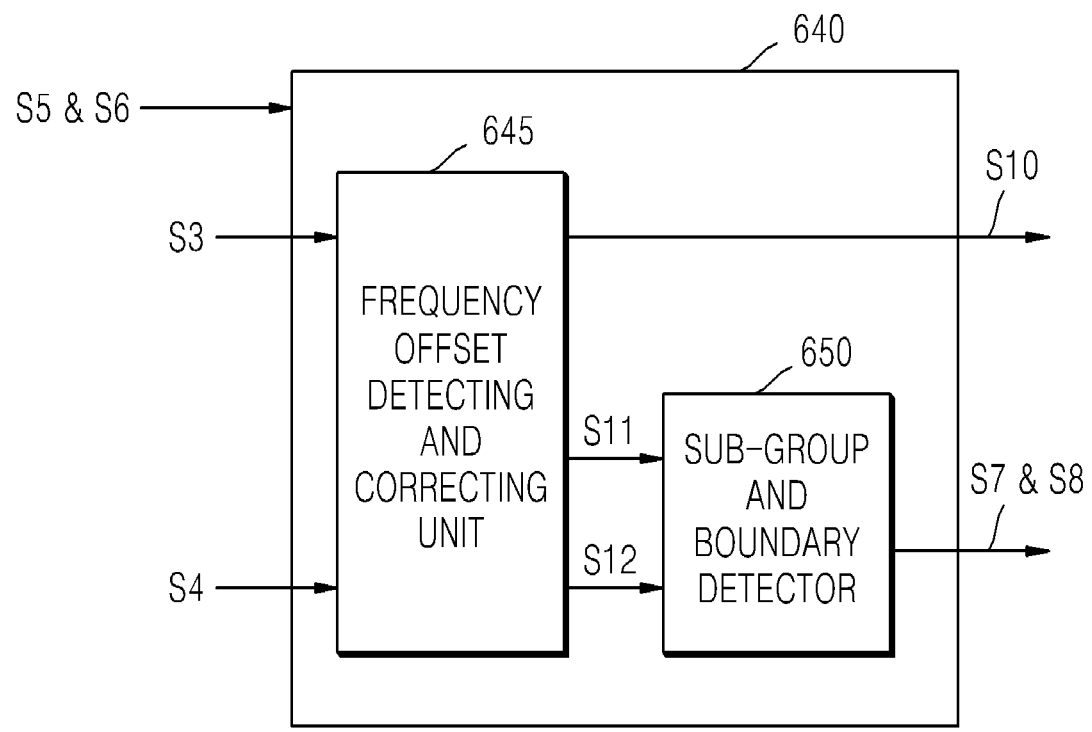
FIG. 25 is a block diagram of the hopping code detecting unit of FIG. 20.

FIG. 25 is a block diagram of the hopping code detecting unit 640 of FIG. 20. The hopping code detecting unit 640 includes a frequency offset detecting and correcting unit 645 and a sub-group and boundary detecting unit 650.

Firstly, the operation of the frequency offset detecting and correcting unit 645 is described with reference to the cellular system in which the primary synchronization channel and the secondary synchronization channel are formed by the FDM as in FIG. 8.

The frequency offset detecting and correcting unit 645 sets the synchronization channel OFDM symbol timing 641 based on the output S5 synchronization information of the synchronization and group detecting unit 620 and stores P×$N_S$ reception signal samples 642-A through 642-E of the synchronization channel section provided from the synchronization channel band filters 610-A and 610-B throughout various sync block length sections based on the synchronization channel OFDM symbol timing 641. Then, the frequency offset detecting and correcting unit 645 estimates frequency offset by using the samples and a replica of the primary synchronization channel signal corresponding to the cell group S6 received from the synchronization and group detecting unit 620 and corrects frequency offset with respect to P×$N_S$ reception signal samples 642-A through 642-E based on the estimated frequency offset S10, thereby providing P×$N_S$ corrected reception signal samples S11 and S12 to the sub-group and boundary detector 650.

Here, P indicates the number of synchronization channel symbols used for frequency offset correcting, code group detecting, and frame boundary detecting and may indicate the number of synchronization channel symbols included in one frame. In this case, P=5 with reference to FIG. 8.

A frequency offset estimation method by the frequency offset detecting and correcting unit 645 in the system according to the present invention where the primary synchronization channel and the secondary synchronization channel are formed by the FDM is represented in Equation 3.

$$\Delta f = \frac{R_s}{\pi N_s} \arg \left\{ \sum_{a=0}^{A-1} \sum_{p=0}^{P-1} \left\{ \left( \sum_{n=0}^{\frac{N_s}{2}-1} \{r_{a,p}(n) S_g^*(n)\} \right)^* \left( \sum_{n=\frac{N_s}{2}}^{N_s-1} \{r_{a,p}(n) S_g^*(n)\} \right) \right\} \right\}$$ [Equation 3]

Here, $R_S$ is an OFDM sampling frequency, A is the number of receiving antennas, and P is the number of synchronization channel symbols used to estimate frequency offset.

In addition, $r_{a,p}(n)$ indicates $n^{th}$ sample value from among $N_S$ samples of $P^{th}$ synchronization channel symbol from the synchronization channel OFDM symbol timing 641 provided from the synchronization and group detecting unit 620 with respect to $a^{th}$ receiving antenna.

Sg(n) indicates the time domain signal (replica) of the primary synchronization channel which corresponds to cell group number g. * is a complex conjugate.

In the case of the cellular system where the primary synchronization channel and the secondary synchronization channel are formed by the TDM as in forward link frame of FIG. 10 or FIG. 14, the operation of the frequency offset detecting and correcting unit 645 is as follows.

The frequency offset detecting and correcting unit 645 sets the first synchronization channel OFDM symbol timing 647 based on the output S5 synchronization information of the synchronization and group detecting unit 620 and stores P×N$_S$ reception signal samples 643-A through 643-E of the primary synchronization channel section provided from the synchronization channel band filters 610-A and 610-B throughout various sync block length sections based on the first synchronization channel OFDM symbol timing 647. Then, the frequency offset detecting and correcting unit 645 estimates frequency offset by using the samples and corrects frequency offset with respect to P×N$_S$ reception signal samples 643-A through 643-E of the primary synchronization channel section and P×N$_S$ reception signal samples 644-A through 644-E of the secondary synchronization channel section, based on the estimated frequency offset S10, thereby providing P×N$_S$ corrected reception signal samples of the primary synchronization channel section and P×N$_S$ corrected reception signal samples of the secondary synchronization channel section S11 and S12 to the sub-group and boundary detector 650.

As will be described later, the samples 643-A through 643-E of the primary synchronization channel are used for channel estimation while the secondary synchronization channel is coherently demodulated.

Here, P indicates the number of synchronization channel symbols used for frequency offset correcting, code group detecting, and frame boundary detecting and may indicate the number of synchronization channel symbols included in one frame. In this case, P=5 with reference to FIGS. 10 and 14.

A frequency offset estimation method by the frequency offset detecting and correcting unit 645 in the system according to the present invention where the primary synchronization channel and the secondary synchronization channel are formed by the TDM is represented in Equation 4. In the TDM method, since the reception signals 644-A through 644-E in the primary synchronization channel section have a characteristic of repetition on the time axis, a differential correlation can be used as in Equation 4.

$$\Delta f = \frac{R_s}{\pi N_s} \tan^{-1} \left\{ \sum_{a=0}^{A} \sum_{p=0}^{P-1} \sum_{n=0}^{\frac{N_s}{2}} \left\{ r^*_{a,p}(n) r_{a,p}\left(n + \frac{N_s}{2}\right) \right\} \right\}$$ [Equation 4]

Here, R$_S$ is an OFDM sampling frequency, A is the number of receiving antennas, and P is the number of synchronization channel symbols used to estimate frequency offset.

In addition, r$_{a,p}$(n) indicates n$^{th}$ sample value from among N$_S$ samples of P$^{th}$ synchronization channel symbol from the synchronization channel OFDM symbol timing 647 provided from the synchronization and group detecting unit 620 with respect to a$^{th}$ receiving antenna.

Meanwhile, Equation 5 represents frequency offset estimation method by the frequency offset detecting and correcting unit 645.

$$r'_{a,p}(n) = r_{a,p}(n) \times \exp\left\{-j2\pi \frac{\Delta f}{R_s} n\right\},$$ [Equation 5]

$$n = 0, 1, 2, \ldots, N_s - 1$$

That is, the frequency offset detecting and correcting unit 645 corrects P×N$_S$ reception signal samples of FIG. 23 by using the frequency offset value estimated by the method above or corrects frequency offsets of 2×P×N$_S$ reception signal samples of FIG. 24 by using Equation 4. The frequency offset detecting and correcting unit 645 provides corrected frequency offset samples r'$_{a,p}$ (S11 and S12) to the sub-group and boundary detector 650 sequentially by N$_S$.

The sub-group and boundary detector 650 detects the sub-group identifiers and 10 msec frame timing by using the corrected frequency offset samples S11 and S12 and the hopping codes as in FIG. 1 which are previously stored and provides the detected cell sub-group identifiers S7 and the frame timing (boundary) information S8 to the cell identifier detecting unit 680.

Figure 26:
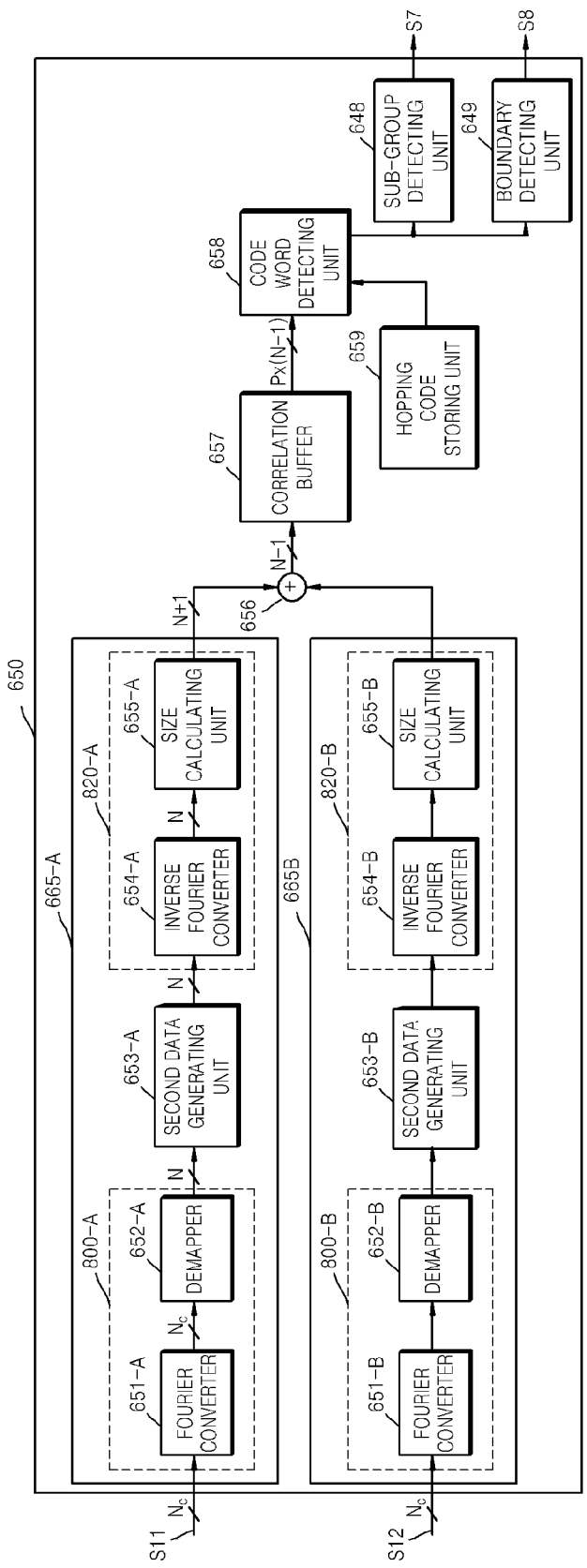
FIG. 26 is a block diagram of a sub-group and boundary detector of FIG. 25.

FIG. 26 is a block diagram of the sub-group and boundary detector 650 of FIG. 25. The sub-group and boundary detector 650 includes code correlation calculating units 665-A and 665-B, a combiner 656, a correlation buffer 657, a hopping code storing unit 659, a code word detecting unit 658, a boundary detecting unit 649, and a sub-group detecting unit 648.

Since the synchronization channel sequence index included in each of the secondary synchronization channel symbols are unknown, the mobile station should calculate all possible sequences with respect to N$_S$ samples of the synchronization channel symbols.

The code correlation calculating units 665-A and 665-B calculate correlation for each of the secondary synchronization channel sequences used in the system with respect to the secondary synchronization channel symbols S11 and S12 in which frequency offset is corrected from the frequency offset detecting and correcting unit 645.

The combiner 656 combines the outputs of the code correlation calculating units 665-A and 665-B and provides N−1 combined correlation values to each synchronization channel symbol.

The correlation buffer 657 buffers N−1 correlation values with respect to the secondary synchronization channel symbols as much as the number of estimation P. Ultimately, P×(N−1) correlation values are stored in the correlation buffer 657.

The hopping code storing unit 659 stores a plurality of the hopping code words as in Table 1.

The code word detecting unit 658 calculates the total sum of the correlation values of the synchronization channel sequences that are mapped to each of the hopping code word element index with respect to the stored hopping code words and all the cyclic shifted code words of the stored hopping code words and detects cyclic shifted hopping code word numbers implied to the synchronization channel symbols based on the calculated result.

The boundary detecting unit 649 detects the frame timing (boundary) information S8 based on the cyclic shift index with respect to the detected hopping code words. In addition, the sub-group detecting unit 648 detects the cell sub-group identifiers S7 based on the detected hopping code word numbers. The detailed detecting processes are described later.

In particular, when the synchronization channel sequence is based on the GCL sequence, the code correlation calculating units 665-A and 665-B includes first data obtaining units 800-A and 800-B, second data generating units 653-A and 653-B, and correlation generating units 820-A and 820-B with reference to FIG. 26. The code correlation calculating units 665-A and 665-B in FIG. 26 use a non-coherent method which only uses the secondary synchronization channel symbols. In the case of the coherent method, the channel estimation values estimated by using the primary synchronization channel can be used in demodulating the secondary synchronization channel.

In this specification, the non-coherent method will be focused and described.

Referring to FIG. 26, the first data obtaining units 800-A and 800-B include Fourier converters 651-A and 651-B and demappers 652-A and 652-B. The Fourier converters 651-A and 651-B Fourier convert the samples S11 and S11 for the secondary synchronization channel symbol section to obtain $N_S$ frequency domain values and the demappers 652-A and 652-B obtain data of the subcarrier to which the chips of the secondary synchronization channel sequence are allocated from among the obtained $N_S$ frequency domain values.

The second data generating units 653-A and 653-B are provided outputs from the demappers 652-A and 652-B and perform differential encoding defined as Equation 6.

$$u(n)=y^*(n)y((n+1)_{mod\ N}), n=0,1,\ldots,N-1 \quad \text{[Equation 6]}$$

Here, y(n) is the output of the demappers 652-A and 652-B and u(n) is the output of the second data generating units 653-A and 653-B. The differential encoding is performed to obtain only linear phase shift that corresponds to GCL sequence number k in N frequency domain signal component. That is, when it is assumed that channel distortion and noise do not exist, u(n) is represented as Equation 7.

$$u(n) = \exp\left\{-j2\pi \frac{n}{N} k\right\}, n = 0, 1, \ldots, N-1 \quad \text{[Equation 7]}$$

K is a GCL sequence identifier and may have values of 1 to N−1 as suggested in Equation 1.

The correlation generating unit 820-A and 820-B inverse-fourier convert N u(n) of the synchronization channel symbols, that is, the output of the second data generating units 653-A and 653-B, and calculate correlation of the synchronization channel symbols with respect to each hopping code word by using an absolute value of the conversion result (the non-coherent method). Referring to FIG. 26, the correlation generating unit 820-A and 820-B include inverse Fourier converters 654-A and 654-B and size calculating units 655-A and 655-B.

The inverse Fourier converters 654-A and 654-B inverse-fourier convert the output of the second data generating units 653-A and 653-B and generate N complex samples per each synchronization channel symbol. The size calculating units 655-A and 655-B add the square of a real component with the square of an imaginary component with respect to N generated complex samples and calculate the size of the complex samples.

In particular, the first vale among the calculated N values is removed and only remaining N−1 values are provided to the combiner 656.

Figure 27:
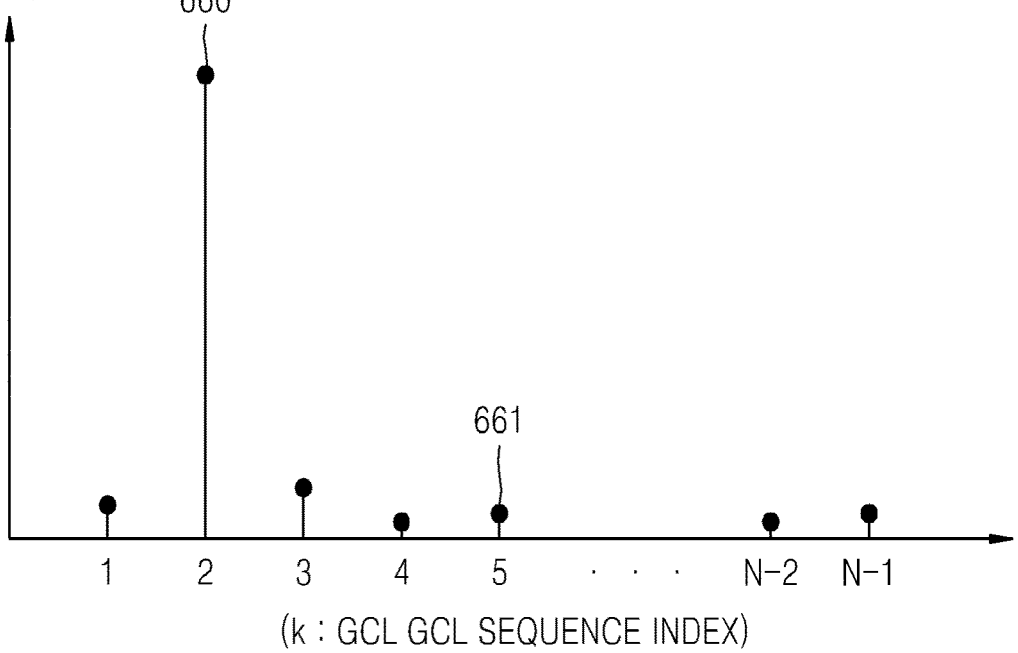
FIG. 27 is a graph showing outputs of code correlation calculating units of FIG. 26.

FIG. 27 is a graph showing the outputs of the code correlation calculating units 665-A and 665-B of FIG. 26.

A horizontal axis shows the secondary synchronization channel sequence (GCL sequence) numbers and a vertical axis shows correlation values between the current received secondary synchronization channel symbol (that is, N−1) and the synchronization channel sequence (GCL sequence).

In particular, FIG. 27 shows the outputs of the code correlation calculating units 665-A and 665-B when the hopping code word element index k included in the currently received secondary synchronization channel symbol is 2.

Referring to FIG. 27, a correlation value when k is 2 is the largest. In particular, when there is no channel distortion or noise, correlation values at remaining hopping code index, except for when k is 2, are "0", as differently in FIG. 27.

In FIG. 27, a receiving diversity is applied to the mobile station by installing two receiving antennas. The combiner 656 combines the outputs of the code correlation calculating units 655-A and 655-B obtained by each path according to the receiving diversity. When the receiving diversity is not used, the combiner 656 and the code correlation calculating unit 665-B can be excluded.

The hopping code word identifiers are one-to-one mapped to the sub-group identifiers of FIG. 2 and the cyclic shift index indicates how far 10 msec frame boundary is off from the point (641 or 647) used in the hopping code detecting unit 640.

Ultimately, 10 msec frame boundary can be obtained from the synchronization information 641 or 647 obtained from the first cell searching process and the cyclic shift index.

Figure 28:
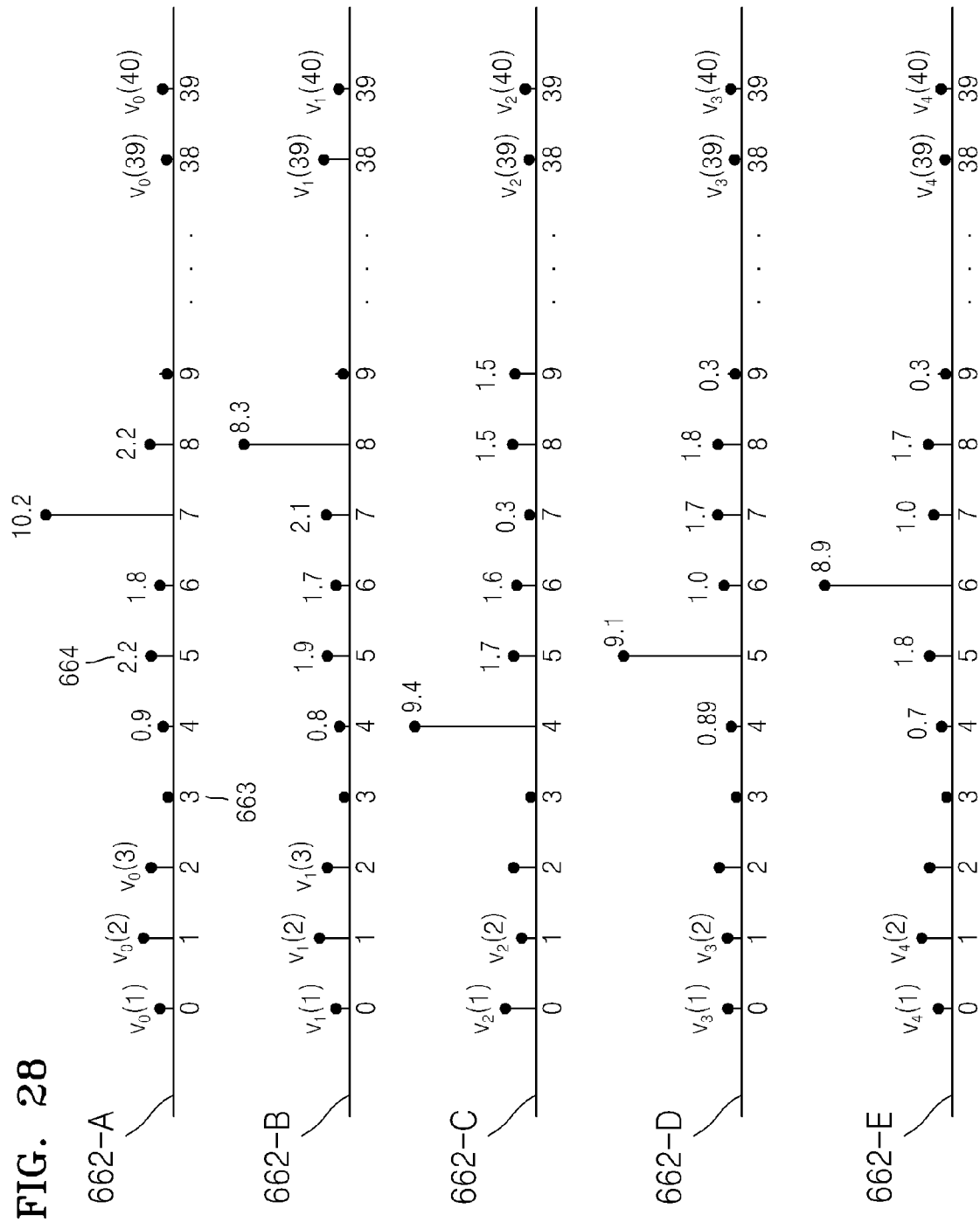
FIG. 28 illustrates correlation values stored in a correlation buffer of FIG. 26.

FIG. 28 illustrates P×(N−1) correlation values stored in the correlation buffer 657 of FIG. 26. Here, P is 5 and N is 41. A horizontal axis shows the secondary synchronization channel sequence numbers and a vertical axis shows correlation values of each of the synchronization channel sequences with respect to the received synchronization channel symbols.

The reference numeral 662-A shows a correlation of 40 synchronization channel sequences with respect to when the first synchronization channel symbol, that is, when p=0. The reference numerals 662-B, 662-C, 662-D, and 662-E are 40 correlation values calculated with respect to the received synchronization channel symbols respectively corresponding to p=1, 2, 3, and 4.

That is, the top 40 samples 662-A are the outputs of the combiner 656 with respect to the first OFDM symbol 642-A in FIG. 23 or the first secondary synchronization channel symbol 644-A in FIG. 24.

The second 40 samples 662-B are the outputs of the combiner 656 with respect to the second OFDM symbols 642-B and 644-B. The third 40 samples 662-C are the outputs of the combiner 656 with respect to the third OFDM symbols 642-C and 644-C. The fourth 40 samples 662-D and the fifth 40 samples 662-E are same as above.

The code word detecting unit 658 calculates $N_H \times P$ decision variables and selects the decision variable having the maximum value from among the decision variables. Then, the code word detecting unit 658 provides information on the selected decision variable to the boundary detecting unit 649 and the sub-group detecting unit 648. Here, $N_H$ is the number of hopping code words included in one cell group. In the first through fourth methods of allocating a code in FIGS. 1 through 4, $N_H$ is 16 and in the fifth and sixth methods of allocating a code in FIGS. 5A and 5B, $N_H$ is 128.

That is, the code word detecting unit 658 performs a test only for $N_H$ hopping code words included in the cell group information S6 received from the synchronization and group detecting unit 620.

For example, when it is assumed that the mobile station is included in the cellular system in which the first method of allocating a code in FIG. 1 is used, when the synchronization and group detecting unit 620 detects the cell group identifier 2 in the first cell searching process, the code word detecting unit 658 performs a hypothesis test only for the hopping code words included in the cell group 2, that is, the hopping code words with identifiers 32, 33, 34, . . . , 45, 46, 47.

The boundary detecting unit 649 and the sub-group detecting unit 648 respectively detect the cell sub-group identifiers S7 and timing (boundary) information of the frame S8 based on the results of the hypothesis test.

When the first, third, fifth, or sixth method of allocating a code respectively in FIG. 1, FIG. 3, FIG. 5A, and FIG. 5B is used in the cellular system, the decision variable w(i) for the hypothesis test to be performed by the code word detecting unit 658 is represented as Equation 8.

$$w(i) = \sum_{u=0}^{P-1} v_u(h_{\lfloor i/P \rfloor}((i_{mod\ P} + u)_{mod\ P}))$$ [Equation 8]

$$i = k_g \times P \times N_H, k_g \times P \times N_H + 1, \ldots, (k_g + 1)$$

Here, mod is a modular operator and [x] is the maximum value from among positive numbers that are same or less than x. $k_g$ is the cell group number 10 and $N_H$ is the number of hopping code words in the cell group.

In addition, P is the length of the hopping code word or the number of synchronization channel symbols per 10 msec frame and P is 5 according to FIG. 1 and Table 1. $h_x(y)$ is $y^{th}$ element index of the hopping code word that is index x. For example, when x=0 and y=2, $h_0(2)$ is 6 with reference to Table 1.

In Equation 8, $v_u(k)$ is a correlation value of the synchronization channel sequence which is index k with respect to index k located on $u^{th}$ OFDM symbol and is stored in the correlation buffer 657.

Equation 8 represents decision variables with respect to the hopping code words corresponding to the cell group numbers from among the hopping codes of Table 1 and their cyclic shifted code words.

That is, the decision variable with respect to the hopping code word 4, 5, 6, 7, 8 of index 0 is w(0), the decision variable with respect to the "1" cyclic shifted code words 8, 4, 5, 6, 7 of the hopping code words of index 0 is w(1), and the decision variable of "u" cyclic shifted code words of the hopping code words of index i is w(ixP+u).

The process of calculating w(i) will be described more fully with reference to FIG. 28 and Table 1. Firstly, it is assumed that the first method of allocating a code (refer to FIG. 1) is applied to the cellular system. When the cell group number detected by the synchronization and group detecting unit 620 is 0 in the first cell searching process, the code word detecting unit 658 calculates the decision variables, that is, w(0), w(1), . . . , w(5*16−1), with respect to 16 hopping code words corresponding to cell group number 0 and their cyclic shifted code words.

Since w(0) is the decision variable with respect to the code words 4, 5, 6, 7, 8 in which the cyclic shift index is 0 and the identifier of the hopping code word is 0, w(0)=0.9+1.9+1.6+1.7+1.7=7.8. Since w(2) is the decision variable with respect to the code words 7, 8, 4, 5, 6 in which cyclic shift index is 2 and the identifier of the hopping code word is 0, w(2)=10.2+8.3+9.4+9.1+8.9=45.9.

After such process, w(0), w(1), w(5×16−1) are calculated. When w(2) has the largest value, the code word detecting unit 658 finally determines that identifier is 0 and the cyclic shift index is 2. According to the determination result, the frame boundary and the code group are detected.

That is, when index of the decision variable having the largest value from among $P \times N_H$ decision variables $w(k_g \times N_H*P)$, $w(k_g \times N_H*P+1)$, . . . , $w((k_g+1) \times N_H \times P-1)$ is $i_{max}$, that is $$i_{max} = \max_i w(i),$$

the code word detecting unit 658 calculates index of the hopping code word and the cyclic shift index as $[i_{max} \div P]$, $(i_{max})_{mod\ P}$. Since the hopping code words are one-to-one mapped to the cell sub-groups, the cell sub-groups are detected from the index of the hopping code words and the frame boundary is detected from the cyclic shift index.

According to an embodiment of the present invention, information on the decision variables provided to the boundary detecting unit 649 and the sub-group detecting unit 648 by the code word detecting unit 658 is $i_{max}$. The boundary detecting unit 649 performs a modular operation $(i_{max})_{mod\ P}$ to $i_{max}$ provided to detect the cyclic shift index and detects the frame boundary based on the detected cyclic shift index.

The sub-group detecting unit 648 performs an operation $[i_{max} \div P]$ to $i_{max}$ provided to obtain the index of the hopping code words and detects the cell sub-group corresponding to the obtained hopping code word index.

As described above, when each cell sub-group includes only one scrambling code, the hopping code words are one-to-one mapped to the cell identifiers so that the code word detecting unit 658 can detect the scrambling code from the detected sub-group.

Therefore, in this case, the third cell searching process can be omitted or can be used only for verifying the scrambling code detected from the second cell searching process.

When the cellular system uses the second or fourth method of allocating a code in FIG. 2 or FIG. 4, the decision variable for the hypothesis test to be performed by the code word detecting unit 658 is represented as Equation 9.

$$w(i) = \sum_{u=0}^{P-1} v_u(h_{\lfloor i/P \rfloor}((i_{mod\ P} + u)_{mod\ P}))$$ [Equation 9]

$$i = 0, 1, \ldots, P \times N_H - 1$$

The difference between Equation 9 and Equation 8 is that the hopping code words included in each cell sub-group are different by the cell groups in Equation 8, whereas the hopping code words that are same by the cell groups are used in Equation 9.

Accordingly, in the case of the second or fourth method of allocating a code in FIG. 2 or FIG. 4, the cell sub-group numbers can be obtained by using the value obtained by an operation $[i_{max} \div P]$ of the maximum value from among the decision variables defined as in Equation 9 from the sub-group detecting unit 648 and the cell group information S6 received from the synchronization and group detecting unit.

On the other hand, the 10 msec frame boundary is obtained by using the cyclic shift value obtained through the operation $(i_{max})_{mod\ P}$ as described above.

Meanwhile, the cell identifier detecting unit 680 detects the cell identifiers based on the frame information obtained in the second cell searching process. That is, the cell identifier detecting unit 680 can obtain the locations of the common pilot channel symbols, that is, the common pilot channel symbol section, based on the detected frame boundary and finally detects the cell identifiers of the target cell through a pilot correlation between the common pilot channel symbol and the scrambling codes that correspond to available cell identifiers included in the sub-group detected in the second cell searching process based on the obtained location.

Meanwhile, similarly to other OFDM symbols, each common pilot channel symbol is formed of $N_T$ samples and includes a cyclic prefix section that is $N_{CP}$ samples and the remaining section that is $N_S$ samples.

In other words, the cell identifier detecting unit 680 extracts the common pilot channel symbol included in the received sub-frame based on the frame timing (boundary) information obtained in the second cell searching process, calculates the correlation values between the extracted common pilot channel symbol and the scrambling codes included in the sub-codes detected in the second cell searching process, and determines the scrambling code that corresponds to the correlation value having the largest value as the scrambling code of the current base station.

That is, the common pilot channel is used to estimate channels for coherently demodulating the forward link data channel and to detect the scrambling code (the scrambling codes are one-to-one mapped to the cell identifiers) in the third cell searching process.

The cell identifier detecting unit 680 searches only for the scrambling codes included in the sub-group provided by the code word detecting unit 658 so that complexity of the receiver can be reduced. That is, only $N_c$ scrambling codes included in the sub-group detected in the second cell searching process from the cell group detected in the first cell searching process are searched. Here, $N_c$ is the number of scrambling codes per sub-group and $N_c=4$ in FIG. 1.

Figure 29:
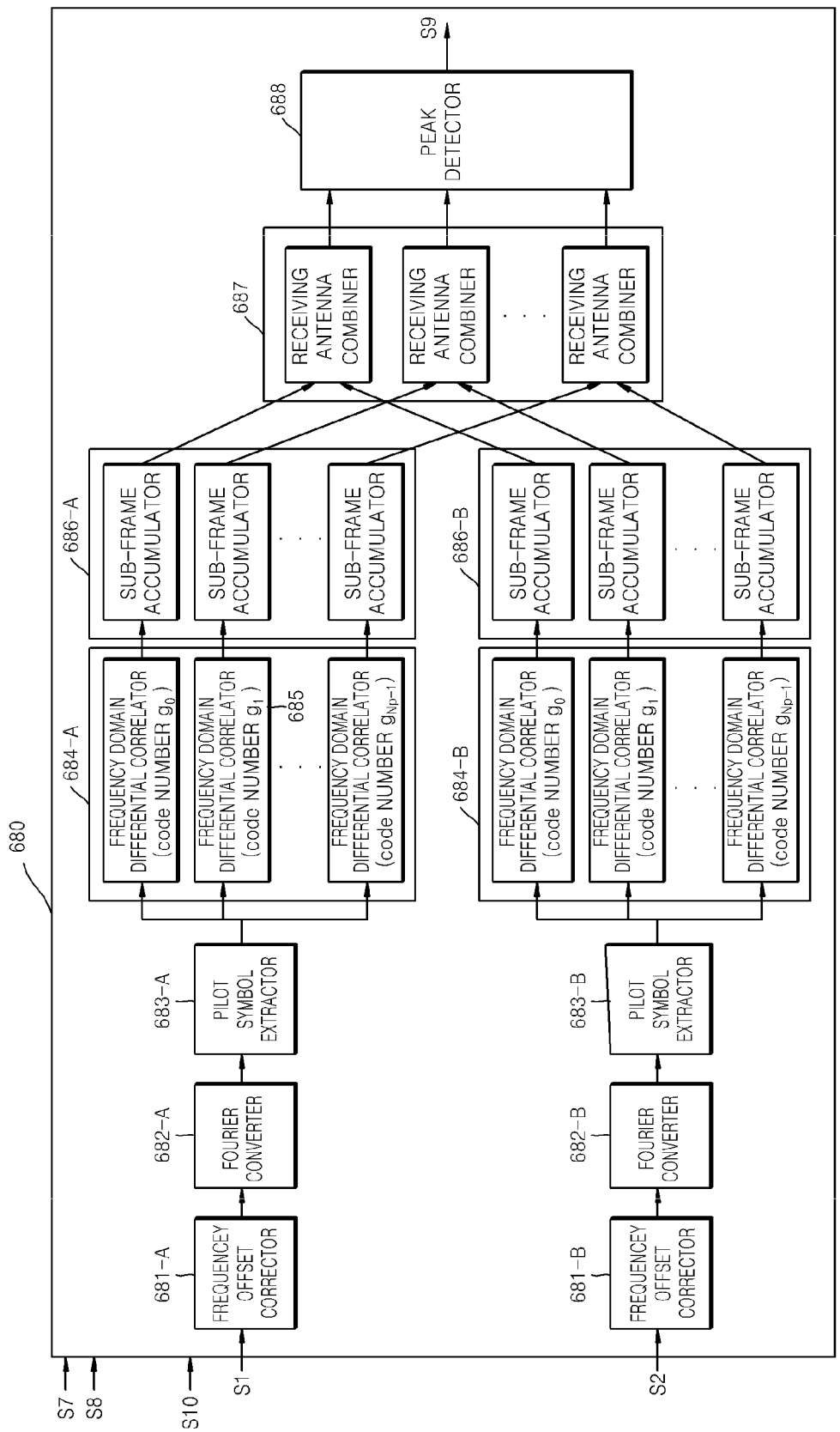
FIG. 29 is a block diagram of a cell identifier detecting unit of FIG. 20.

FIG. 29 is a block diagram of the cell identifier detecting unit 680 of FIG. 20. The cell identifier detecting unit 680 includes frequency offset correctors 681-A and 681-B, Fourier converters 682-A and 682-B, pilot symbol extractors 683-A and 683-B, pilot correlators 684-A and 684-B, sub-frame accumulators 686-A and 686-B, receiving antenna combiners 687, and a peak detector 688.

Since the common pilot channel symbol section by sub-frames can be known based on 10 msec timing (boundary) information of the frame S8 provided from the hopping code detecting unit 640, the frequency offset correctors 681-A and 681-B correct frequency offset of $N_S$ samples, except for cyclic prefix, with respect to the common pilot channel symbols included in the down-converted OFDM symbols S1 and S2 by using Equation 6. Here, the frequency offset estimation values used to correct frequency offset can be the frequency offset estimation value S10 provided from the hopping code detecting unit 640.

The Fourier converters 682-A and 682-B Fourier convert $N_S$ frequency offset corrected samples and generates a frequency domain signal.

The pilot symbol extractors 683-A and 683-B only extract $N_p$ pilot data from the generated frequency domain signal.

The pilot correlators 684-A and 684-B calculate the correlation of the extracted $N_p$ pilot data with the Nc scrambling codes included in the code group provided from the hopping code detecting unit 640.

Here, the correlation can be calculated by using Equations 9 through 12. Referring to FIG. 29, the pilot correlators 684-A and 684-B include Nc frequency domain differential correlators and perform a frequency domain differential correlation in a parallel method.

That is, each of the frequency domain differential correlators calculates correlation between the scrambling codes included in the detected code group and the extracted pilot data. The frequency domain differential correlator is operated in the common pilot channel symbol section in each sub-frame and outputs of the frequency domain differential correlator are accumulated in each sub-frame accumulator included in the accumulators 686-A and 686-B by Nc scrambling codes in the detected code group. Equations 9 through 12 will be described later.

The accumulators 686-A and 686-B accumulate Nc correlation values calculated with respect to each common pilot channel symbol. Referring to FIG. 8, 10, or 14, at least one common pilot channel symbol exists per sub-frame so that correlation value calculated with respect to common pilot channel symbols are accumulated as much as the number of previously set sub-frames. Each of the accumulators 686-A and 686-B includes $N_c$ sub-frame accumulators.

The combiner 687 combines the outputs of the accumulators 686-A and 686-B calculated according to a plurality of paths obtained by the receiving diversity that is embodied by installing a plurality of the receiving antennas and generates $N_c$ decision variable. Meanwhile, it is well known to one of ordinary skill in the art that the combiner 687 and blocks in the lower part can be excluded when the receiving diversity is not used.

The peak detector 688 detects the decision variable having the largest value from among $N_c$ decision variables provided from the combiner 687, selects the scrambling code corresponding to the detected decision variable, and finally detects the scrambling code of the current base station or the cell identifiers S9. Accordingly, the mobile station can detect the base station having the shortest radio distance or the scrambling code (cell identifier) of the base station having the strongest reception signal.

Meanwhile, when the largest value detected is larger than the pre-set threshold, it is regarded that the cell searching is completed and when the largest value detected is smaller than the pre-set threshold, the cell searching apparatus repeatedly performs the first, second, and third cell searching processes.

When each sub-group includes one cell identifier or scrambling code, that is, when Nc is 1, the sub-group identifiers are one-to-one mapped to the cell identifiers so that the frame boundary and the cell identifiers can be detected even by performing up to the second cell searching process. Accordingly, the third cell searching process can be excluded. However, when the third cell searching process is performed, the cell identifiers detected according to the second cell searching process are verified.

Hereinafter, the operation of the pilot correlators 684-A and 684-B will be described more fully.

Figure 30:
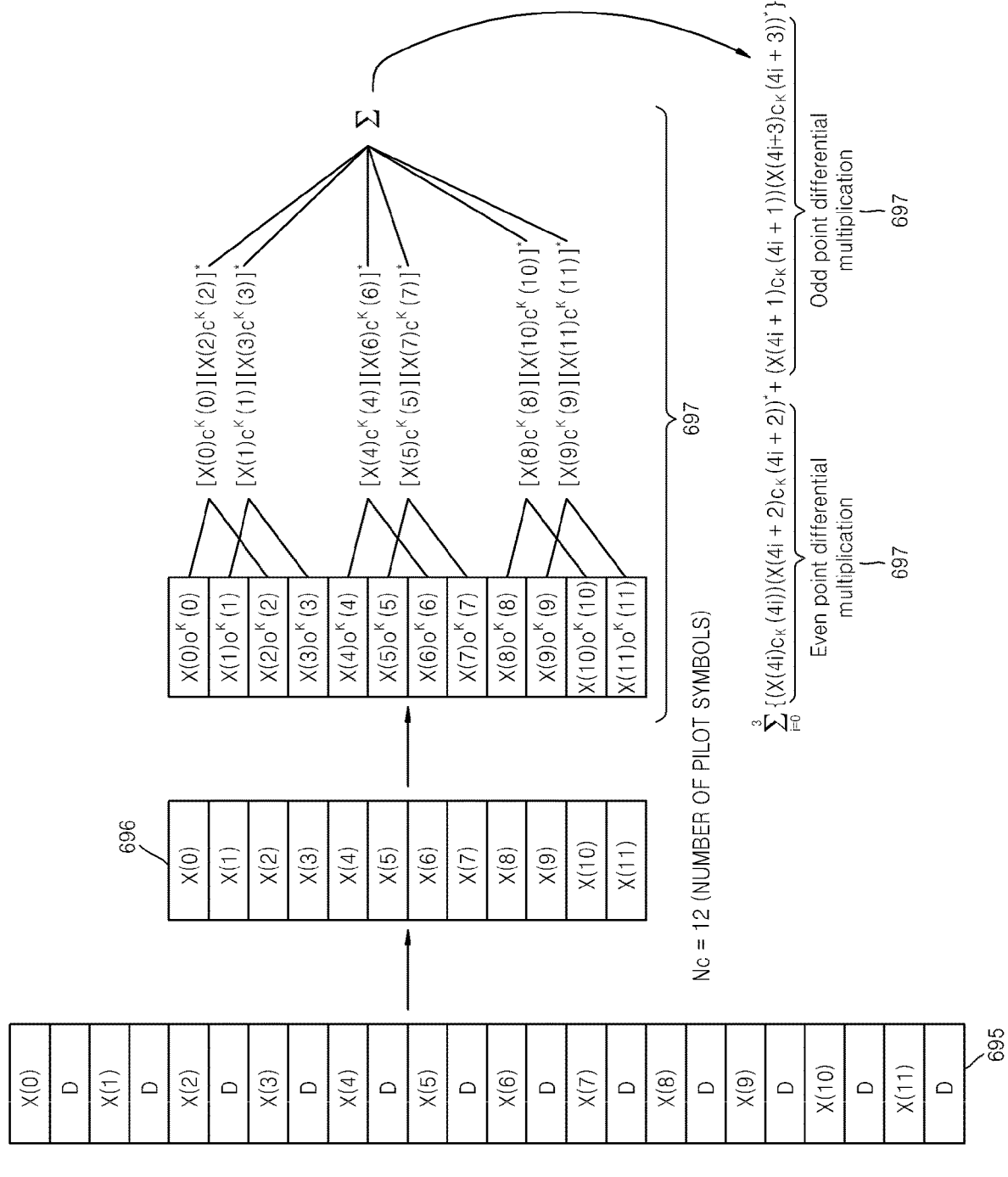
FIG. 30 illustrates an operation of a pilot correlator according to an embodiment of the present invention.

FIG. 30 illustrates the operations of the pilot correlators 684-A and 684-B according to an embodiment of the present invention.

Reference numerals 695 and 696 respectively illustrate input and output of the pilot symbol extractors 683-A and 683-B. That is, a signal in the frequency domain 695, the pilot data and traffic data may co-exist and the pilot symbol extractors 683-A and 683-B extract Np pilot data.

X(n) in FIG. 30 indicates $n^{th}$ pilot data from among frequency domain data of the common pilot channel symbol. In particular, the common pilot channel symbol includes Np pilot data in FIG. 30.

The correlation between extracted pilot data and the scrambling codes is represented as Equations 10 through 13.

$$\sum_{i=0}^{\frac{N_p}{4}-1} \left\{ \begin{array}{l} (X(4i)(c_{g_k}(4i))^*)(X(4i+2)(c_{g_k}(4i+2))^*)^* + \\ (X(4i+1)(c_{g_k}(4i+1))^*)(X(4i+3)(c_{g_k}(4i+3))^*)^* \end{array} \right\} \quad \text{[Equation 10]}$$

$N_p$ is the number of pilot data on the frequency domain included in the common pilot channel symbol and $c_{gk}(u)$ is $u^{th}$ element of $k^{th}$ scrambling code among the scrambling codes included in the detected code group.

The differential correlation represented as Equation is used in the third cell searching process according to the following reason. In the case of the OFDM signal, the adjacent symbols in the frequency domain experience almost same wireless fading which is similar with channel distortion experienced by the adjacent symbols. However, in the wireless fading experienced by the symbols located far from each other, the more the gap between the symbols increase, the more the independent fading to each other is experienced. In this case, when the correlation length N is large, the performance of the existing frequency domain correlator defined as in Equation 13 is significantly decreased.

$$\sum_{i=0}^{N-1} \{(X(i)(c(i))^*)\} \qquad \text{[Equation 11]}$$

In Equation 11, since $X(i)=\alpha_i c(i)$, $$\sum_{i=0}^{N-1} \alpha_i$$

is coherently added to the independent symbols X( ) that are far from each other and, as a result, the performance is significantly decreased in a fading channel. $\alpha_i$ indicates the channel value of $i^{th}$ subcarrier and is almost same for adjacent subcarriers in the fading channel, however, is different for the subcarriers that are far from each other.

On the other hand, when the differential correlator defined in Equation 12 is used, $$\sum_{i=0}^{\frac{N}{2}-1} \{(X(2i)(c(2i))^*)(X(2i+1)(c(2i+1))^*)^*\} \qquad \text{[Equation 12]}$$

the result of the correlation value becomes $$\sum_{i=0}^{\frac{N}{2}-1} \alpha_{2i}\alpha_{2i+1}^* \approx \sum_{i=0}^{\frac{N}{2}-1} |\alpha_{2i}|^2$$

so that the performance of the differential correlator defined in Equation 12 is better than that of the existing correlator defined in Equation 10.

Instead of using differential multiplication between adjacent symbols as in Equation 10 in the third cell searching process, differential multiplication between pilot symbols that are skipped by one step are used as in Equation 10 or reference numeral 697 in FIG. 30, since the mobile station cannot identify information of the current base station where the mobile station belongs to in an initial synchronization obtaining mode. That is, the mobile station cannot identify whether the number of transmitting antennas used in the current base station is 1 or 2.

When the transmitting antenna is 1, all common pilot channel symbols 696 are transmitted through the same transmitting antenna in FIG. 19, however, when the transmitting antenna is 2, even numbered common pilot channel symbols (that is, X(0), X(2), ...) are transmitted through the first transmitting antenna and odd numbered common pilot channel symbols are transmitted through the second transmitting antenna.

In this case, that is, when there are two transmitting antennas, adjacent data on the frequency domain of two adjacent common pilot channel symbols experience complete independent fading on the frequency domain.

Here, when a differential multiplication is performed between adjacent symbols at a transmitting end as in Equation 11, detecting efficiency may be reduced. On the other hand, as illustrated in reference numeral 697 in FIG. 30, when the differential correlation according to an embodiment of the present invention is performed, that is, when even numbered symbols perform the differential multiplication 697-A and even numbered symbols perform the differential multiplication 697-B, the long PN scrambling code identifier can be detected, regardless of the number of transmitting antennas of the base station.

In order to reduce complexity, odd numbered data illustrated in Equation 10 is ignored and only even numbered data can be used as in Equation 13.

$$\sum_{i=0}^{\frac{N_p}{4}-1} \{(X(4i)(c_{g_k}(4i))^*)(X(4i+2)(c_{g_k}(4i+2))^*)^*\} \qquad \text{[Equation 13]}$$

As described above, the initial cell searching process performed by the mobile station when a power source is applied to the mobiles station is described. Hereinafter, adjacent cell searching process will be described.

In the cellular system, cell searching process can be classified into initial cell searching and adjacent cell searching. The initial cell searching is performed when the power source is applied to the mobile station. The adjacent cell searching is performed to detect the frame timing of the adjacent cell having the strong signal and the cell identifiers, in order to perform handoff in an idle mode or an active mode (or a connected mode) after the initial cell searching is completed.

An error rate of the clock generator 540 of the mobile station is close to 0 in the idle mode or active mode, since frequency offset can be continuously estimated by using the signal received from the home cell. Therefore, frequency offset does not need to be corrected in second and third cell searching processes during adjacent cell searching.

In the case of Wideband Code Division Multiple Access (WCDMA), 10 msec frame timing in all base station is independent. That is, WCDMA is an asynchronous cellular system in which base stations are synchronous. On the other hand, IS-95 or CDMA 2000 is a synchronization cellular system in which all base stations are operated by synchronizing with GPS.

In OFDM system, OFDM method is basically used in a forward link. In this case, there are two types of services which are MBMS service and unicast service.

The unicast service may be operated asynchronously between adjacent cells, however, the MBMS service should be operated synchronously between the cells. In this case, that is, in the case of synchronous base station, the timing difference between OFDM symbols of the signal received from the cells adjacent to the cell boundary is smaller than the cyclic prefix section. Then, orthogonality can be maintained between the subcarriers of the signal received from the adjacent base stations.

As described above, in the OFDM system, all cells may be operated synchronously or synchronous and asynchronous may be co-exist according to a wireless communication service provider.

In the OFDM cellular system, when all base stations are operated in a base station synchronization mode, the first adjacent cell searching can be excluded during adjacent cell searching. That is, 10 msec frame boundary of the signal received from the adjacent cell is within an error range of the frame boundary of the home cell and cyclic prefix so that the synchronization and group detecting unit 620 does not need to be operated. On the other hand, the hopping code detecting unit 640 and the cell identifier detecting unit 680 should be operated.

Therefore, when the mobile station identifies whether all base station in the cellular system where the mobile station belongs to is operated synchronously, cell searching can be easily performed. Accordingly, the base station according to the present invention sends information on whether all base station in the current cellular system is operated synchronously to all mobile station in the cell through a broadcasting channel of a forward link or a control channel.

For example, 1 bit is set in a message part of the broadcasting channel as a "system synchronization identifier" and the mobile station is informed that when the value is 1, all base station in the current cellular system is operated synchronously and when the value is 0, a part of the base station in the current cellular system is operated synchronously. When such value is 0, the base station operated synchronously for the MBMS service may exist (that is, a synchronization base station and an asynchronous base station may co-exist).

When the system synchronization identifier is 0 and 1, a cell searching algorithm of the mobile station may change. As mentioned above, when the system synchronization identifier is 1, that is, all base station is operated synchronously, the first cell searching process may not be needed.

On the other hand, when the system synchronization identifier is 0, the home cell (or serving cell) in which the current mobile station is included may be operated asynchronously. Also, since the home cell is in a synchronization mode and a cell among the adjacent cells may be operated in an asynchronous mode, all cell searching process including the first cell searching process may be required.

Whether the home cell and the adjacent cells are operated in a synchronization mode can be known according to whether each base station of the cellular system is operated in a synchronization mode, that is, whether the "home cell synchronization mode identifier" and the adjacent base stations are operated in a synchronization mode, that is, "adjacent cell synchronization mode identifier", is transmitted to the mobile station included in the cell through a broadcasting channel or a control channel.

Only one home cell synchronization mode identifier is needed, however, various number of the adjacent cell identifiers are needed, since the adjacent cell identifiers should provide information on the cells existing around the current base station. The mobile station can efficiently search for the adjacent cells in the system, where the cells operated in a synchronization mode and the cells operated in an asynchronous mode co-exist, by using the home cell synchronization identifier and the adjacent cell synchronization mode identifiers.

In order to support handover without cutting off in the cellular system, the mobile station should search for the adjacent cells, even when the power of the reception signals in the adjacent base stations is the same or less than the power of the reception signals in the home cell. That is, the mobile station should continuously measure the size of the signals of the adjacent cells in an idle mode and an active mode and report to the base station.

In this case, when two adjacent base stations are operated in a synchronization mode, a synchronization channel signal received from the home cell and a synchronization channel signal received from the adjacent base stations are piled in the time domain and entered so that when the second cell searching process used in the initial cell searching process is used, the performance thereof may be decreased.

As mentioned above, the mobile station can identify whether the home cell and adjacent cells are operated synchronously from the system synchronization identifier, home cell synchronization mode identifier, or adjacent cell synchronization mode identifier.

The adjacent cell searching method of the mobile station according to the present invention is to insert a block for removing home cell component to a back end of the combiner 656 of FIG. 26 in the second cell searching process.

Figure 31:
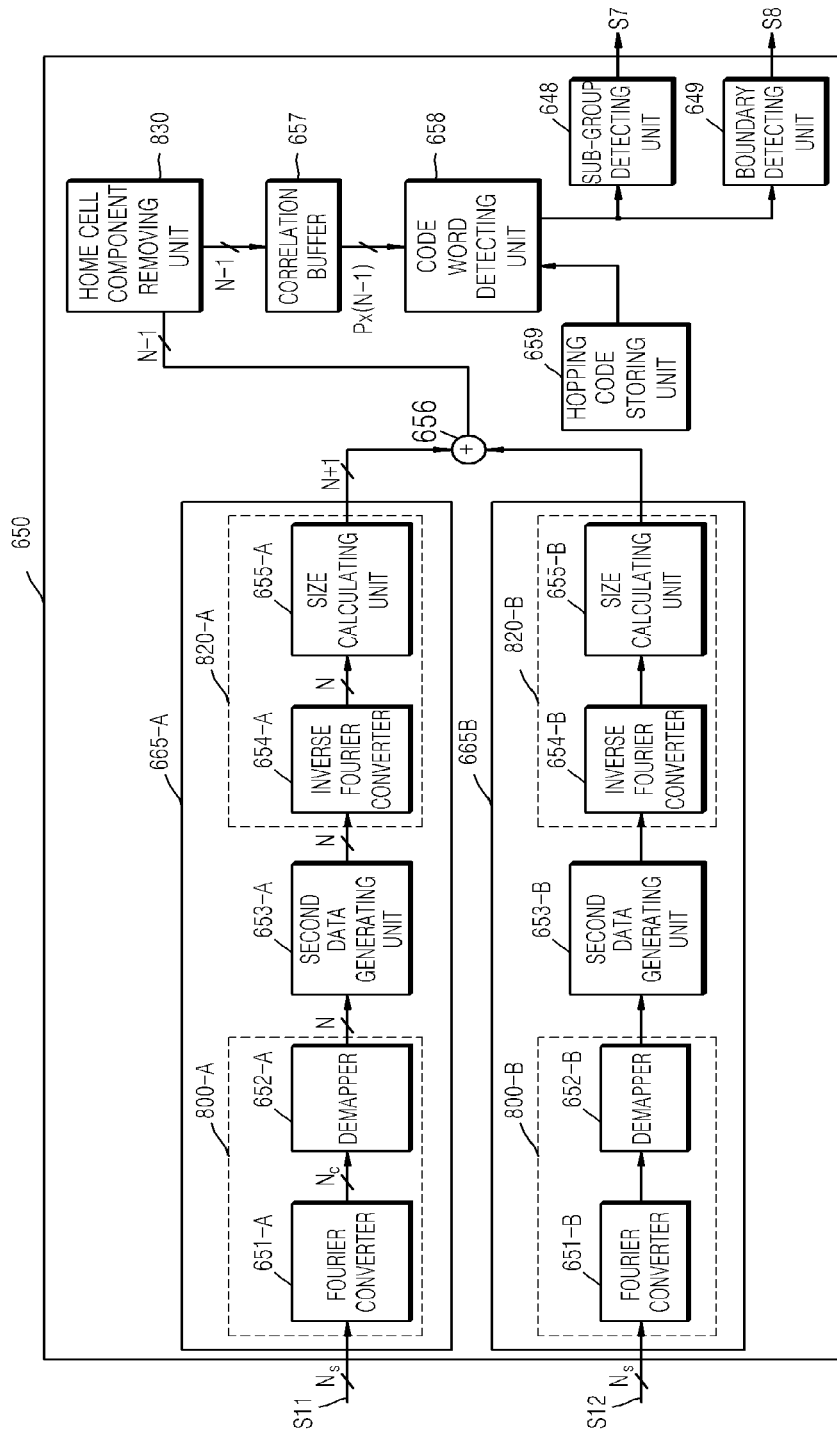
FIG. 31 is a block diagram of a sub-group and a boundary detecting unit according to another embodiment of the present invention.

FIG. 31 is a block diagram of the sub-group and the boundary detecting unit 650 according to another embodiment of the present invention. In FIG. 31, the sub-group and boundary detector 650 further includes a home cell component removing unit 830. The home cell component removing unit 830 removes home cell component from among the output of the combiner 656. That is, the correlation value with respect to the synchronization channel sequence corresponding to the home cell is replaced to a predetermined number. Here, the predetermined number can be '0.' Since the mobile station identifies the hopping code word of the current home cell, the home cell component can be removed.

Figure 32A:
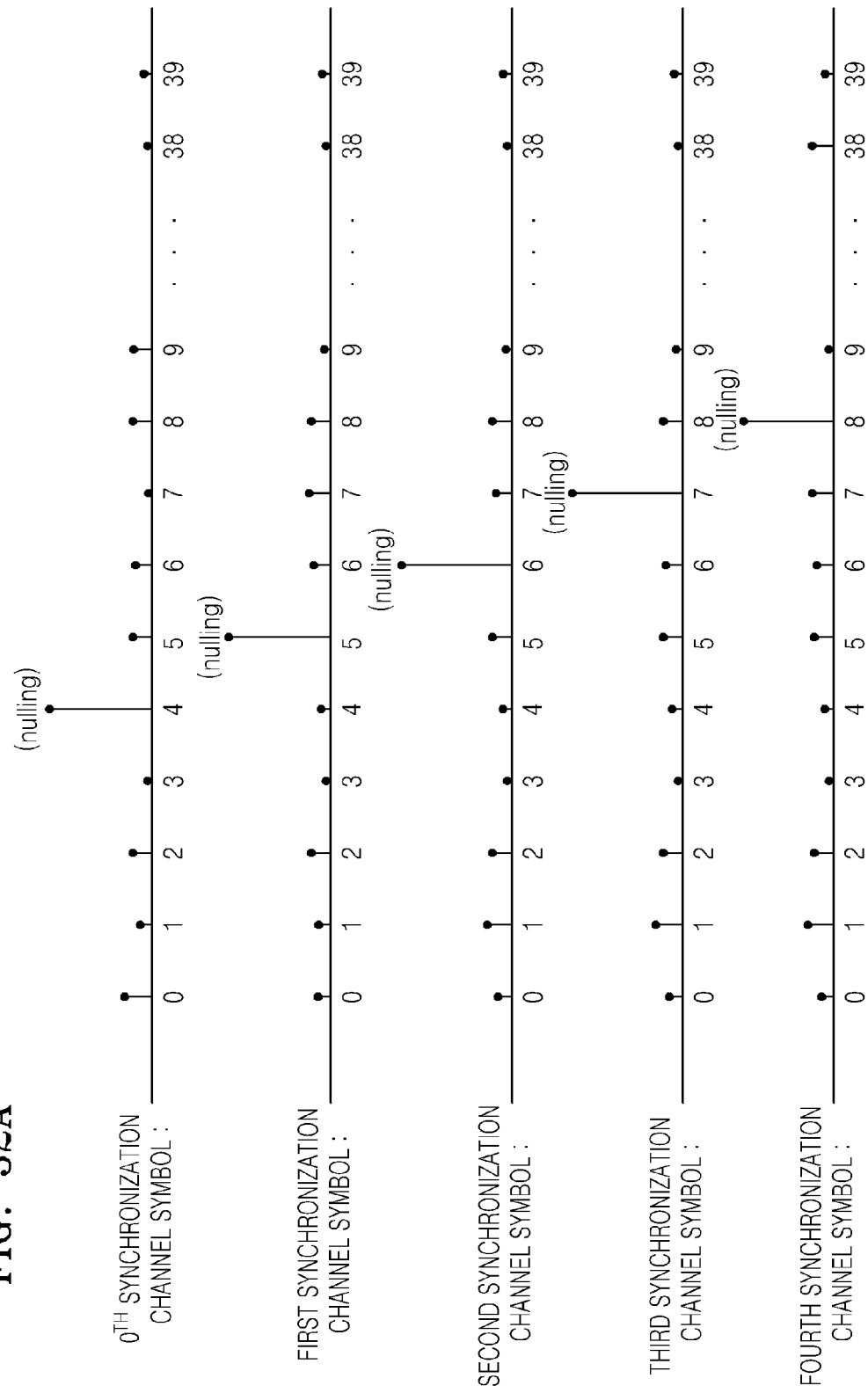
FIGS. 32A and 32B illustrate an operation of a home cell component removing unit.
Figure 32B:
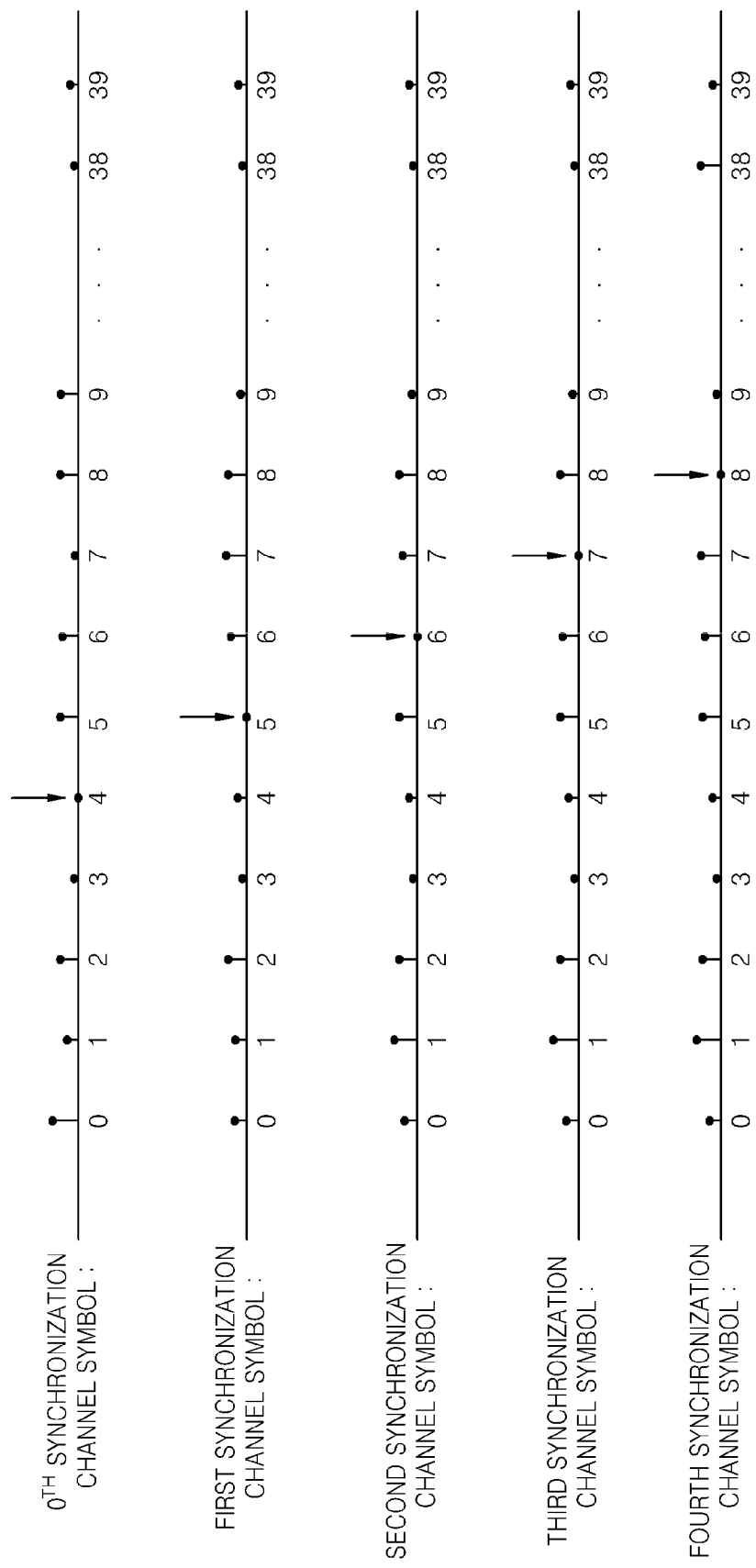

FIGS. 32A and 32B illustrate an operation of the home cell component removing unit 830.

FIG. 32A is an input of the home cell component removing unit 830. That is, FIG. 32A illustrates the result of the correlation between all synchronization channel sequences used in the system with respect to each of five received synchronization channel symbols. In FIG. 32A, the hopping code words of the home cell are {4, 5, 6, 7, 8}. In this case, the home cell component removing unit 830 replaces the correlation value corresponding to {4, 5, 6, 7, 8} with a small value, for example, 0.

FIG. 32B is an output of the home cell component removing unit 830. In FIG. 32B, the correlation values corresponding to the home cell components, 4, 5, 6, 7, 8 are replaced with 0. Therefore, the code word detecting unit 658 detects one or more hopping code words except for the hopping code words of the home cell. During the adjacent cell searching, the code word detecting unit 658 minimizes an effect of the home cell component so that the performance of the adjacent cell searching can be improved.

Meanwhile, when the home base station and the adjacent base station are operated in a synchronization mode, the code word detecting unit 658 does not need to detect the cyclic shift index of the adjacent cell during the adjacent cell searching process. As described above, since 10 msec frame synchronization is set for the home base station and the adjacent base station, the framing timing of the adjacent cells is the same as the frame timing of the home cell.

In the third adjacent cell searching, the same method used in the initial cell searching process is basically used, except that the frequency offset is not corrected. Of course, in the case of the third, fourth, and sixth methods of allocating a code (FIGS. 3, 4, and 5B) where the sub-groups are one-to-one mapped to the cell identifiers, the third cell searching process may not be needed.

Figure 33:
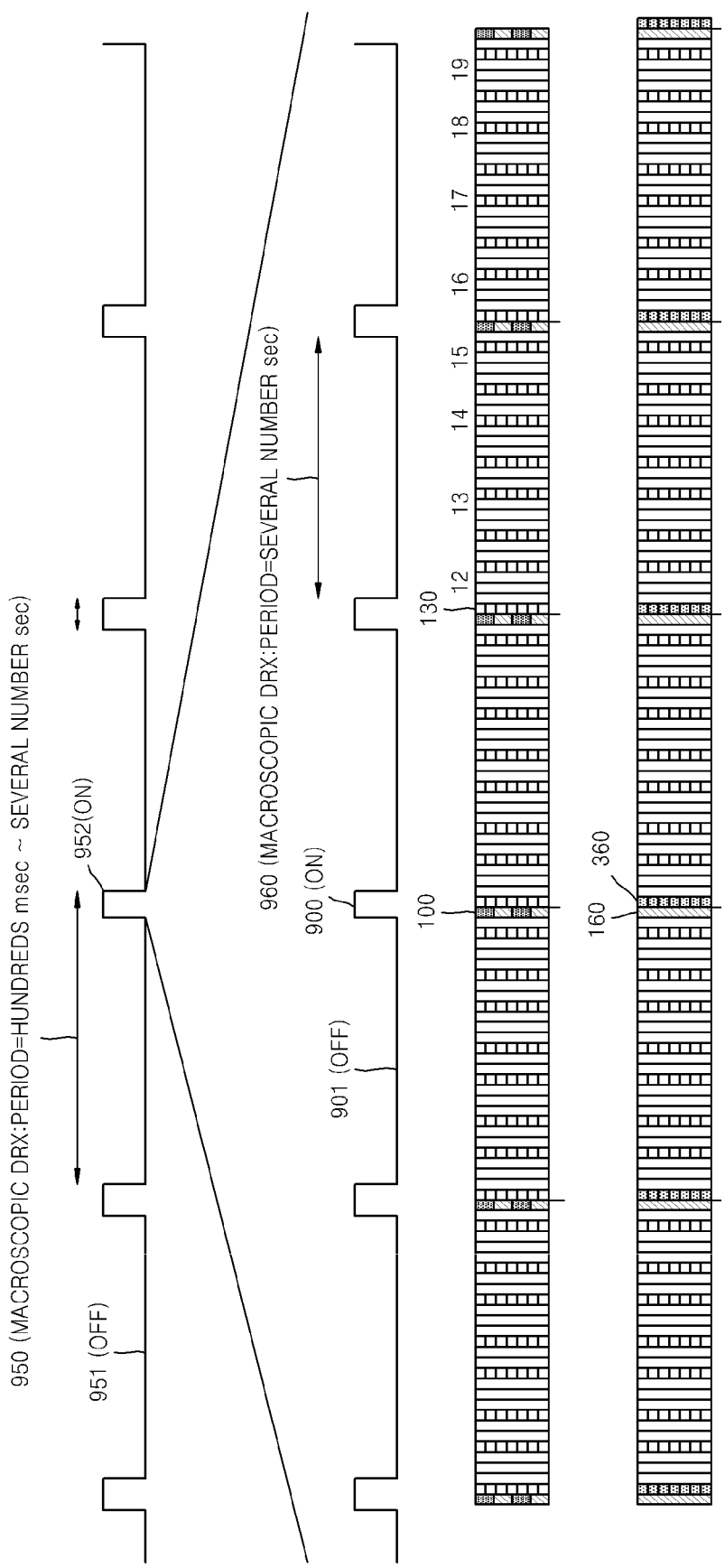
FIG. 33 illustrates a discontinuous reception (DRX) mode of a mobile station during fine frequency tracking, fine time tracking, and adjacent cell searching of a home cell in an idle mode according to an embodiment of the present invention.

Meanwhile, in the cellular system operated in a base station synchronization mode, in order to minimize the power consumption, the mobile station can introduce two-step discontinuous reception (DRX) mode which turns the operation of the receiver including the down converter on/off in a Macroscopic DRX 950 and a Microscopic DRX mode 960 as in FIG. 33, except for the basic clock generator including 10 msec frame clock synchronized with the 10 msec frame boundary 150 of the current cell, during frequency tracking, fine time tracking, or adjacent cell searching of the signal in the home cell in an idle mode of the mobile station.

FIG. 33 is a diagram for explaining a gating mode of the mobile station during adjacent cell searching in an idle mode according to an embodiment of the present invention. Firstly, the mobile station receives a system parameter from the base station and sets a period of the Macroscopic DRX mode. Then, only when the Macroscopic DRX mode is on (952), the mobile station performs frequency tracking or fine time tracking of the signal in the home cell by using the synchronization channel and the common pilot channel, in order to demodulate a paging channel received from the home cell, or the mobile station searches for the adjacent cells by using the synchronization channel and the common pilot channel when the signal component of the home cell is low.

However, in order to reduce the battery consumption of the mobile station even when the Macroscopic DRX mode is on (952), the Microscopic DRX mode 960 exists as in FIG. 33. That is, only when the Microsopic DRX is on (900), frequency tracking, time tracking, or adjacent cell searching is performed and when the Microsopic DRX is off (901), receiving operations of the transmitting end such as adjacent cell searching and down converting are not performed.

That is, the receiver is turned on only in the predetermined section 900 including the synchronization channel symbols and the common pilot channel and is turned off in other sections so that the cell searching apparatus is operated by using the received signal in the section where the receiver is turned on. Therefore, the mobile station can reduce battery consumption compared with when only the Macroscopic DRX mode is used.

The invention can also be embodied as computer readable codes on a computer readable recording medium. The computer readable recording medium is any data storage device that can store data which can be thereafter read by a computer system. Examples of the computer readable recording medium include read-only-memory (ROM), random-access-memory (RAM), CD-ROMs, magnetic tapes, floppy disks, optical data storage devices, and carrier waves. The computer readable recording medium can also be distributed over network coupled computer system so that the computer readable code is stored and executed in a distributed fashion. While the present invention has been particularly shown and described with reference to exemplary embodiments thereof, it will be understood by those of ordinary skill in the art that various changes in form and details may be made therein without departing from the spirit and scope of the present invention as defined by the following claims.

We claim:

1. A communication method, comprising:
   receiving at least a part of a frame, wherein the frame consists of twenty units including a first unit and a second unit, wherein the first unit comprises a first set of Orthogonal Frequency Division Multiplexing (OFDM) symbols including a first OFDM symbol and a second OFDM symbol, the second unit comprises a second set of OFDM symbols including a third OFDM symbol and a fourth OFDM symbol, the first OFDM symbol comprises a first primary synchronization signal, the second OFDM symbol comprises a first secondary synchronization signal, the third OFDM symbol comprises the first primary synchronization signal and the fourth OFDM symbol comprises a second secondary synchronization signal;
   determining a first identifier based on the first primary synchronization signal;
   determining a second identifier based on one of the first secondary synchronization signal and the second secondary synchronization signal; and
   determining a cell identifier based on the first identifier and the second identifier,
   wherein:
      the first secondary synchronization signal and the second secondary synchronization signal are different,
      the first OFDM symbol comprising the first primary synchronization signal and the second OFDM symbol comprising the first secondary synchronization signal are last two OFDM symbols of the first unit,
      the third OFDM symbol comprising the first primary synchronization signal and the fourth OFDM symbol comprising the second secondary synchronization signal are last two OFDM symbols of the second unit,
      the first OFDM symbol comprises a first set of subcarriers ranging from a first subcarrier to a second subcarrier and the second OFDM symbol comprises a second set of subcarriers ranging from a third subcarrier to a fourth subcarrier;
      the first primary synchronization signal occupies the first set of subcarriers and the first secondary synchronization signal occupies the second set of subcarriers; and
      both the first subcarrier and the third subcarrier occupy a first frequency and both the second subcarrier and fourth subcarrier occupy a second frequency.

2. The method of claim 1, wherein:
   receiving at least the part of the frame comprises:
      receiving a first radio frequency (RF) signal and a second RF signal through one or more antennas;
      converting the first RF signal into a first baseband signal having a lower center frequency than the first RF signal; and
      converting the second RF signal into a second baseband signal having a lower center frequency than the second RF signal.

3. The method of claim 1, wherein:
   the first OFDM symbol further comprises a third set of subcarriers that are not allocated to carry the first primary synchronization signal; and
   the second OFDM symbol further comprises a fourth set of subcarriers that are not allocated to carry the first secondary synchronization signal.

4. The method of claim 1, wherein the first unit has a length of 0.5 millisecond, and the first OFDM symbol is a last OFDM symbol of the first unit.

5. The method of claim 1, wherein the first secondary synchronization signal and the second secondary synchronization signal comprise maximum-length sequences, respectively.

6. The method of claim 1, wherein the first identifier is partial information for the cell identifier and the second identifier is the remaining information for the cell identifier.

7. An apparatus for a terminal, comprising:
a circuitry;
wherein the circuitry is configured to:
cause the terminal to receive at least a part of a frame, wherein the frame consists of twenty units including a first unit and a second unit, wherein the first unit comprises a first set of Orthogonal Frequency Division Multiplexing (OFDM) symbols including a first OFDM symbol and a second OFDM symbol, the second unit comprises a second set of OFDM symbols including a third OFDM symbol and a fourth OFDM symbol, the first OFDM symbol comprises a first primary synchronization signal, the second OFDM symbol comprises a first secondary synchronization signal, the third OFDM symbol comprises the first primary synchronization signal and the fourth OFDM symbol comprises a second secondary synchronization signal;
determine a first identifier based on the first primary synchronization signal;
determine a second identifier based on one of the first secondary synchronization signal and the second secondary synchronization signal; and
determine a cell identifier based on the first identifier and the second identifier,
wherein:
the first secondary synchronization signal and the second secondary synchronization signal are different,
the first OFDM symbol comprising the first primary synchronization signal and the second OFDM symbol comprising the first secondary synchronization signal are last two OFDM symbols of the first unit, and
the third OFDM symbol comprising the first primary synchronization signal and the fourth OFDM symbol comprising the second secondary synchronization signal are last two OFDM symbols of the second unit,
the first OFDM symbol comprises a first set of subcarriers ranging from a first subcarrier to a second subcarrier and the second OFDM symbol comprises a second set of subcarriers ranging from a third subcarrier to a fourth subcarrier;
the first primary synchronization signal occupies the first set of subcarriers and the first secondary synchronization signal occupies the second set of subcarriers; and
both the first subcarrier and the third subcarrier occupy a first frequency and both the second subcarrier and fourth subcarrier occupy a second frequency.

8. The apparatus of claim 7, wherein the circuitry is further configured to:
cause the terminal to receive a first radio frequency (RF) signal through one or more antennas;
cause the terminal to receive a second RF signal through the one or more antennas;
cause the terminal to convert the first RF signal into a first baseband signal, the first baseband signal having a lower center frequency than the first RF signal; and
cause the terminal to convert the second RF signal into a second baseband signal, the second baseband signal having a lower center frequency than the second RF signal.

9. The apparatus of claim 7, wherein:
the first OFDM symbol further comprises a third set of subcarriers that are not allocated to carry the first primary synchronization signal; and
the second OFDM symbol further comprises a fourth set of subcarriers that are not allocated to carry the first secondary synchronization signal.

10. The apparatus of claim 7, wherein the first unit has a length of 0.5 millisecond, and the first OFDM symbol is a last OFDM symbol in the first unit.

11. The apparatus of claim 7, wherein the first secondary synchronization signal and the second secondary synchronization signal are maximum-length sequences, respectively.

12. The apparatus of claim 7, wherein the first identifier is partial information for the cell identifier and the second identifier is the remaining information for the cell identifier.

13. A communication device comprising:
a circuitry;
wherein the circuitry is configured to:
cause the communication device to receive at least a part of a frame, wherein the frame consists of twenty units including a first unit and a second unit, wherein the first unit comprises a first set of Orthogonal Frequency Division Multiplexing (OFDM) symbols including a first OFDM symbol and a second OFDM symbol, the second unit comprises a second set of OFDM symbols including a third OFDM symbol and a fourth OFDM symbol, the first OFDM symbol comprises a first primary synchronization signal, the second OFDM symbol comprises a first secondary synchronization signal, the third OFDM symbol comprises the first primary synchronization signal and the fourth OFDM symbol comprises a second secondary synchronization signal;
determine a first identifier based on the first primary synchronization signal;
determine a second identifier based on one of the first secondary synchronization signal and the second secondary synchronization signal; and
determine a cell identifier based on the first identifier and the second identifier,
wherein:
the first secondary synchronization signal and the second secondary synchronization signal are different,
the first OFDM symbol comprising the first primary synchronization signal and the second OFDM symbol comprising the first secondary synchronization signal are last two OFDM symbols of the first unit, and
the third OFDM symbol comprising the first primary synchronization signal and the fourth OFDM symbol comprising the second secondary synchronization signal are last two OFDM symbols of the second unit,
the first OFDM symbol comprises a first set of subcarriers ranging from a first subcarrier to a second subcarrier and the second OFDM symbol comprises a second set of subcarriers ranging from a third subcarrier to a fourth subcarrier;
the first primary synchronization signal occupies the first set of subcarriers and the first secondary synchronization signal occupies the second set of subcarriers; and
both the first subcarrier and the third subcarrier occupy a first frequency and both the second subcarrier and fourth subcarrier occupy a second frequency.

14. The communication device of claim 13, wherein the circuitry is further configured to:

cause the communication device to receive a first radio frequency (RF) signal through one or more antennas;

cause the communication device to receive a second RF signal through the one or more antennas;

cause the communication device to convert the first RF signal into a first baseband signal, the first baseband signal having a lower center frequency than the first RF signal; and cause the communication device to convert the second RF signal into a second baseband signal, the second baseband signal having a lower center frequency than the second RF signal.

15. The communication device of claim 13, wherein:

the first OFDM symbol further comprises a third set of subcarriers that are not allocated to carry the first primary synchronization signal; and the second OFDM symbol further comprises a fourth set of subcarriers that are not allocated to carry the first secondary synchronization signal.

16. The communication device of claim 13, wherein the first unit has a length of 0.5 millisecond, and the first OFDM symbol is a last OFDM symbol of the first unit.

17. The communication device of claim 13, wherein the first secondary synchronization signal and the second secondary synchronization signal comprise maximum-length sequences, respectively.

18. The communication device of claim 13, wherein the first identifier is partial information for the cell identifier and the second identifier is the remaining information for the cell identifier.

\* \* \* \* \*